(12) United States Patent
Gokhale et al.

(10) Patent No.: US 10,509,726 B2
(45) Date of Patent: Dec. 17, 2019

(54) INSTRUCTIONS AND LOGIC FOR LOAD-INDICES-AND-PREFETCH-SCATTERS OPERATIONS

(71) Applicant: Intel Corporation, Santa Clara, CA (US)

(72) Inventors: Indraneil M. Gokhale, Chandler, AZ (US); Elmoustapha Ould-Ahmed-Vall, Chandler, AZ (US); Charles R. Yount, Phoenix, AZ (US); Antonio C. Valles, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 14/975,809

(22) Filed: Dec. 20, 2015

(65) Prior Publication Data

US 2017/0177346 A1   Jun. 22, 2017

(51) Int. Cl.
*G06F 9/30* (2018.01)
*G06F 9/38* (2018.01)
(Continued)

(52) U.S. Cl.
CPC ...... *G06F 12/0875* (2013.01); *G06F 9/30032* (2013.01); *G06F 9/30036* (2013.01);
(Continued)

(58) Field of Classification Search
CPC .. G06F 9/30043; G06F 9/30047; G06F 9/383; G06F 9/35; G06F 9/355; G06F 12/0862; G06F 9/30032; G06F 9/30036
See application file for complete search history.

(56) References Cited

U.S. PATENT DOCUMENTS

| 5,784,711 A | 7/1998 | Chi |
| 6,918,010 B1 | 7/2005 | Yeager |

(Continued)

FOREIGN PATENT DOCUMENTS

| WO | 2006/038991 | 4/2006 |
| WO | 2013/095563 | 6/2013 |

(Continued)

OTHER PUBLICATIONS

Intel, "Intel Xeon Phi Coprocessor Instruction Set Architecture Reference Manual", Sep. 7, 2012, pp. 2-725.*

(Continued)

*Primary Examiner* — Aimee Li
*Assistant Examiner* — Courtney P Carmichael-Moody
(74) *Attorney, Agent, or Firm* — Alliance IP, LLC

(57) ABSTRACT

A processor includes an execution unit to execute instructions to load indices from an array of indices, optionally perform scatters, and prefetch (to a specified cache) contents of target locations for future scatters from arbitrary locations in memory. The execution unit includes logic to load, for each target location of a scatter or prefetch operation, an index value to be used in computing the address in memory for the operation. The index value may be retrieved from an array of indices identified for the instruction. The execution unit includes logic to compute the addresses based on the sum of a base address specified for the instruction, the index value retrieved for the location, and a prefetch offset (for prefetch operations), with optional scaling. The execution unit includes logic to retrieve data elements from contiguous locations in a source vector register specified for the instruction to be scattered to the memory.

20 Claims, 32 Drawing Sheets

Operation of a LoadIndicesScatterAndPrefetch Instruction

(51) Int. Cl.
  *G06F 12/08* (2016.01)
  *G06F 12/0875* (2016.01)
  *G06F 12/0862* (2016.01)
  *G06F 9/345* (2018.01)
  *G06F 9/355* (2018.01)
  *G06F 9/35* (2018.01)

(52) U.S. Cl.
  CPC ...... *G06F 9/30043* (2013.01); *G06F 9/30047* (2013.01); *G06F 9/345* (2013.01); *G06F 9/3555* (2013.01); *G06F 9/383* (2013.01); *G06F 12/0862* (2013.01); *G06F 9/35* (2013.01); *G06F 2212/1016* (2013.01); *G06F 2212/452* (2013.01); *G06F 2212/6028* (2013.01)

(56) References Cited

U.S. PATENT DOCUMENTS

| | | | |
|---|---|---|---|
| 2003/0177315 A1* | 9/2003 | Hooker | G06F 9/30047 711/137 |
| 2007/0011442 A1 | 1/2007 | Hussain | |
| 2008/0091921 A1* | 4/2008 | Abuaiadh | G06F 9/30043 712/207 |
| 2008/0092125 A1 | 4/2008 | Archambault et al. | |
| 2009/0300324 A1 | 12/2009 | Inuo | |
| 2010/0115233 A1 | 5/2010 | Brewer et al. | |
| 2011/0153983 A1 | 6/2011 | Hughes et al. | |
| 2012/0060016 A1 | 3/2012 | Eichenberger et al. | |
| 2012/0144089 A1 | 6/2012 | Hall et al. | |
| 2012/0254591 A1* | 10/2012 | Hughes | G06F 9/30018 712/205 |
| 2013/0275729 A1 | 10/2013 | Abraham et al. | |
| 2013/0283018 A1 | 10/2013 | Ould-Ahmed-Vall et al. | |
| 2013/0326160 A1 | 12/2013 | Sperber et al. | |
| 2014/0108742 A1 | 4/2014 | Boettiger et al. | |
| 2014/0149713 A1 | 5/2014 | Jha | |
| 2014/0189321 A1 | 7/2014 | Uliel et al. | |
| 2015/0052333 A1 | 2/2015 | Hughes et al. | |
| 2015/0074373 A1 | 3/2015 | Sperber et al. | |
| 2015/0149731 A1 | 5/2015 | Auernhammer et al. | |
| 2015/0339233 A1* | 11/2015 | Kapil | G06F 12/0862 711/137 |
| 2015/0347475 A1 | 12/2015 | Kimura | |
| 2017/0177349 A1 | 6/2017 | Yount et al. | |
| 2017/0177360 A1 | 6/2017 | Gokhale et al. | |
| 2017/0177363 A1 | 6/2017 | Yount et al. | |

FOREIGN PATENT DOCUMENTS

| | | | | |
|---|---|---|---|---|
| WO | WO 2013180738 A1 * | 12/2013 | ......... | G06F 9/30145 |
| WO | WO 2014107148 A1 * | 7/2014 | ............ | G06F 12/02 |
| WO | 2017112171 A1 | 6/2017 | | |
| WO | 2017112175 A1 | 6/2017 | | |
| WO | 2017112176 A1 | 6/2017 | | |
| WO | 2017112246 A1 | 6/2017 | | |

OTHER PUBLICATIONS

International Search Report and Written Opinion for PCT Patent Application No. PCT/US2016/062688, dated Mar. 3, 2017; 13 pages.

Intel Corporation, IA-32 Intel® Architecture Software Developer's Manual—vol. 2: Instruction Set Reference, 978 pages, 2003.
ADDPS, Jul. 18, 2014, 2 pages, [retrieved from the internet on Mar. 29, 2018], retrieved from URL www.felixcloutier.com/x86/ADDPS.html.
Advisory Action of U.S. Appl. No. 14/977,445 dated May 18, 2018, 3 pages.
Barry O'Sullivan, CA1101: Lecture 39 The IDS level: addressing, Oct. 9, 2003, 6 pages, [retrieved from the internet on Apr. 2, 2018], retrieved from URL www.cs.ucc.ie/~osullb/cs1101/notes/old/notes39.pdf.
Bill Yi, Computer Architecture Memory, Aug. 1, 2010, 43 pages, [retrieved from the internet on Apr. 2, 2018], retrieved from URL www.cse.scu.edu/~xyi/coen210/notes/7_Memory.pdf.
Final Rejection of U.S. Appl. No. 14/977,356 dated May 31, 2018, 41 pages.
Final Rejection of U.S. Appl. No. 14/977,445 dated Apr. 12, 2018, 22 pages.
International Preliminary Report on Patentability in International Application No. PCT/US2016/062688 dated Jun. 26, 2018, 9 pages.
International Preliminary Report on Patentability in International Application No. PCT/US2016/062705 dated Jun. 26, 2018, 6 pages.
International Preliminary Report on Patentability in International Application No. PCT/US2016/062708 dated Jun. 26, 2018, 9 pages.
International Preliminary Report on Patentability in International Application No. PCT/US2016/063297 dated Jun. 28, 2018, 8 pages.
International Search Report and Written Opinion for PCT Patent Application No. PCT/US2016/062705, dated Mar. 6, 2017, 10 pages.
International Search Report and Written Opinion of the International Searching Authority dated Mar. 10, 2017, for PCT/US2016/063297, 13 pages.
International Search Report and Written Opinion of the PCT Patent Application No. PCT/US2016/062708, dated Feb. 20, 2017; 13 pages.
Non Final Rejection of U.S. Appl. No. 14/977,356 dated Nov. 30, 2017, 34 pages.
Non Final Rejection of U.S. Appl. No. 14/977,445 dated Sep. 19, 2017, 24 pages.
Non-Final Rejection of U.S. Appl. No. 14/979,231 dated Oct. 3, 2017, 11 pages.
Notice of Allowance and Fees Due U.S. Appl. No. 14/979,231 dated Apr. 20, 2018, 5 pages.
Zagha et al., "Radix Sort for Vector MultiProcessors," in Proceedings of the 1991 ACM/IEEE Conference on Supercomputing, pp. 712-721, ACM, 1991.
Non Final Rejection of U.S. Appl. No. 14/977,445 dated Mar. 14, 2019, 21 pages.
Non-Final Office Action in U.S. Appl. No. 14/977,356 dated Feb. 26, 2019 (59 pages).
EPO; Extended European Search Report issued in EP Application No. 16879662.1, dated Jul. 24, 2019; 6 pages.
USPTO; Final Office Action in U.S. Appl. No. 14/977,445 dated Aug. 14, 2019, 23 pages.
USPTO; Final Office Action in U.S. Appl. No. 14/977,356 dated Aug. 29, 2019, 64 pages.
EPO; Extended European Search Report issued in EP Patent Application No. 16879666.2, dated Oct. 7, 2019; 6 pages.

* cited by examiner

PACKED HALF

| 127 112 111 | 96 95 | 80 79 | 64 63 | 48 47 | 32 31 | 16 15 | 0 |
|---|---|---|---|---|---|---|---|
| HALF 7 | HALF 6 | HALF 5 | HALF 4 | HALF 3 | HALF 2 | HALF 1 | HALF 0 |

341

PACKED SINGLE

| 127 | 96 95 | 64 63 | 32 31 | 0 |
|---|---|---|---|---|
| SINGLE 3 | SINGLE 2 | SINGLE 1 | SINGLE 0 |

342

PACKED DOUBLE

| 127 | 64 63 | 0 |
|---|---|---|
| DOUBLE 1 | DOUBLE 0 |

```
   127    120 119   112 111   104 103                    24 23    16 15      8 7      0
  ┌─────────┬─────────┬─────────┬─────────────────┬──────────┬──────────┬──────────┐
  │bbbb bbbb│bbbb bbbb│bbbb bbbb│    •    •    •  │bbbb bbbb │bbbb bbbb │bbbb bbbb │
  └─────────┴─────────┴─────────┴─────────────────┴──────────┴──────────┴──────────┘
```
UNSIGNED PACKED BYTE REPRESENTATION 344

```
   127    120 119   112 111   104 103                    24 23    16 15      8 7      0
  ┌─────────┬─────────┬─────────┬─────────────────┬──────────┬──────────┬──────────┐
  │sbbb bbbb│sbbb bbbb│sbbb bbbb│    •    •    •  │sbbb bbbb │sbbb bbbb │sbbb bbbb │
  └─────────┴─────────┴─────────┴─────────────────┴──────────┴──────────┴──────────┘
```
SIGNED PACKED BYTE REPRESENTATION 345

```
   127                    112 111                                    16 15           0
  ┌───────────────────────┬─────────────────────────────────┬─────────────────────────┐
  │wwww wwww wwww wwww    │       •       •       •         │wwww wwww wwww wwww      │
  └───────────────────────┴─────────────────────────────────┴─────────────────────────┘
```
UNSIGNED PACKED WORD REPRESENTATION 346

```
   127                    112 111                                    16 15           0
  ┌───────────────────────┬─────────────────────────────────┬─────────────────────────┐
  │swww wwww wwww wwww    │       •       •       •         │swww wwww wwww wwww      │
  └───────────────────────┴─────────────────────────────────┴─────────────────────────┘
```
SIGNED PACKED WORD REPRESENTATION 347

```
   127                                    92 91   32 31                                0
  ┌─────────────────────────────────────────┬────────┬─────────────────────────────────────┐
  │dddd dddd dddd dddd dddd dddd dddd dddd  │ • • •  │dddd dddd dddd dddd dddd dddd dddd dddd│
  └─────────────────────────────────────────┴────────┴─────────────────────────────────────┘
```
UNSIGNED PACKED DOUBLEWORD REPRESENTATION 348

```
   127                                    92 91   32 31                                0
  ┌─────────────────────────────────────────┬────────┬─────────────────────────────────────┐
  │sddd dddd dddd dddd dddd dddd dddd dddd  │ • • •  │sddd dddd dddd dddd dddd dddd dddd dddd│
  └─────────────────────────────────────────┴────────┴─────────────────────────────────────┘
```
SIGNED PACKED DOUBLEWORD REPRESENTATION 349

| bits | 511 | 256 255 | 128 127 | 0 |
|---|---|---|---|---|
| | ZMM0 | YMM0 | XMM0 | |
| | ZMM1 | YMM1 | XMM1 | |
| | ZMM2 | YMM2 | XMM2 | |
| | ZMM3 | YMM3 | XMM3 | |
| | ZMM4 | YMM4 | XMM4 | |
| | ZMM5 | YMM5 | XMM5 | |
| | ZMM6 | YMM6 | XMM6 | |
| | ZMM7 | YMM7 | XMM7 | |
| | ZMM8 | YMM8 | XMM8 | |
| | ZMM9 | YMM9 | XMM9 | |
| | ZMM10 | YMM10 | XMM10 | |
| | ZMM11 | YMM11 | XMM11 | |
| | ZMM12 | YMM12 | XMM12 | |
| | ZMM13 | YMM13 | XMM13 | |
| | ZMM14 | YMM14 | XMM14 | |
| | ZMM15 | YMM15 | XMM15 | |
| | ZMM16 | YMM16 | XMM16 | |
| | ZMM17 | YMM17 | XMM17 | |
| | ZMM18 | YMM18 | XMM18 | |
| | ZMM19 | YMM19 | XMM19 | |
| | ZMM20 | YMM20 | XMM20 | |
| | ZMM21 | YMM21 | XMM21 | |
| | ZMM22 | YMM22 | XMM22 | |
| | ZMM23 | YMM23 | XMM23 | |
| | ZMM24 | YMM24 | XMM24 | |
| | ZMM25 | YMM25 | XMM25 | |
| | ZMM26 | YMM26 | XMM26 | |
| | ZMM27 | YMM27 | XMM27 | |
| | ZMM28 | YMM28 | XMM28 | |
| | ZMM29 | YMM29 | XMM29 | |
| | ZMM30 | YMM30 | XMM30 | |
| | ZMM31 | YMM31 | XMM31 | |

Operation of a LoadIndicesAndPrefetchScatter instruction

Operation of a LoadIndicesScatterAndPrefetch instruction

US 10,509,726 B2

INSTRUCTIONS AND LOGIC FOR LOAD-INDICES-AND-PREFETCH-SCATTERS OPERATIONS

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Instructions as they are received on a processor may be decoded into terms or instruction words that are native, or more native, for execution on the processor. Processors may be implemented in a system on chip. Indirect read and write accesses to memory by way of indices stored in arrays may be used in cryptography, graph traversal, sorting, and sparse matrix applications.

DESCRIPTION OF THE FIGURES

Embodiments are illustrated by way of example and not limitation in the Figures of the accompanying drawings:

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

FIG. 20 is a block diagram illustrating an example extended vector register file, in accordance with embodiments of the present disclosure;

DETAILED DESCRIPTION

Figure 1A:
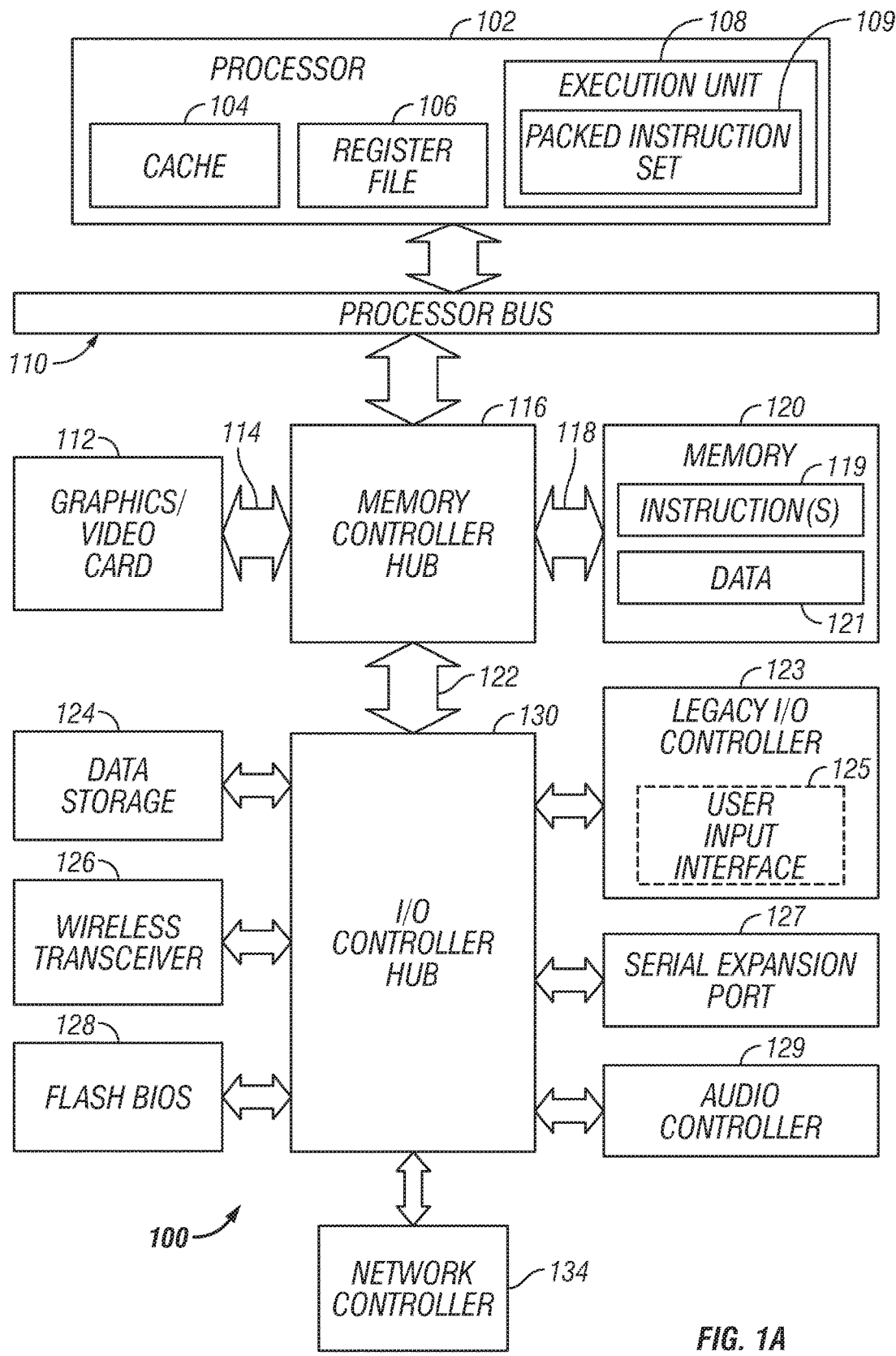
FIG. 1A is a block diagram of an exemplary computer system formed with a processor that may include execution units to execute an instruction, in accordance with embodiments of the present disclosure.

The following description describes instructions and processing logic for performing load indices from an array of indices and prefetch from locations in sparse memory based on those indices, taking ownership of the locations in memory for a subsequent scatter on a processing apparatus. Such a processing apparatus may include an out-of-order processor. In the following description, numerous specific details such as processing logic, processor types, microarchitectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.). reg In one embodiment, destination and source isters/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
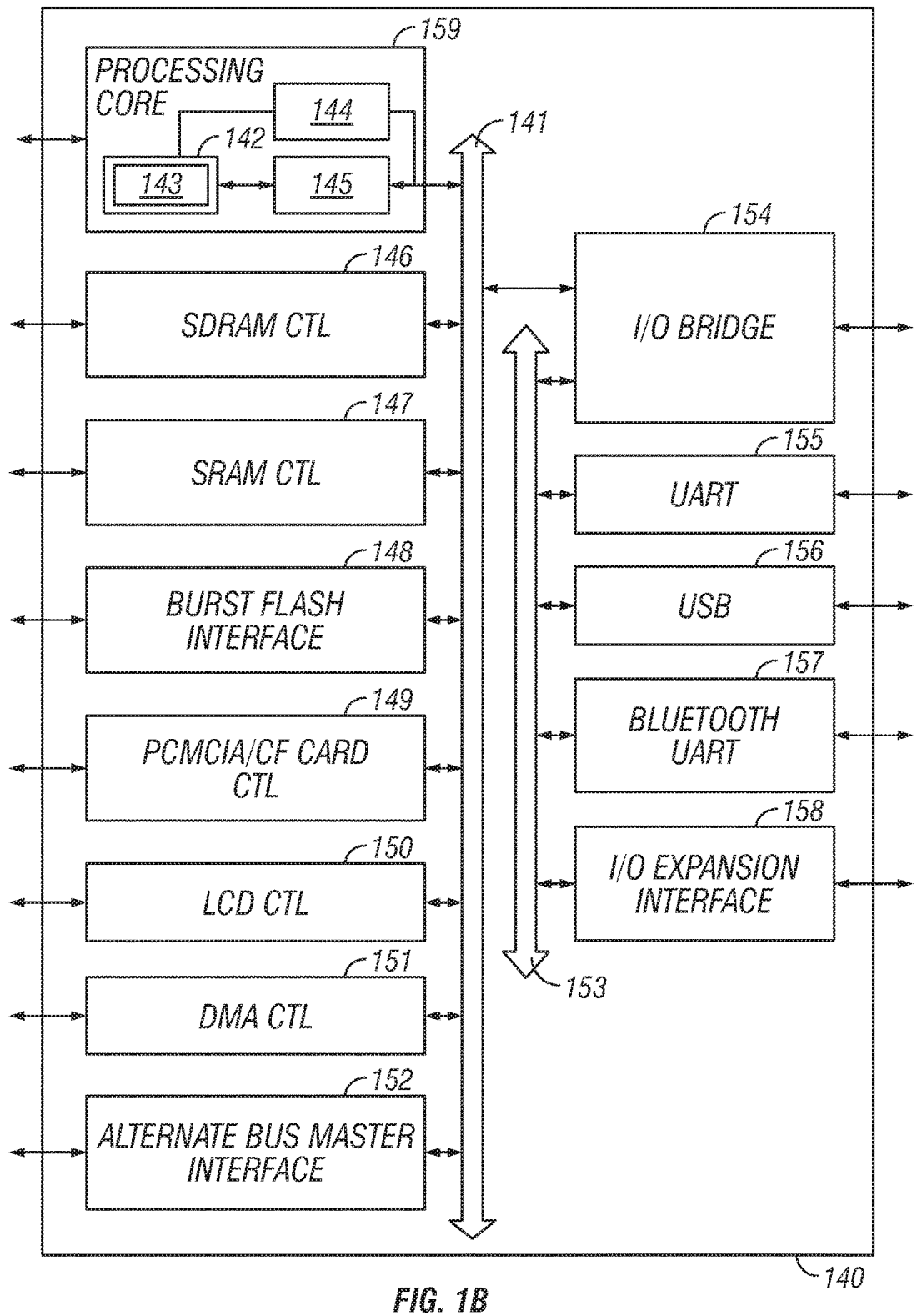
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
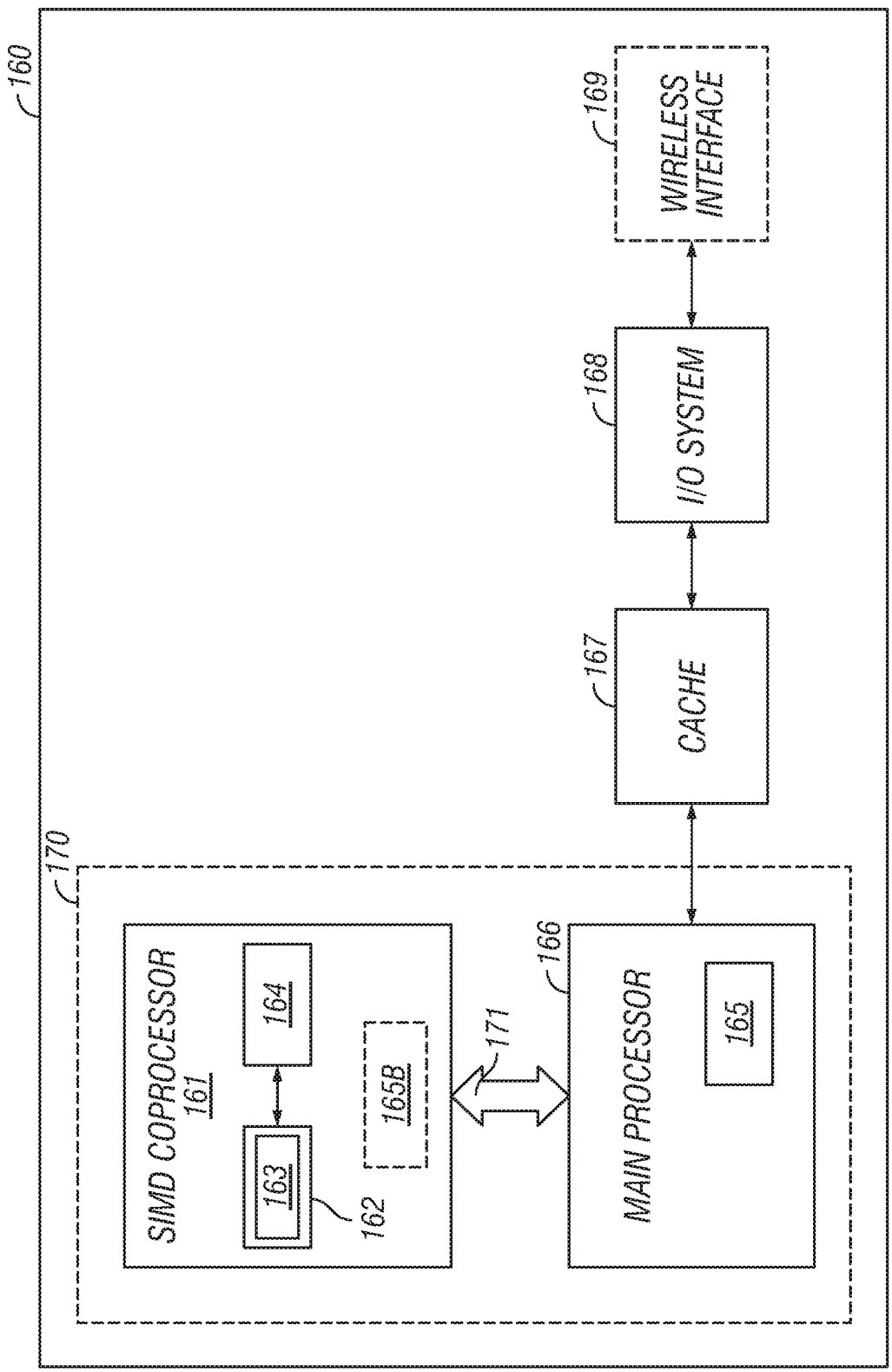
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
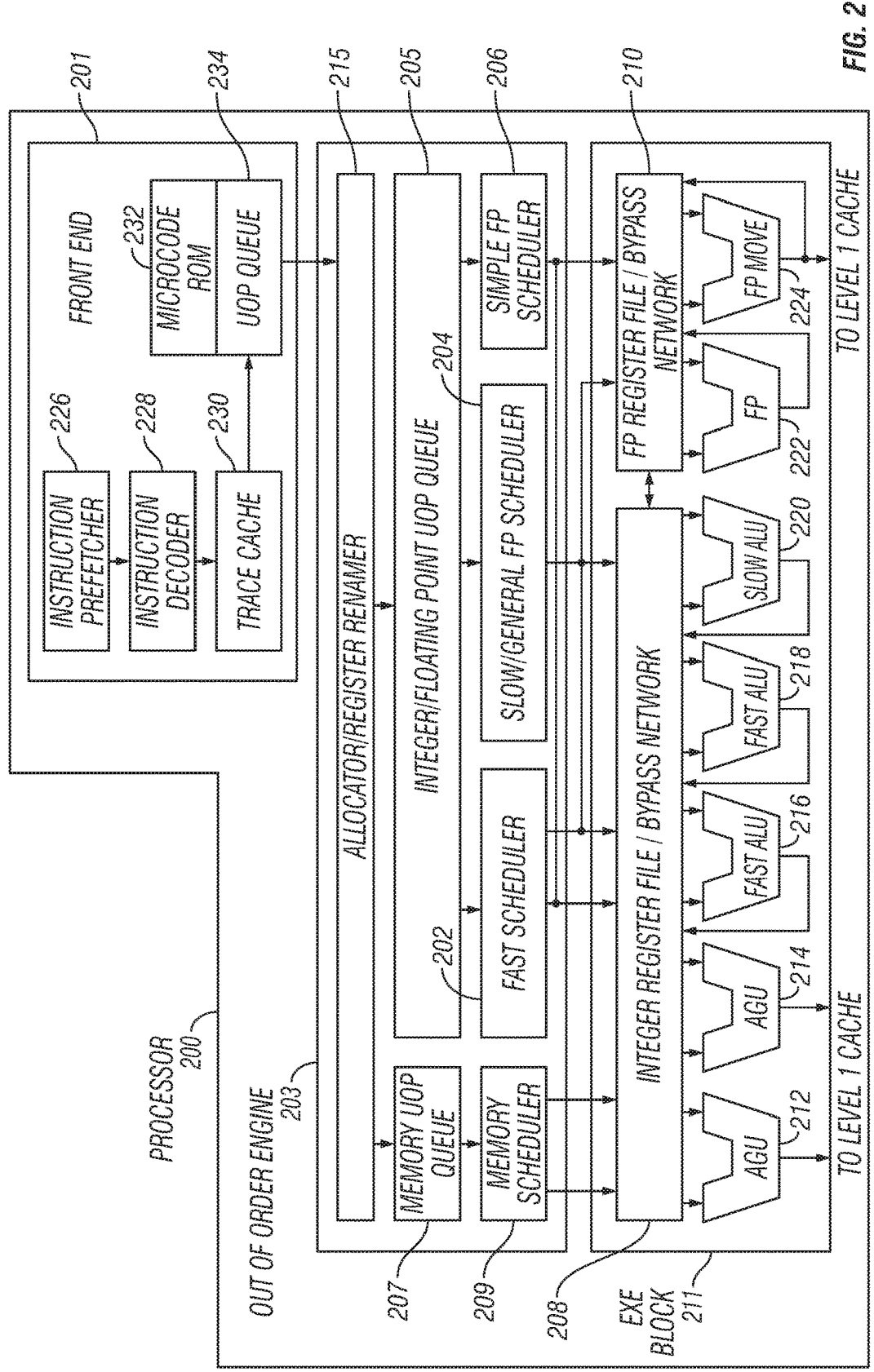
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
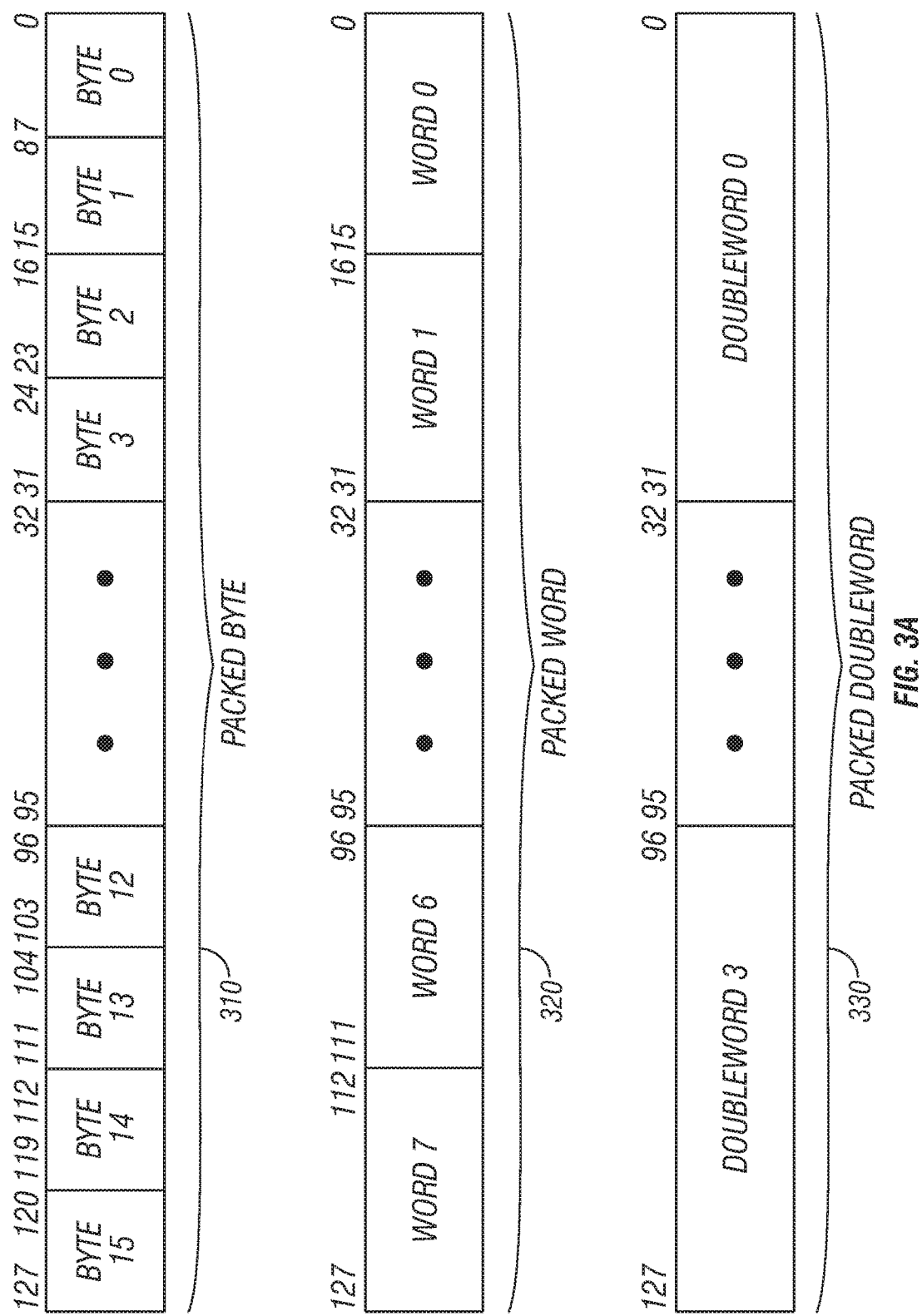
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figures 3D, 3E, 3F:
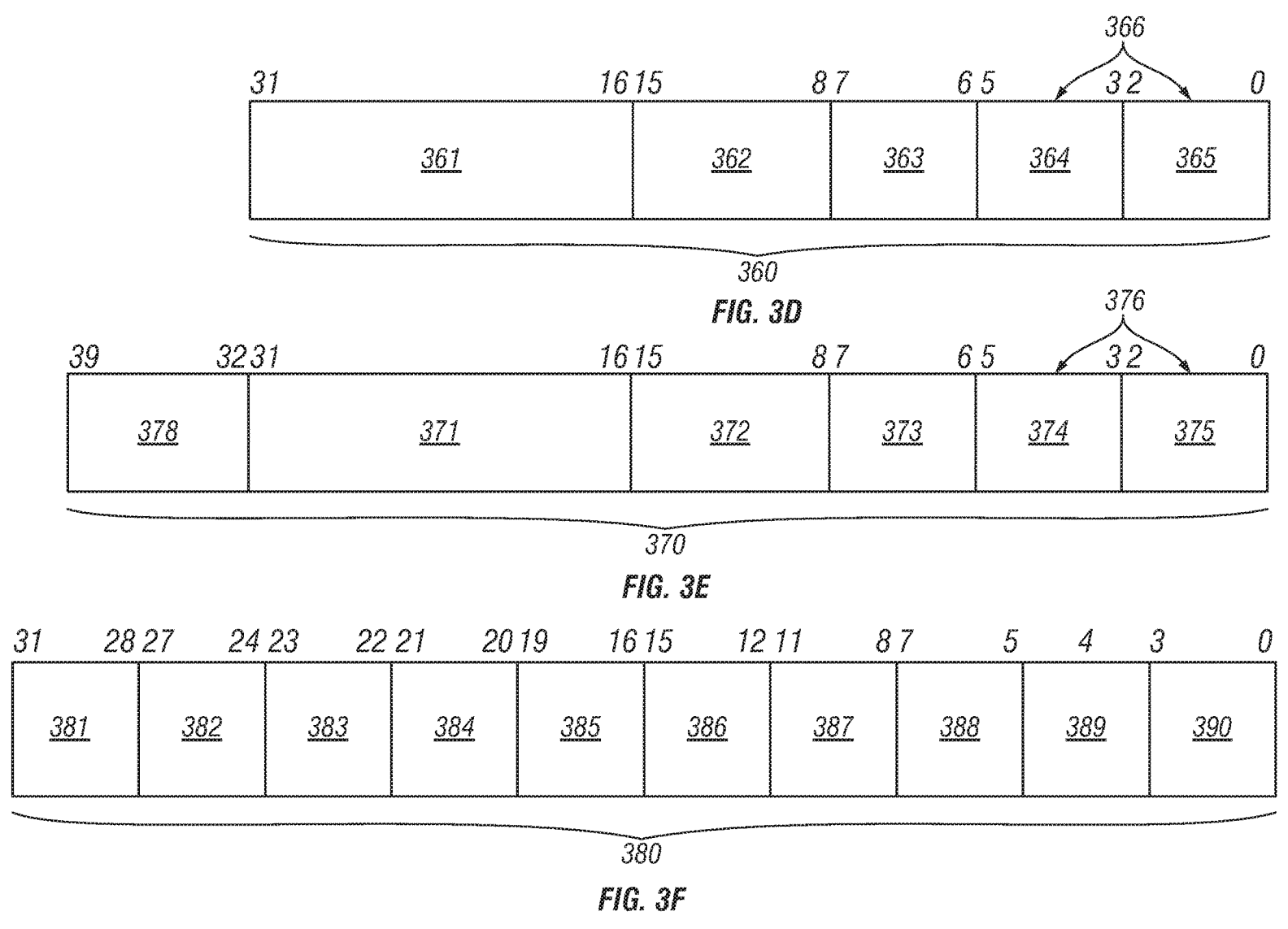

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel. com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
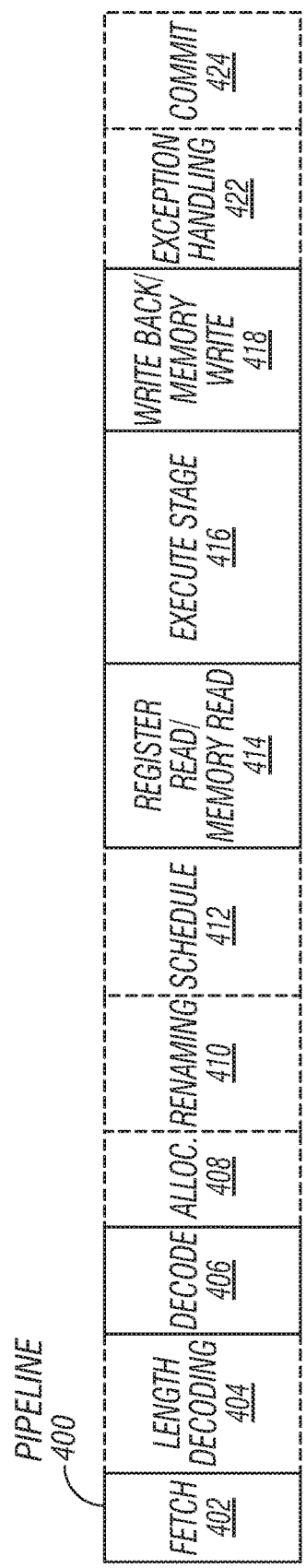
FIG. 4A is a block diagram illustrating an in-order pipeline and a register renaming stage, out-of-order issue/execution pipeline, in accordance with embodiments of the present disclosure.
Figure 4B:
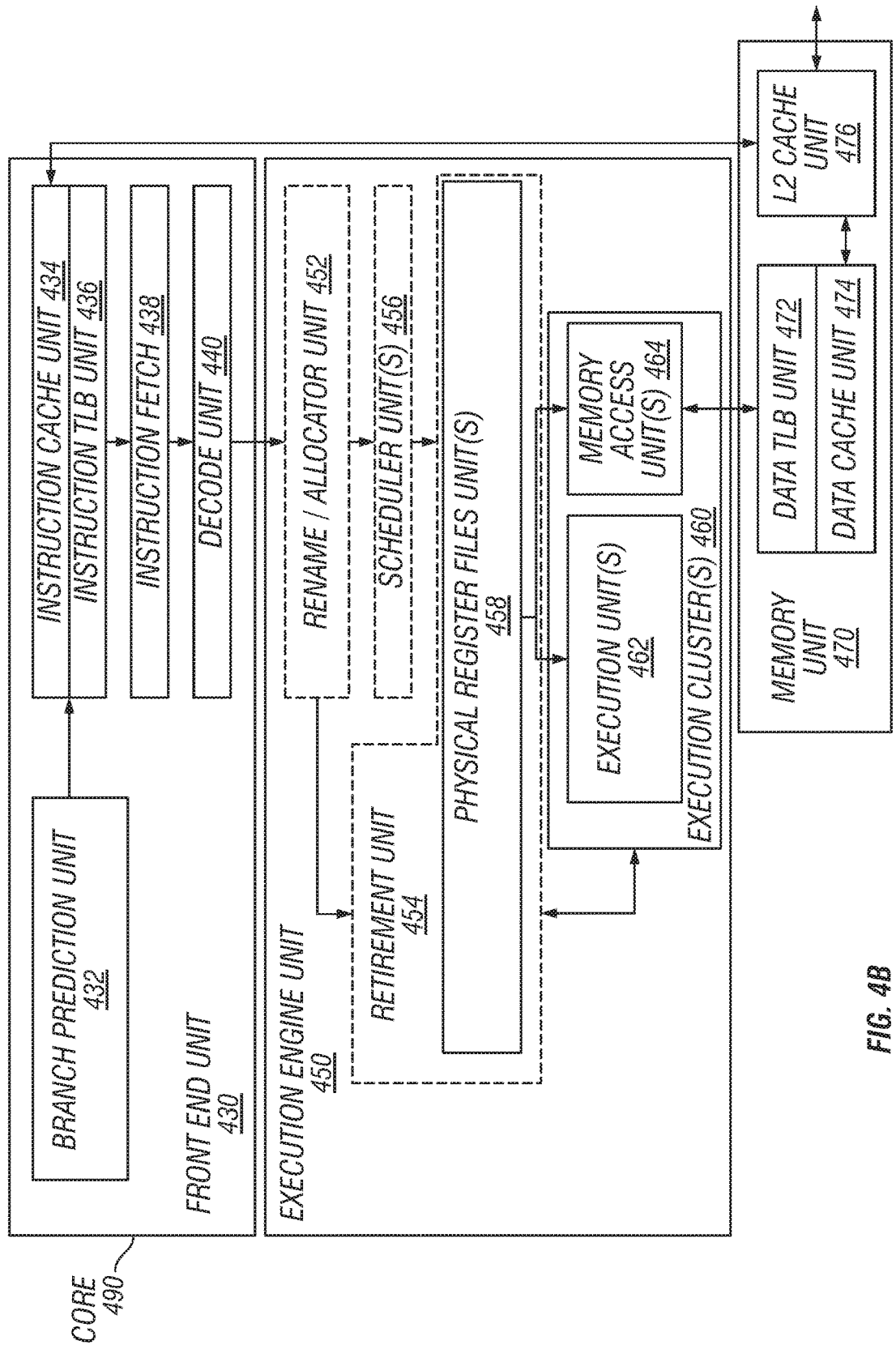
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
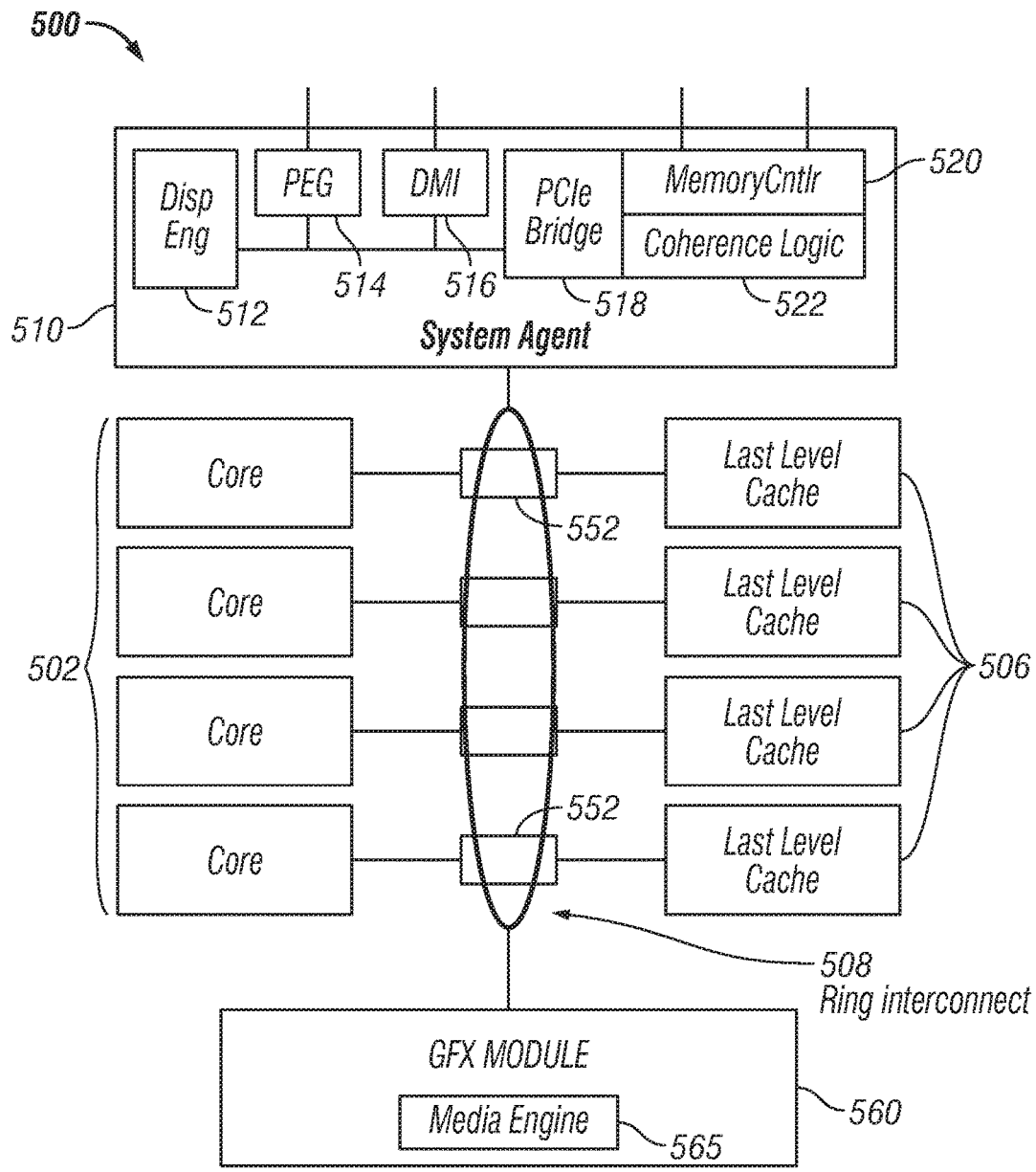
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
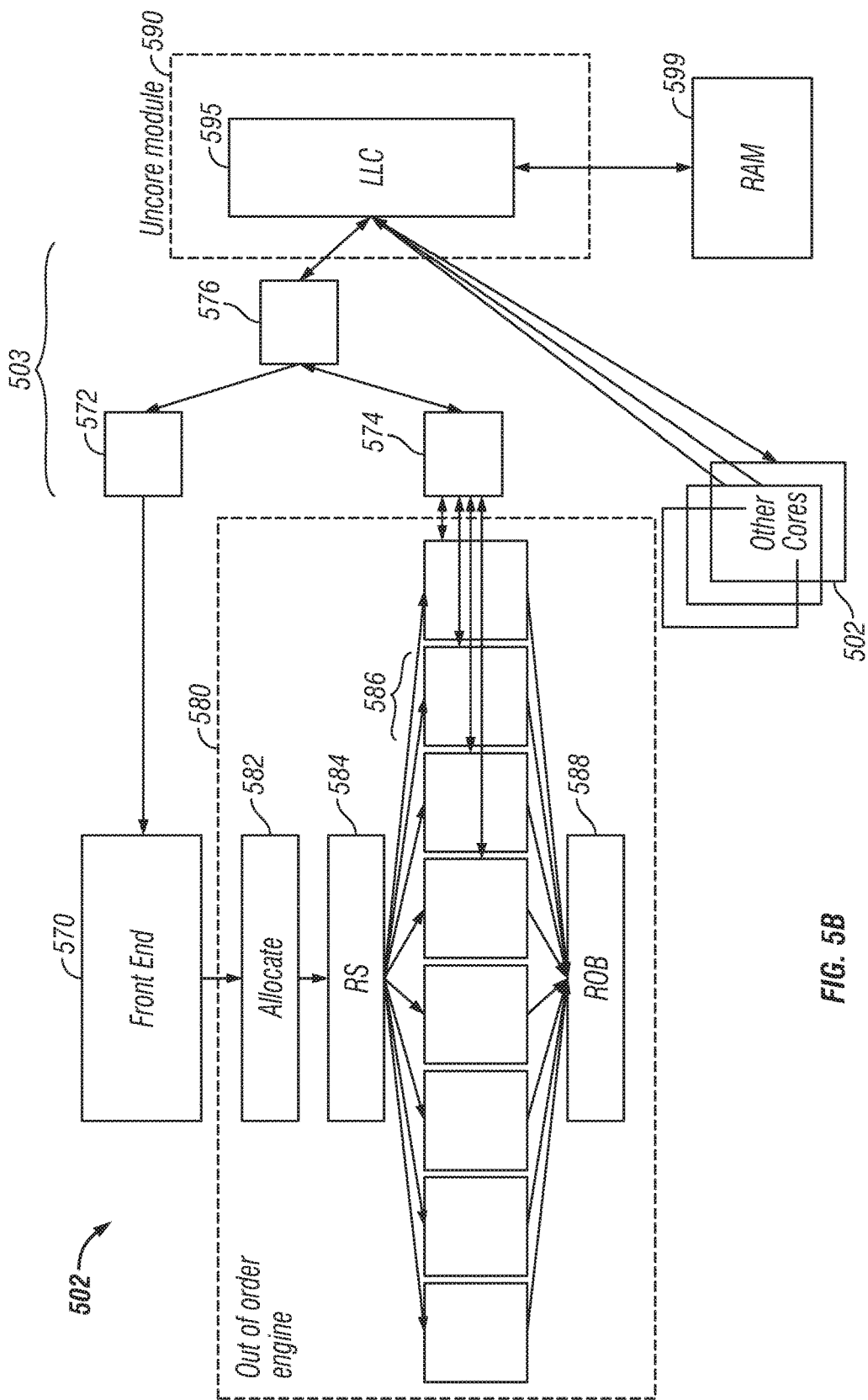
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
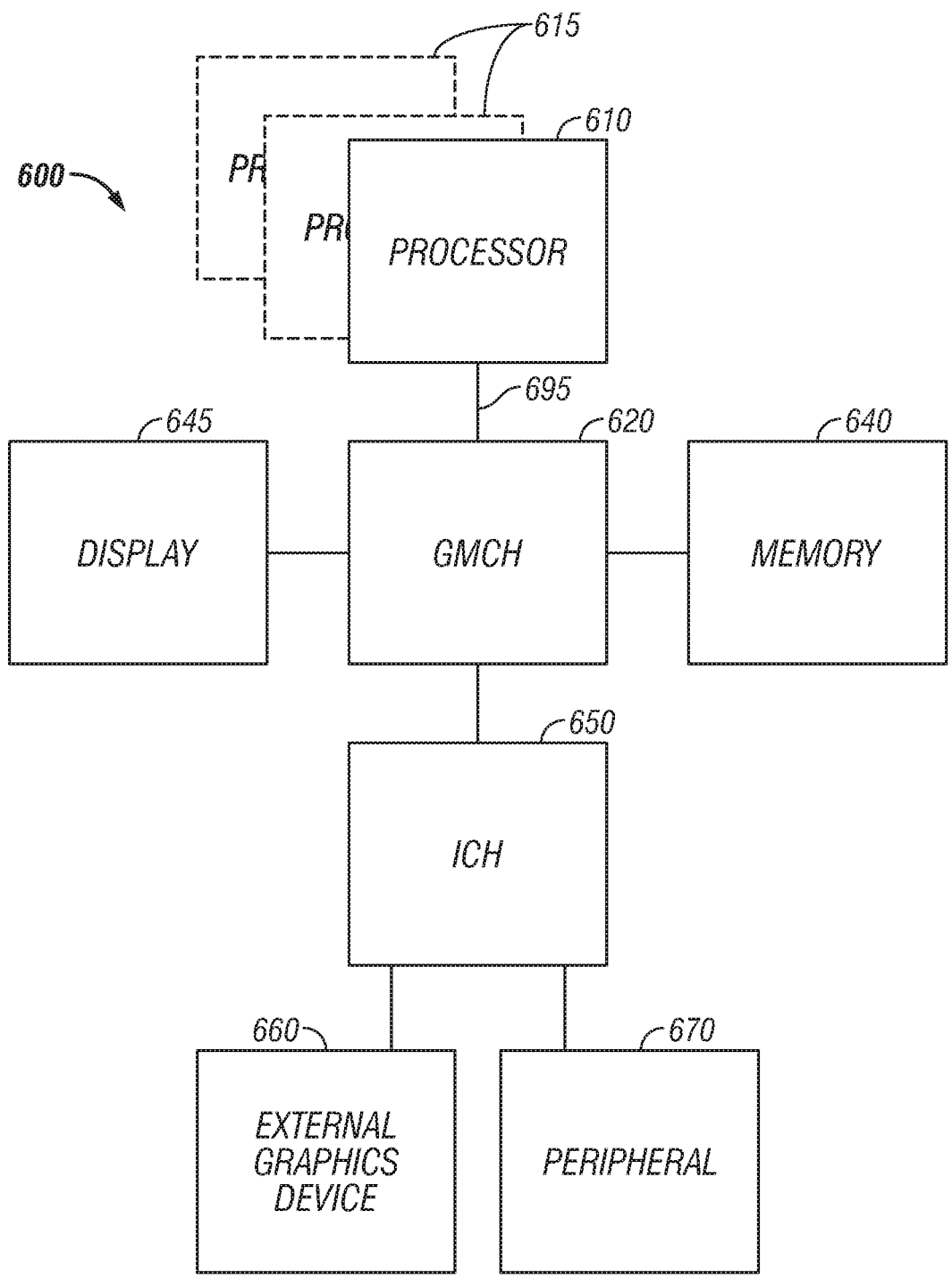
FIG. 6 is a block diagram of a system, in accordance with embodiments of the present disclosure.
Figure 7:
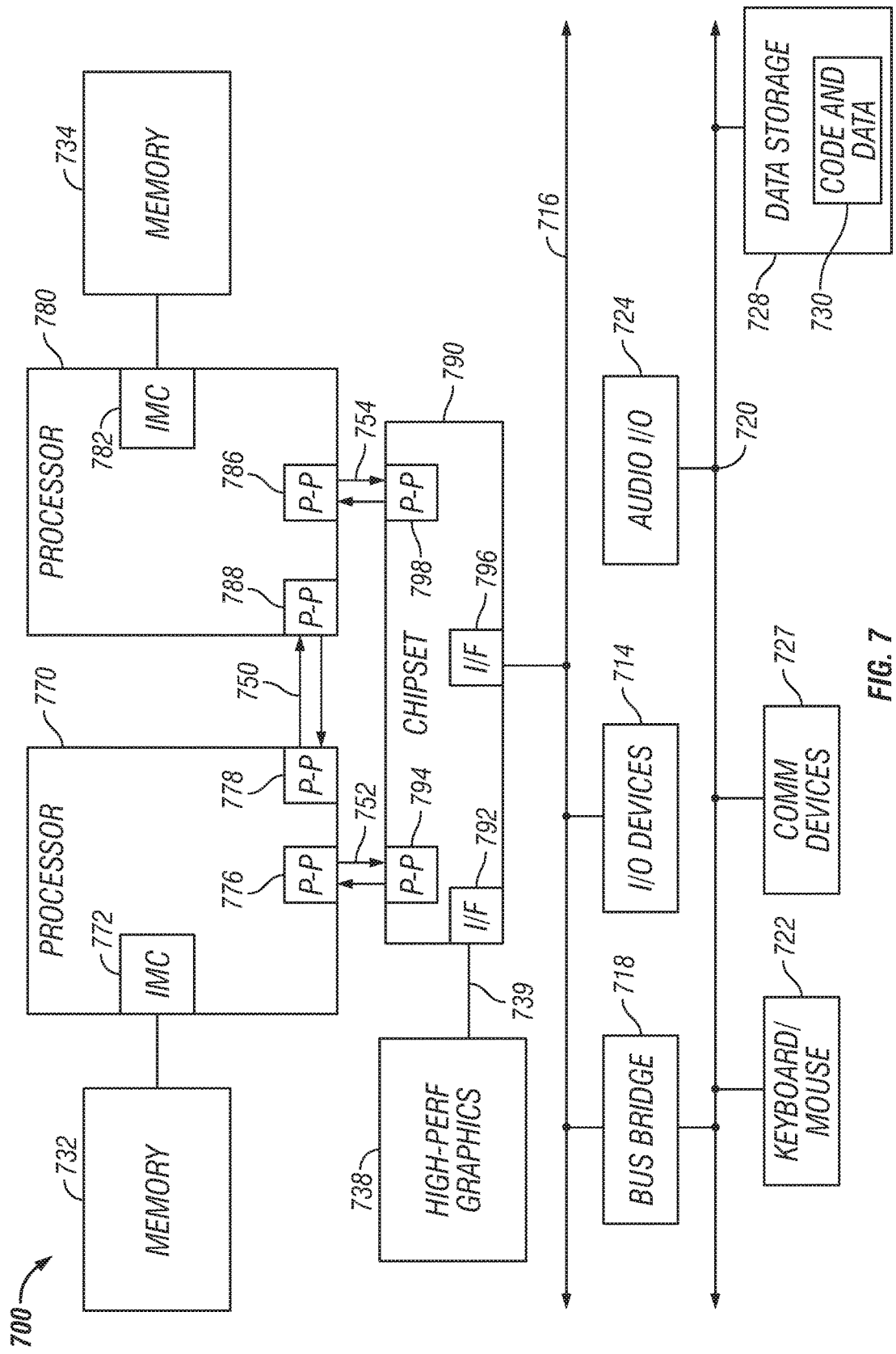
FIG. 7 is a block diagram of a second system, in accordance with embodiments of the present disclosure.
Figure 8:
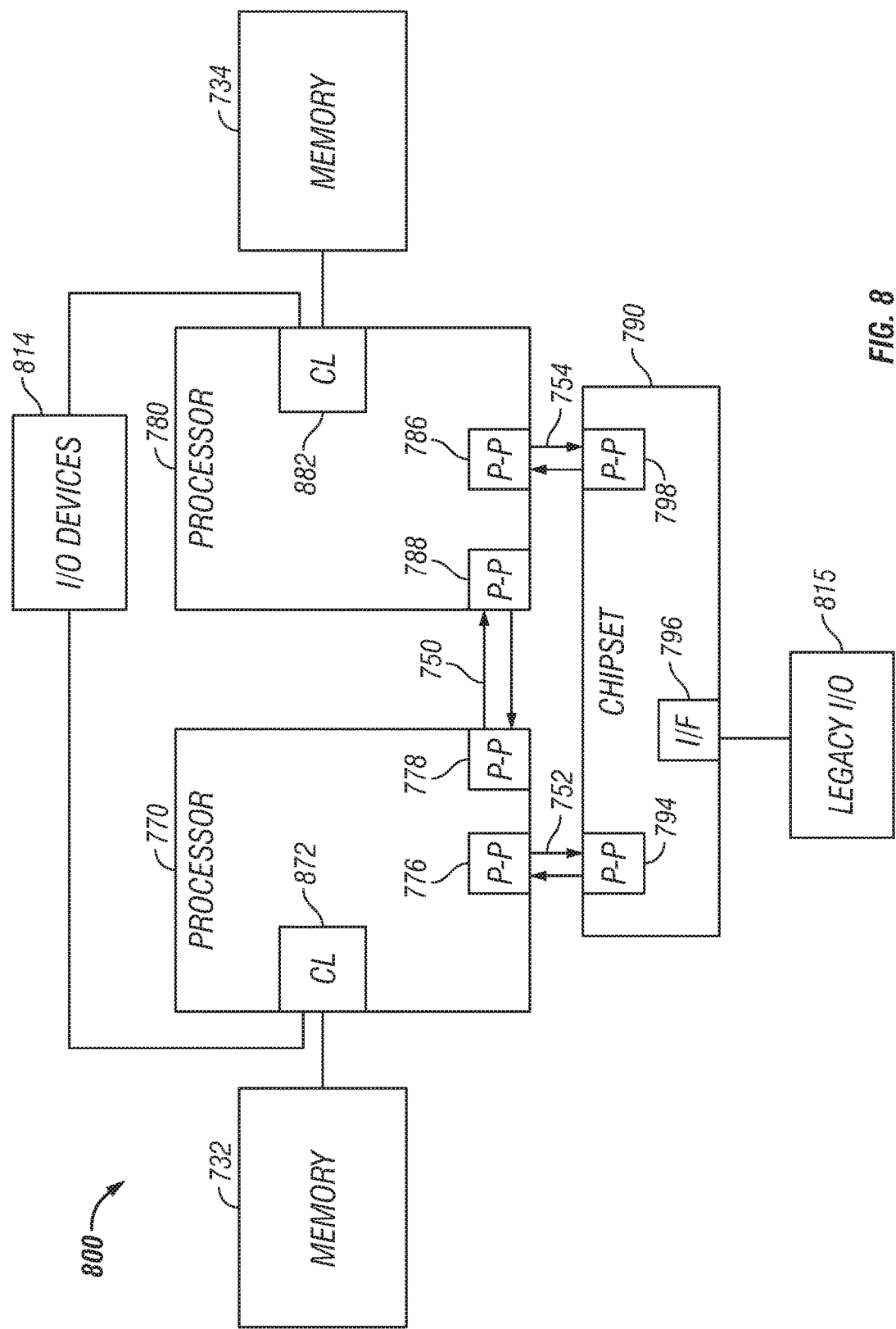
FIG. 8 is a block diagram of a third system in accordance with embodiments of the present disclosure.
Figure 9:
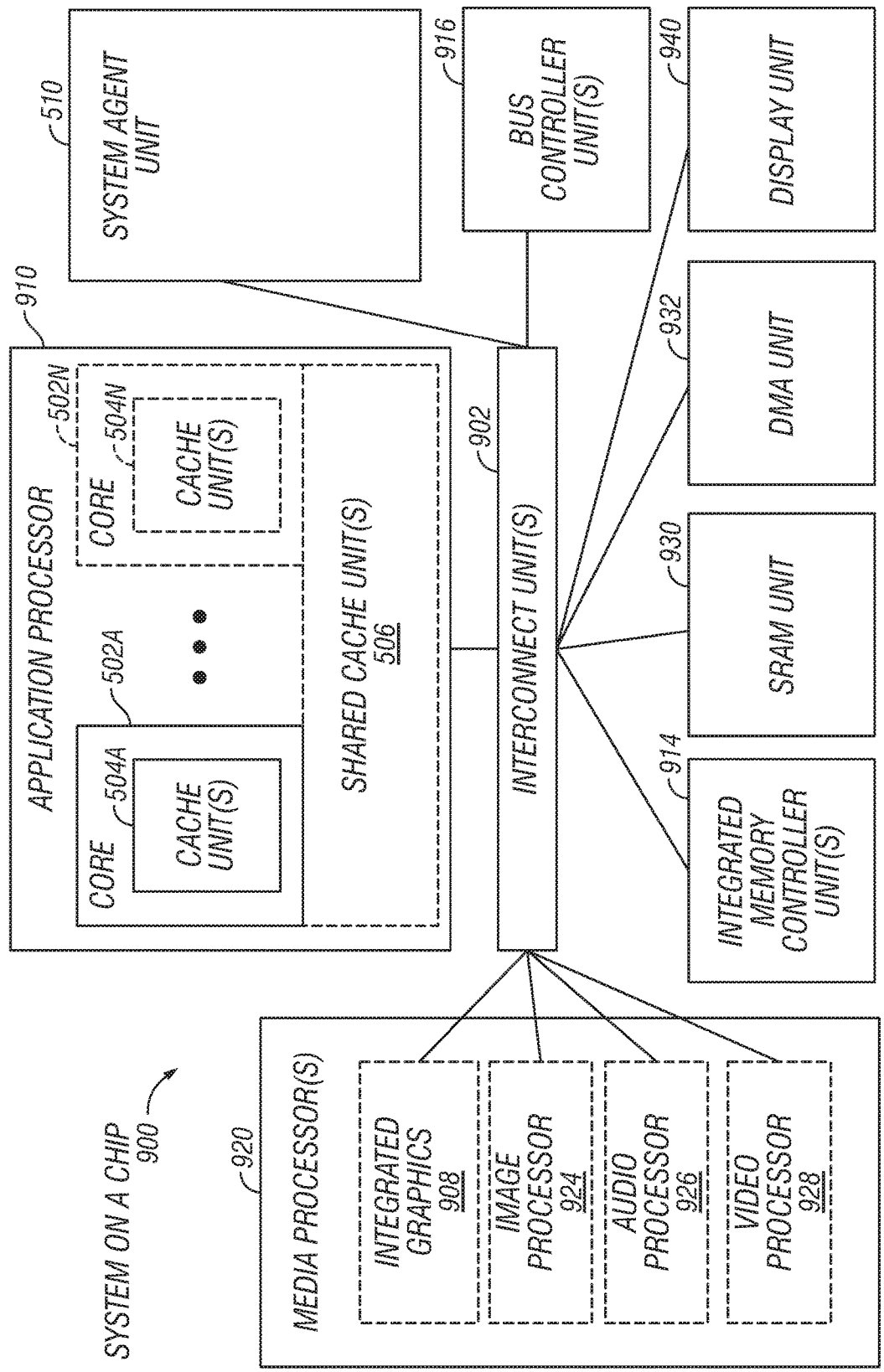
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 510; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
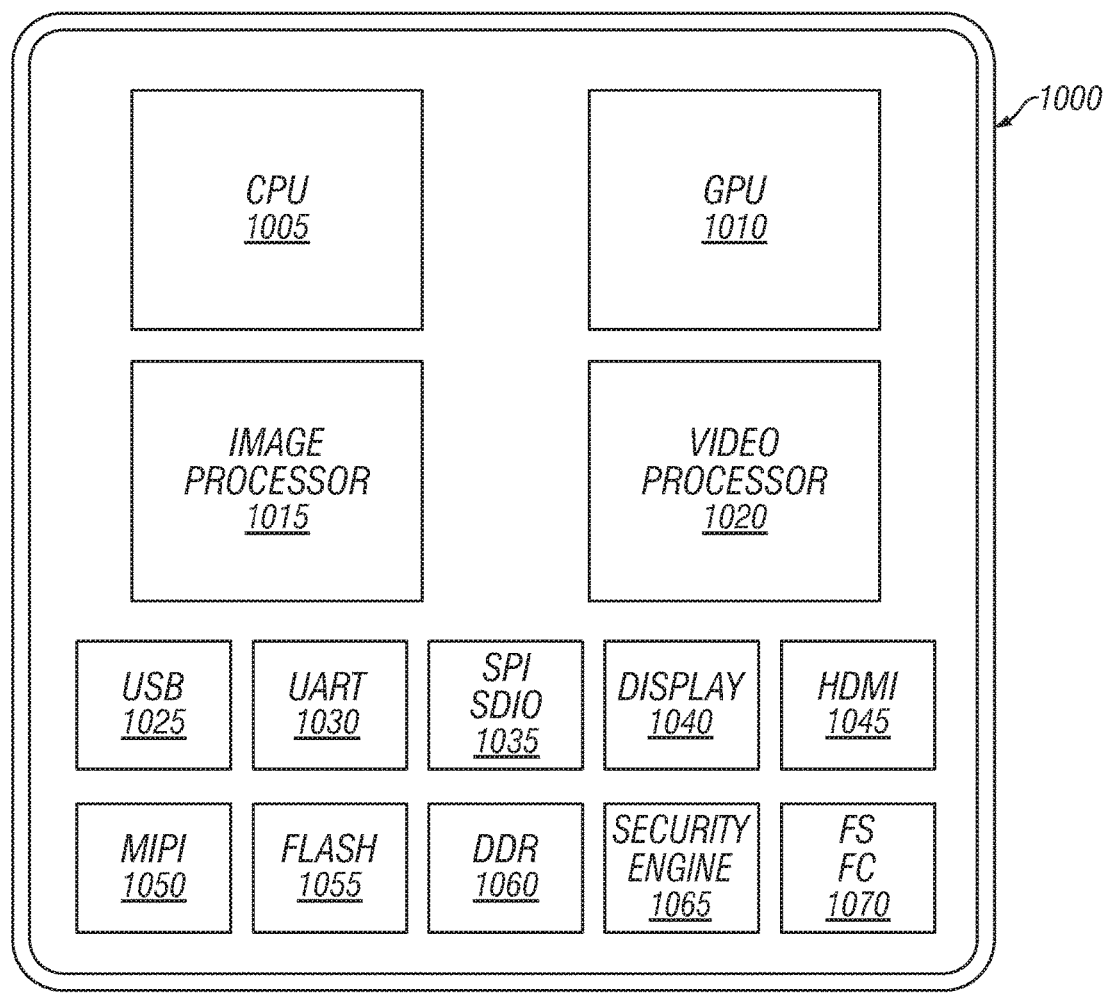
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I$^2$S/I$^2$C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
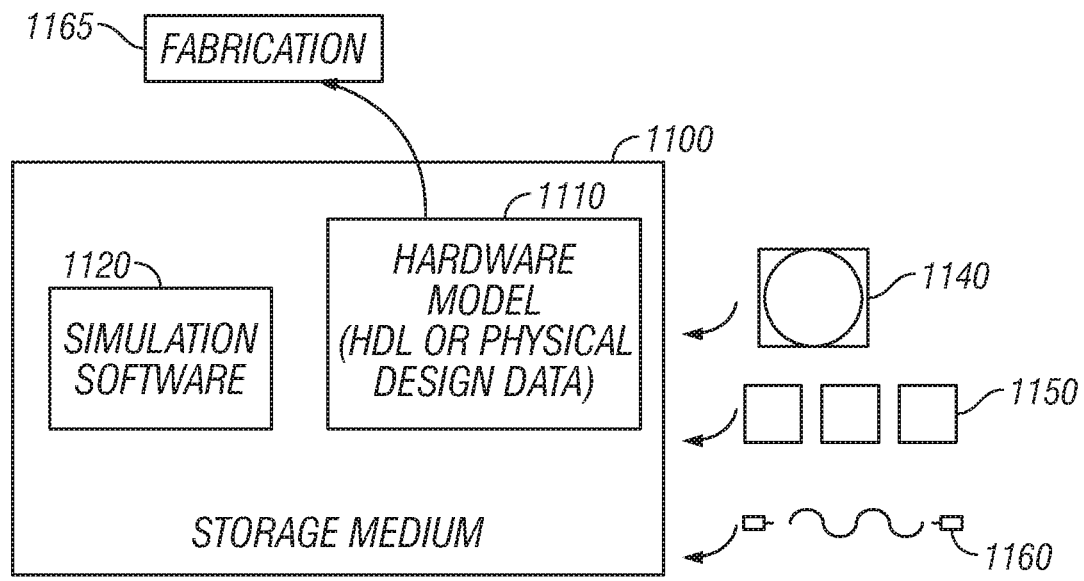
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
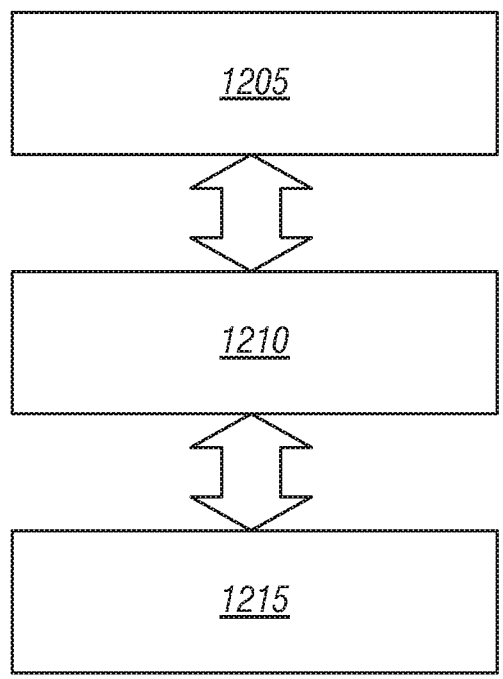
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
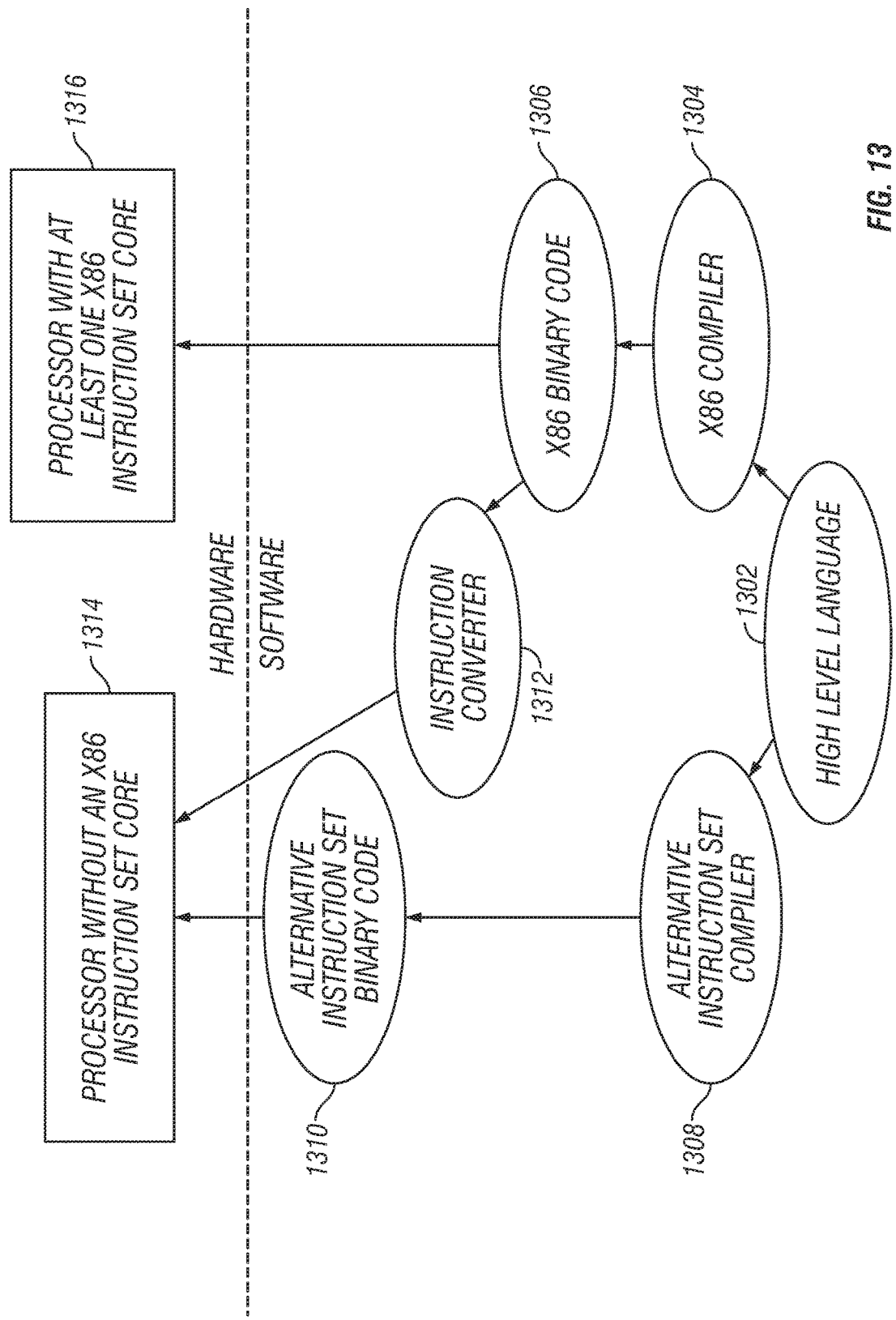
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. X86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
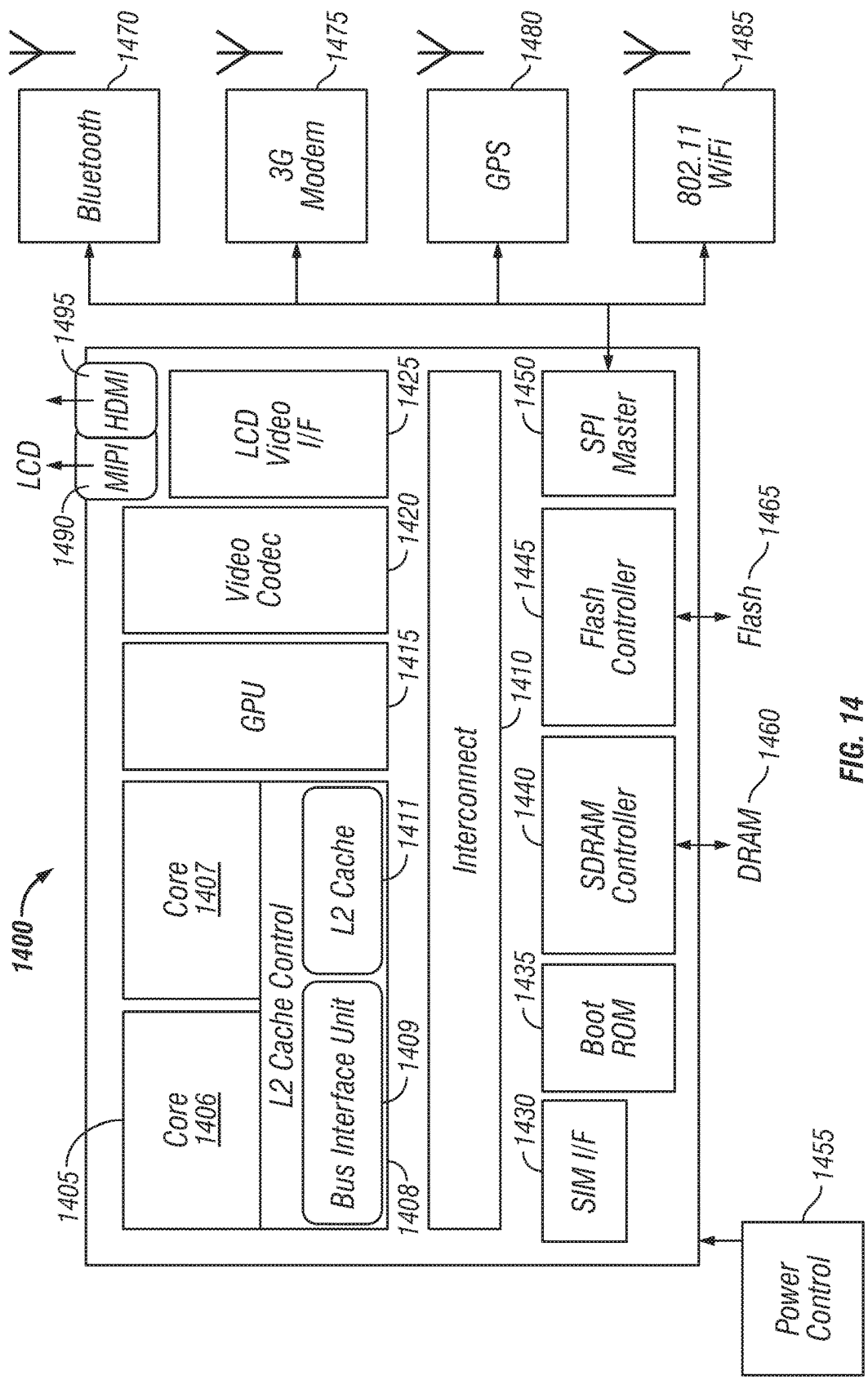
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
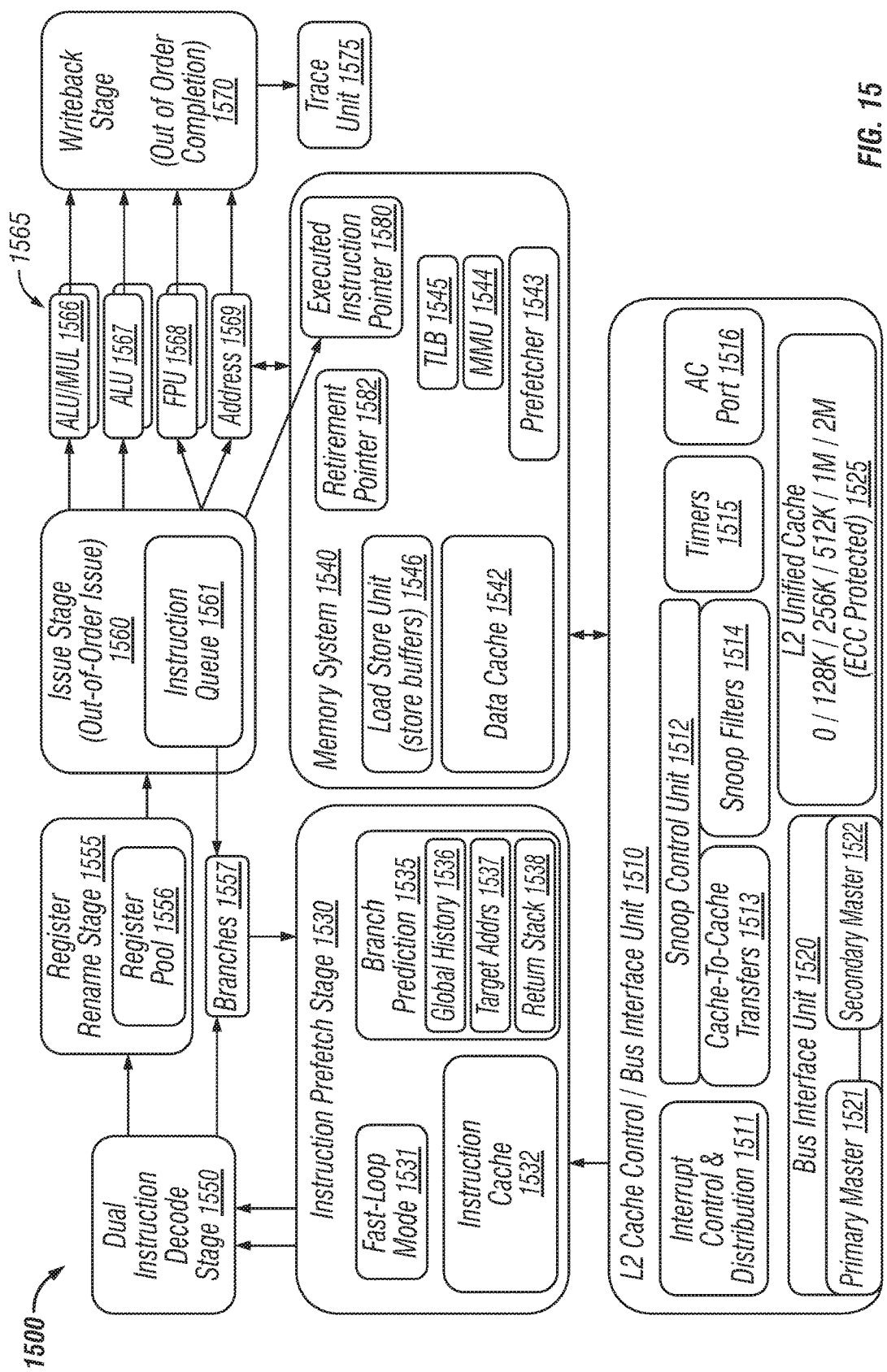
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128k, 256k, 512k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
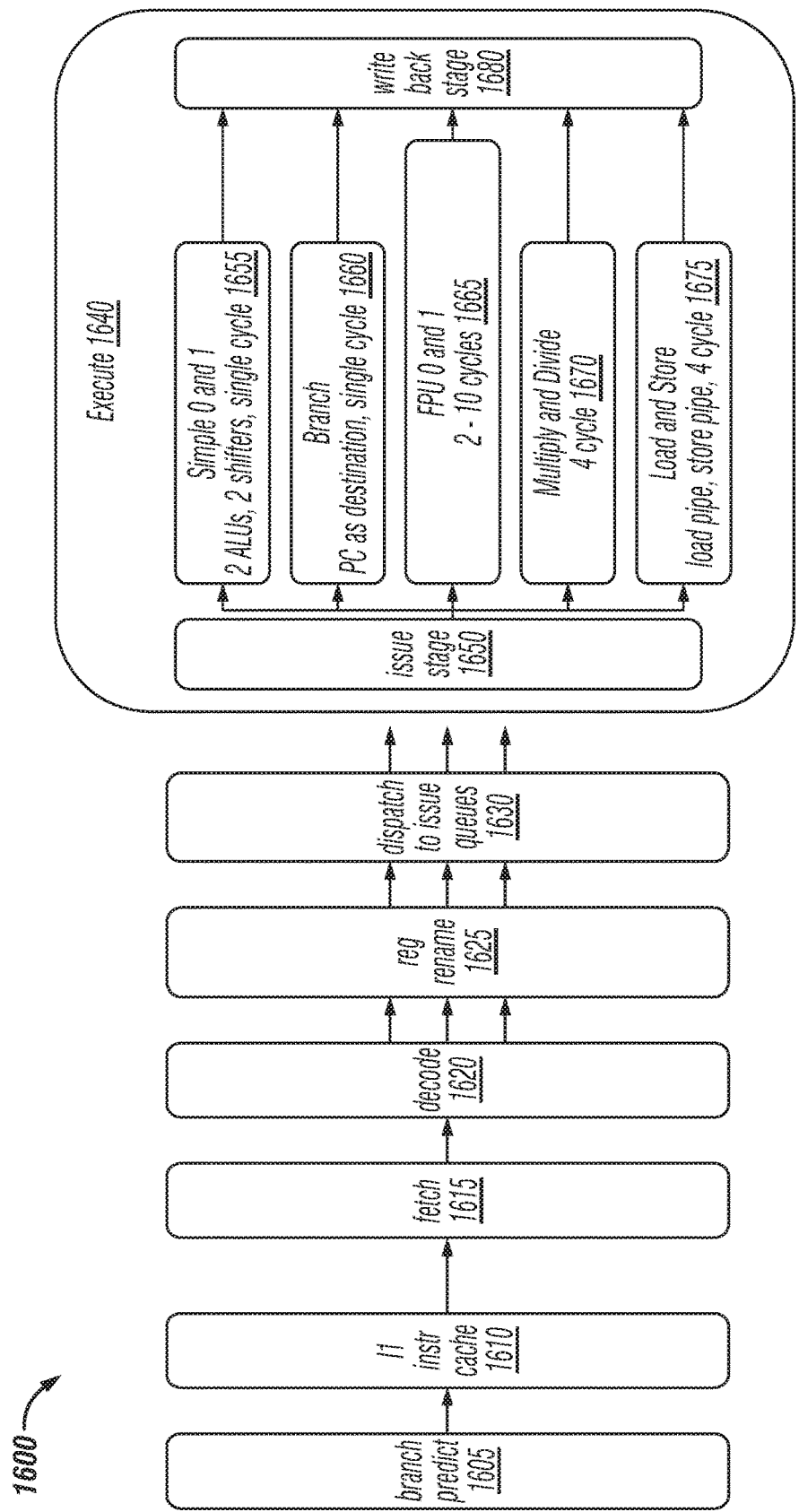
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
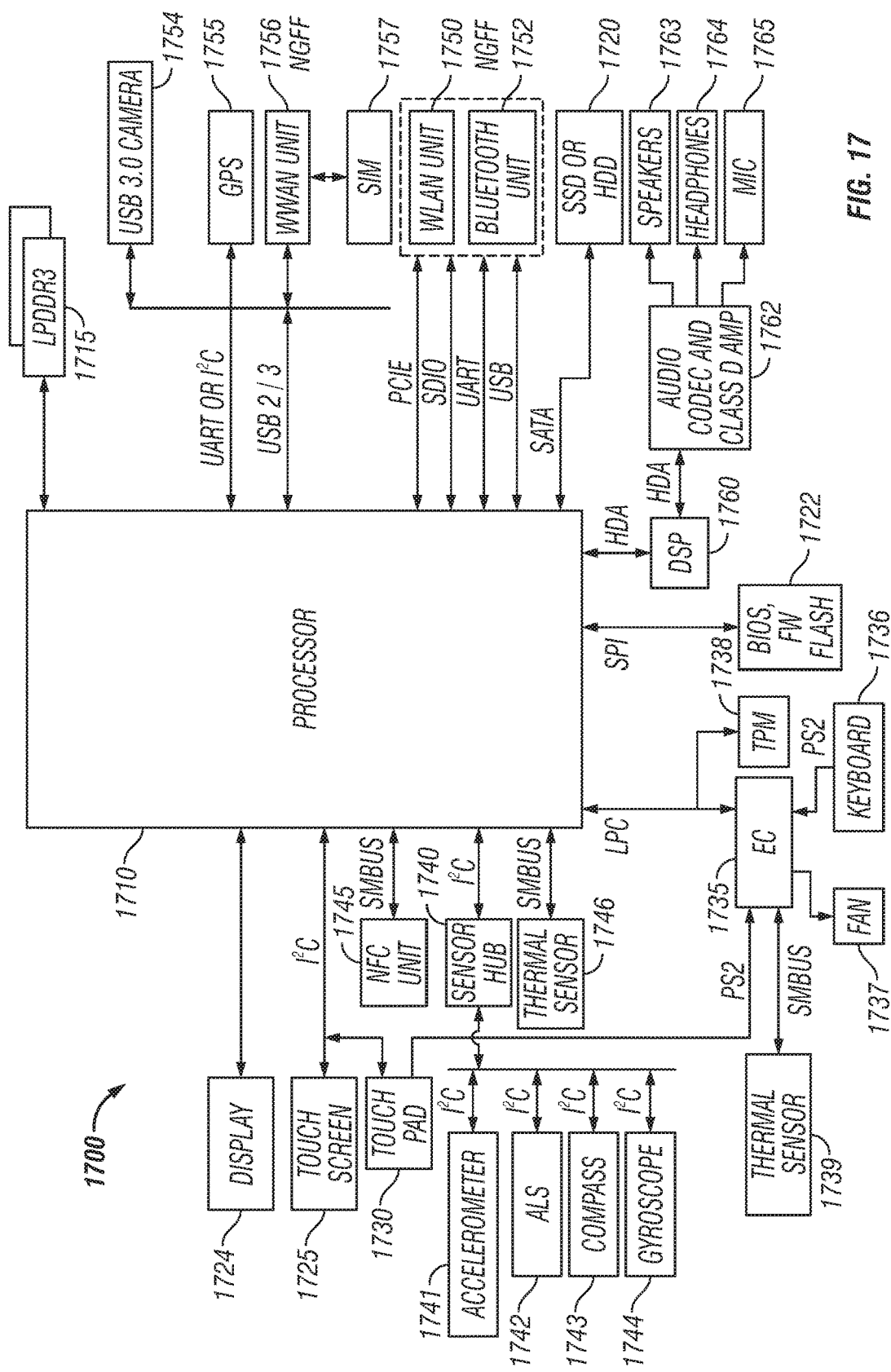
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as $I^2C$ bus, system management bus (SMBus), low pin count (LPC) bus, SPI, high definition audio (HDA) bus, Serial Advance Technology Attachment (SATA)

bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1775, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
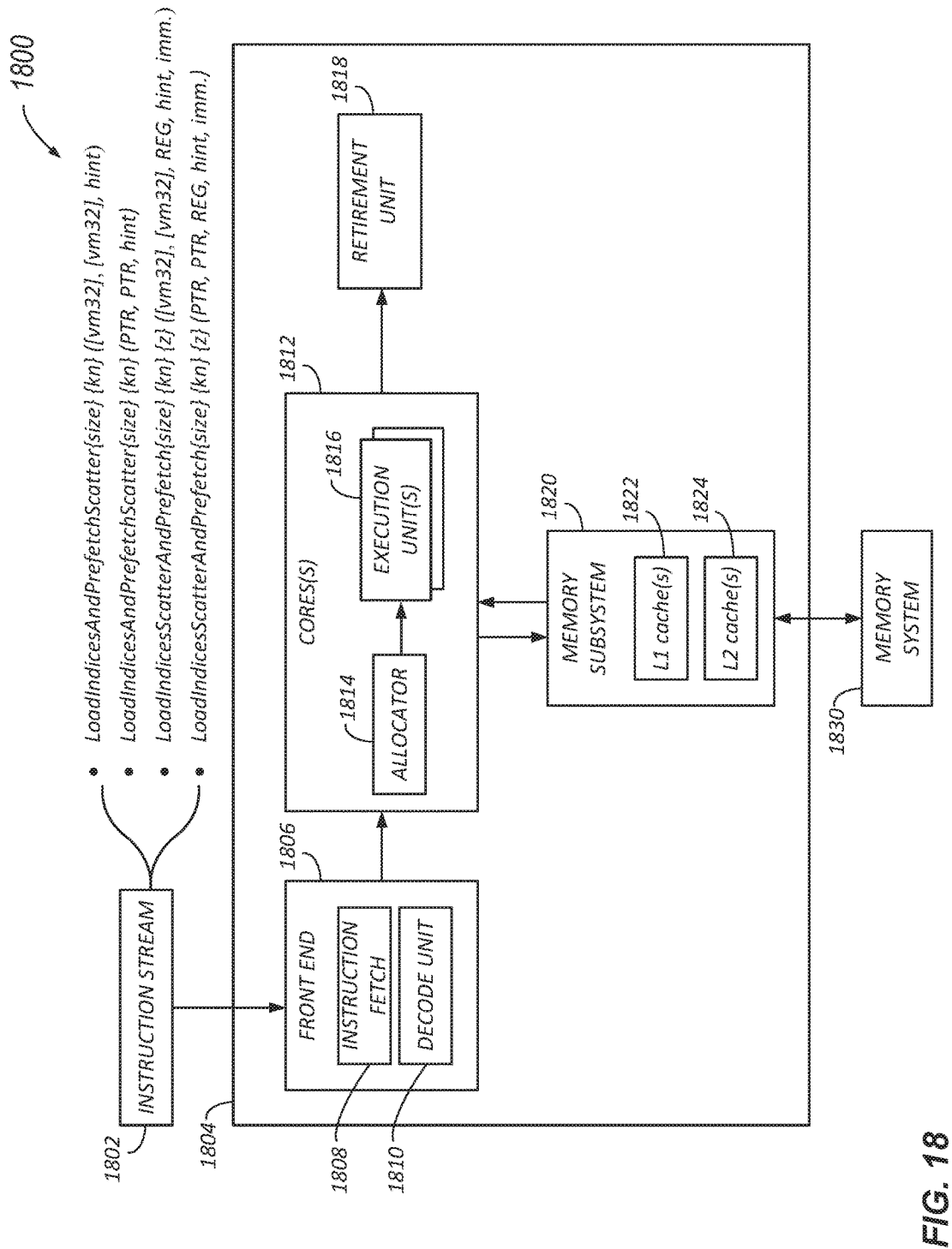
FIG. 18 is an illustration of an example system for instructions and logic for vector operations to load indices from an array of indices and prefetch from locations in sparse memory based on those indices, taking ownership of the locations in memory for a subsequent scatter, in accordance with embodiments of the present disclosure.

Embodiments of the present disclosure involve instructions and processing logic for executing one or more vector operations that target vector registers, at least some of which operate to access memory locations using index values retrieved from an array of indices. FIG. 18 is an illustration of an example system 1800 for instructions and logic for vector operations to load indices from an array of indices and prefetch from locations in memory based on those indices, taking ownership of the locations in memory for a subsequent scatter on a processing apparatus. In one embodiment, a single vector operation may load indices from an array of indices, scatter one or more elements to locations in memory based on those indices, and prefetch from other locations in the memory based on those indices, taking ownership of the other locations in memory for a subsequent scatter.

A scatter operation may, in general, perform a sequence of memory write accesses to addresses that are computed according to the contents of a base address register, an index register, and/or a scaling factor that are specified by (or encoded in) the instruction. For example, a cryptography, graph traversal, sorting, or sparse matrix application may include one or more instructions to load an index register with a sequence of index values and one or more other instructions to perform scattering data elements to locations that are indirectly addressed using those index values. Scatter operations may walk through memory in an irregular fashion, scattering data elements to locations whose addresses are not sequential and that do not necessarily follow a consistent pattern. For example, a repeating sequence of instructions may write a data element to location 0, then write a data element to location 1000, then write a data element to location 723, and then write a data element to location 50000. In this type of application, memory locations whose contents are prefetched by a traditional hardware prefetecher in order to take ownership of those locations may no longer be held in the cache with ownership by the time they are accessed by the sequence of instructions, if they are accessed at all.

In embodiments of the present disclosure, the Load-Indices-and-Prefetch-Scatters type instructions described herein may load the indices needed for a subsequent operation and prefetch data elements for the subsequent scatter operation. This may include, for each data element to be prefetched from a location in memory, retrieving an index value from a particular position in an array of indices in memory whose base address is specified for the instruction, computing the address in memory from which the data element is to be prefetched, prefetching the contents of the location at the computed address, and writing the prefetched contents to a cache that is identified in the instruction using a cache hint. The prefetch may be performed using a read-for-ownership access. The address of the data element to be prefetched may be computed based on a base address specified for the instruction and the index value retrieved from the array of indices. Some Load-Indices-and-Prefetch-Scatters type instructions may also retrieve data elements for a current scatter operation from a source vector register identified for the instruction and store them to a location in memory that is based on a different index value retrieved from the array of indices. For example, a LoadIndicesScatterAndPrefetch instruction may—in addition to prefetching data elements for subsequent scatter operations—load indices for a current scatter operation based on index values stored sequentially in the array of indices, retrieve data elements to be scattered from a source vector register, and store the data elements to locations in the memory that indirectly addressed using those index values. The data elements that are prefetched for subsequent scatter operations may be indirectly accessed by index values in the array of indices at a fixed distance from the index elements that indirectly address the data elements for the current scatter operation. In embodiments of the present disclosure, various forms of Load-Indices-and-Prefetch-Scatters type instructions may be used to scatter and/or prefetch data elements in applications in which the data elements are stored in random order in memory. For example, the data elements may be stored as elements of a sparse array.

In embodiments of the present disclosure, encodings of the extended vector instructions may include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular locations in memory are calculated. For example, the base address may be the address of the first location in a block of locations to which data elements are to be scattered or prefetched are stored. In another example, the base address may be the address of the first location in a block of locations in which data elements to be prefetched are stored. In one embodiment, an SIB type memory operand may include an encoding identifying an array of indices in memory. Each element of the array may specify an index or offset value usable to compute, from the base address, an address of a respective location within a block of locations to which data elements are to be scattered. In one embodiment, an SIB type memory operand may include an encoding specifying a scaling factor to be applied to each index value when computing a respective destination address. For example, if a scaling factor value of four is encoded in the SIB type memory operand, each index value obtained from an element of the array of indices may be multiplied by four and then added to the base address to compute an address at which a data element is to be scattered.

In one embodiment, an SIB type memory operand of the form vm32{x,y,z} may identify a vector array of memory operands specified using SIB type memory addressing. In this example, the array of memory addresses are specified using a common base register, a constant scaling factor, and a vector index register containing individual elements, each of which is a 32-bit index value. The vector index register may be an XMM register (vm32x), a YMM register (vm32y), or a ZMM register (vm32z). In another embodiment, an SIB type memory operand of the form vm64{x,y,z} may identify a vector array of memory operands specified using SIB type memory addressing. In this example, the array of memory addresses are specified using a common base register, a constant scaling factor, and a vector index register containing individual elements, each of which is a 64-bit index value. The vector index register may be an XMM register (vm64x), a YMM register (vm64y) or a ZMM register (vm64z).

System 1800 may include a processor, SoC, integrated circuit, or other mechanism. For example, system 1800 may include processor 1804. Although processor 1804 is shown and described as an example in FIG. 18, any suitable mechanism may be used. Processor 1804 may include any suitable mechanisms for executing vector operations that target vector registers, including those that operate to access memory locations using index values retrieved from an array of indices. In one embodiment, such mechanisms may be implemented in hardware. Processor 1804 may be implemented fully or in part by the elements described in FIGS. 1-17.

Instructions to be executed on processor 1804 may be included in instruction stream 1802. Instruction stream 1802 may be generated by, for example, a compiler, just-in-time interpreter, or other suitable mechanism (which might or might not be included in system 1800), or may be designated by a drafter of code resulting in instruction stream 1802. For example, a compiler may take application code and generate executable code in the form of instruction stream 1802. Instructions may be received by processor 1804 from instruction stream 1802. Instruction stream 1802 may be loaded to processor 1804 in any suitable manner. For example, instructions to be executed by processor 1804 may be loaded from storage, from other machines, or from other memory, such as memory system 1830. The instructions may arrive and be available in resident memory, such as RAM, wherein instructions are fetched from storage to be executed by processor 1804. The instructions may be fetched from resident memory by, for example, a prefetcher or fetch unit (such as instruction fetch unit 1808).

In one embodiment, instruction stream 1802 may include an instruction to perform a vector operation to load indices from an array of indices and prefetch from locations in sparse memory based on those indices, taking ownership of the locations in memory for a subsequent scatter. For example, in one embodiment, instruction stream 1802 may include one or more "LoadIndicesAndPrefetchScatter" type instructions to load, for each data element that may potentially be scattered during a subsequent scatter operation, an index value to be used in computing the address in memory at which the data element is to be scattered, and to prefetch the contents at the computed address into a cache using a read-for-ownership access. The address may be computed based on the sum of a base address that is specified for the instruction and the index value retrieved from an array of indices that is identified for the instruction, with or without scaling.

In one embodiment, instruction stream 1802 may include one or more "LoadIndicesScatterAndPrefetch" type instructions to load, for each data element to be scattered, an index value to be used in computing the addresses in memory at which the data element is to be scattered, to retrieve the data element from a source vector register identified for the instruction, and to store the data element in the memory at the computed address. The address may be computed based on the sum of a base address that is specified for the instruction and the index value retrieved from an array of indices that is identified for the instruction, with or without scaling. The data elements to be scattered by the instruction may be stored in contiguous locations in the source vector register. In one embodiment, each "LoadIndicesScatterAndPrefetch" type instruction may also be used to load, for each data element that may potentially be scattered during a subsequent scatter operation, an index value to be used in computing the address in memory at which the data element is to be prefetched, and to prefetch the contents at the computed address into a cache using a read-for-ownership access. The address may be computed based on the sum of a base address that is specified for the instruction and the index value retrieved for the data element to be prefetched, with or without scaling. Note that instruction stream 1802 may include instructions other than those that perform vector operations.

Processor 1804 may include a front end 1806, which may include an instruction fetch pipeline stage (such as instruction fetch unit 1808) and a decode pipeline stage (such as decide unit 1810). Front end 1806 may receive and decode instructions from instruction stream 1802 using decode unit 1810. The decoded instructions may be dispatched, allocated, and scheduled for execution by an allocation stage of a pipeline (such as allocator 1814) and allocated to specific execution units 1816 for execution. One or more specific instructions to be executed by processor 1804 may be included in a library defined for execution by processor 1804. In another embodiment, specific instructions may be targeted by particular portions of processor 1804. For example, processor 1804 may recognize an attempt in instruction stream 1802 to execute a vector operation in software and may issue the instruction to a particular one of execution units 1816.

During execution, access to data or additional instructions (including data or instructions resident in memory system 1830) may be made through memory subsystem 1820. Moreover, results from execution may be stored in memory subsystem 1820 and may subsequently be flushed to memory system 1830. Memory subsystem 1820 may include, for example, memory, RAM, or a cache hierarchy, which may include one or more Level 1 (L1) caches 1822 or Level 2 (L2) caches 1824, some of which may be shared by multiple cores 1812 or processors 1804. After execution by execution units 1816, instructions may be retired by a writeback stage or retirement stage in retirement unit 1818. Various portions of such execution pipelining may be performed by one or more cores 1812.

An execution unit 1816 that executes vector instructions may be implemented in any suitable manner. In one embodiment, an execution unit 1816 may include or may be communicatively coupled to memory elements to store information necessary to perform one or more vector operations. In one embodiment, an execution unit 1816 may include circuitry to perform vector operations to load indices from an array of indices and prefetch from locations in memory based on those indices, taking ownership of the locations in memory for a subsequent scatter. In one embodiment, an execution unit 1816 may include circuitry to perform vector operations to load indices from an array of indices, scatter elements to locations in memory based on those indices, and prefetch from additional locations in the memory, taking ownership of the additional locations in memory for a subsequent scatter. For example, an execution unit 1816 may include circuitry to implement one or more forms of a vector LoadIndicesAndPrefetchScatter type instruction. In another example, an execution unit 1816 may include circuitry to implement one or more forms of a vector LoadIndicesScatterAndPrefetch type instruction. Example implementations of these instructions are described in more detail below.

In embodiments of the present disclosure, the instruction set architecture of processor 1804 may implement one or more extended vector instructions that are defined as Intel® Advanced Vector Extensions 512 (Intel® AVX-512) instructions. Processor 1804 may recognize, either implicitly or through decoding and execution of specific instructions, that one of these extended vector operations is to be performed. In such cases, the extended vector operation may be directed to a particular one of the execution units 1816 for execution of the instruction. In one embodiment, the instruction set architecture may include support for 512-bit SIMD operations. For example, the instruction set architecture implemented by an execution unit 1816 may include 32 vector registers, each of which is 512 bits wide, and support for vectors that are up to 512 bits wide. The instruction set architecture implemented by an execution unit 1816 may include eight dedicated mask registers for conditional execution and efficient merging of destination operands. At least some extended vector instructions may include support for broadcasting. At least some extended vector instructions may include support for embedded masking to enable predication.

At least some extended vector instructions may apply the same operation to each element of a vector stored in a vector register at the same time. Other extended vector instructions may apply the same operation to corresponding elements in multiple source vector registers. For example, the same operation may be applied to each of the individual data elements of a packed data item stored in a vector register by an extended vector instruction. In another example, an extended vector instruction may specify a single vector operation to be performed on the respective data elements of two source vector operands to generate a destination vector operand.

In embodiments of the present disclosure, at least some extended vector instructions may be executed by a SIMD coprocessor within a processor core. For example, one or more of execution units 1816 within a core 1812 may implement the functionality of a SIMD coprocessor. The SIMD coprocessor may be implemented fully or in part by the elements described in FIGS. 1-17. In one embodiment, extended vector instructions that are received by processor 1804 within instruction stream 1802 may be directed to an execution unit 1816 that implements the functionality of a SIMD coprocessor.

As illustrated in FIG. 18, in one embodiment, a LoadIndicesAndPrefetchScatter instruction may include a {size} parameter indicating the size and/or type of the data elements to be prefeteched. In one embodiment, all of the data elements to be prefetched may be the same size and type.

In one embodiment, a LoadIndicesAndPrefetchScatter instruction may include two memory address parameters, one of which identifies a base address for a group of data element locations in memory and the other of which identifies an array of indices in memory. In one embodiment, one or both of these memory address parameters may be encoded in a scale-index-base (SIB) type memory addressing operand. In another embodiment, one or both of these memory address parameters may be a pointer.

In one embodiment, a LoadIndicesAndPrefetchScatter instruction may include cache hint identifying the level in the cache hierarchy into which data elements are to be prefetched.

In one embodiment, a LoadIndicesAndPrefetchScatter type instruction may include a $\{k_n\}$ parameter that identifies a particular mask register, if masking is to be applied.

One or more of the parameters of the LoadIndicesAndPrefetchScatter instructions shown in FIG. 18 may be inherent for the instruction. For example, in different embodiments, any combination of these parameters may be encoded in a bit or field of the opcode format for the instruction. In other embodiments, one or more of the parameters of the LoadIndicesAndPrefetchScatter type instructions shown in FIG. 18 may be optional for the instruction. For example, in different embodiments, any combination of these parameters may be specified when the instruction is called.

As illustrated in FIG. 18, in one embodiment, a LoadIndicesScatterAndPrefetch instruction may include a {size} parameter indicating the size and/or type of the data elements to be scattered and prefetched by the instruction. In one embodiment, all of the data elements to be scattered and prefetched may be the same size and type.

In one embodiment, a LoadIndicesScatterAndPrefetch instruction may include a REG parameter that identifies a source vector register in which data elements to be scattered are stored.

In one embodiment, a LoadIndicesScatterAndPrefetch instruction may include two memory address parameters, one of which identifies a base address for a group of data element locations in memory and the other of which identifies an array of indices in memory. In one embodiment, one or both of these memory address parameters may be encoded in a scale-index-base (SIB) type memory addressing operand. In another embodiment, one or both of these memory address parameters may be a pointer.

In one embodiment, a LoadIndicesScatterAndPrefetch instruction may include a cache hint identifying the level in the cache hierarchy into which data elements are to be prefetched.

In one embodiment, a LoadIndicesScatterAndPrefetch instruction may include an immediate parameter whose value represents a distance between the locations in the array of indices that store index values for data elements to be scattered by the instruction and locations that store index values for data elements to be prefetched by the instruction.

In one embodiment, a LoadIndicesScatterAndPrefetch type instruction may include a $\{k_n\}$ parameter that identifies a particular mask register, if masking is to be applied. If masking is to be applied, the LoadIndicesScatterAndPrefetch type instruction may include a {z} parameter that specifies a masking type. In one embodiment, if the {z} parameter is included for the instruction, this may indicate that zero-masking is to be applied when storing data elements to the memory. If the {z} parameter is not included for the instruction, this may indicate that merging-masking is to be applied when storing data elements to the memory.

Examples of the use of zero-masking and merging-masking are described in more detail below One or more of the parameters of the LoadIndicesScatterAndPrefetch type instructions shown in FIG. 18 may be inherent for the instruction. For example, in different embodiments, any combination of these parameters may be encoded in a bit or field of the opcode format for the instruction. In other embodiments, one or more of the parameters of the LoadIndicesScatterAndPrefetch type instructions shown in FIG. 18 may be optional for the instruction. For example, in different embodiments, any combination of these parameters may be specified when the instruction is called.

Figure 19:
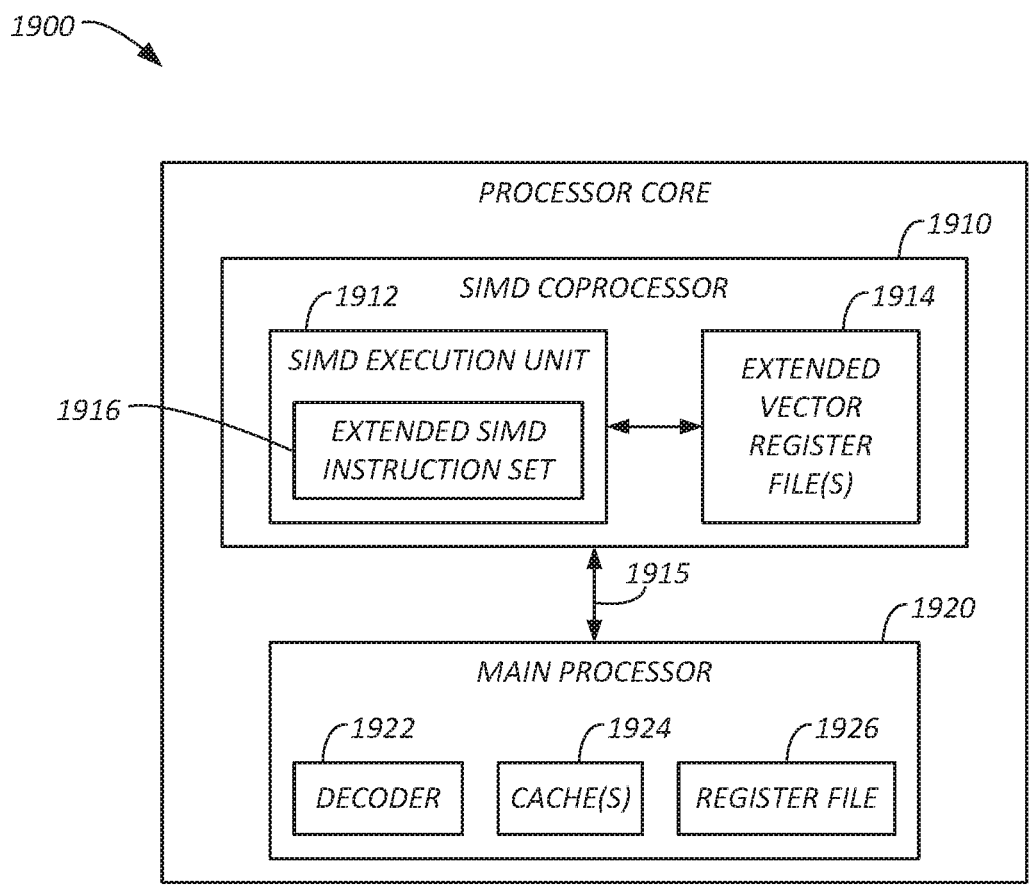
FIG. 19 is a block diagram illustrating a processor core to execute extended vector instructions, in accordance with embodiments of the present disclosure.

FIG. 19 illustrates an example processor core 1900 of a data processing system that performs SIMD operations, in accordance with embodiments of the present disclosure. Processor 1900 may be implemented fully or in part by the elements described in FIGS. 1-18. In one embodiment, processor core 1900 may include a main processor 1920 and a SIMD coprocessor 1910. SIMD coprocessor 1910 may be implemented fully or in part by the elements described in FIGS. 1-17. In one embodiment, SIMD coprocessor 1910 may implement at least a portion of one of the execution units 1816 illustrated in FIG. 18. In one embodiment, SIMD coprocessor 1910 may include a SIMD execution unit 1912 and an extended vector register file 1914. SIMD coprocessor 1910 may perform operations of extended SIMD instruction set 1916. Extended SIMD instruction set 1916 may include one or more extended vector instructions. These extended vector instructions may control data processing operations that include interactions with data resident in extended vector register file 1914.

In one embodiment, main processor 1920 may include a decoder 1922 to recognize instructions of extended SIMD instruction set 1916 for execution by SIMD coprocessor 1910. In other embodiments, SIMD coprocessor 1910 may include at least part of decoder (not shown) to decode instructions of extended SIMD instruction set 1916. Processor core 1900 may also include additional circuitry (not shown) which may be unnecessary to the understanding of embodiments of the present disclosure.

In embodiments of the present disclosure, main processor 1920 may execute a stream of data processing instructions that control data processing operations of a general type, including interactions with cache(s) 1924 and/or register file 1926. Embedded within the stream of data processing instructions may be SIMD coprocessor instructions of extended SIMD instruction set 1916. Decoder 1922 of main processor 1920 may recognize these SIMD coprocessor instructions as being of a type that should be executed by an attached SIMD coprocessor 1910. Accordingly, main processor 1920 may issue these SIMD coprocessor instructions (or control signals representing SIMD coprocessor instructions) on the coprocessor bus 1915. From coprocessor bus 1915, these instructions may be received by any attached SIMD coprocessor. In the example embodiment illustrated in FIG. 19, SIMD coprocessor 1910 may accept and execute any received SIMD coprocessor instructions intended for execution on SIMD coprocessor 1910.

In one embodiment, main processor 1920 and SIMD coprocessor 1920 may be integrated into a single processor core 1900 that includes an execution unit, a set of register files, and a decoder to recognize instructions of extended SIMD instruction set 1916.

The example implementations depicted in FIGS. 18 and 19 are merely illustrative and are not meant to be limiting on the implementation of the mechanisms described herein for performing extended vector operations.

FIG. 20 is a block diagram illustrating an example extended vector register file 1914, in accordance with embodiments of the present disclosure. Extended vector register file 1914 may include 32 SIMD registers (ZMM0-ZMM31), each of which is 512-bit wide. The lower 256 bits of each of the ZMM registers are aliased to a respective 256-bit YMM register. The lower 128 bits of each of the YMM registers are aliased to a respective 128-bit XMM register. For example, bits 255 to 0 of register ZMM0 (shown as 2001) are aliased to register YMM0, and bits 127 to 0 of register ZMM0 are aliased to register XMM0. Similarly, bits 255 to 0 of register ZMM1 (shown as 2002) are aliased to register YMM1, bits 127 to 0 of register ZMM1 are aliased to register XMM1, bits 255 to 0 of register ZMM2 (shown as 2003) are aliased to register YMM2, bits 127 to 0 of the register ZMM2 are aliased to register XMM2, and so on.

In one embodiment, extended vector instructions in extended SIMD instruction set 1916 may operate on any of the registers in extended vector register file 1914, including registers ZMM0-ZMM31, registers YMM0-YMM15, and registers XMM0-XMM7. In another embodiment, legacy SIMD instructions implemented prior to the development of the Intel® AVX-512 instruction set architecture may operate on a subset of the YMM or XMM registers in extended vector register file 1914. For example, access by some legacy SIMD instructions may be limited to registers YMM0-YMM15 or to registers XMM0-XMM7, in some embodiments.

In embodiments of the present disclosure, the instruction set architecture may support extended vector instructions that access up to four instruction operands. For example, in at least some embodiments, the extended vector instructions may access any of 32 extended vector registers ZMM0-ZMM31 shown in FIG. 20 as source or destination operands. In some embodiments, the extended vector instructions may access any one of eight dedicated mask registers. In some embodiments, the extended vector instructions may access any of sixteen general-purpose registers as source or destination operands.

In embodiments of the present disclosure, encodings of the extended vector instructions may include an opcode specifying a particular vector operation to be performed. Encodings of the extended vector instructions may include an encoding identifying any of eight dedicated mask registers, k0-k7. Each bit of the identified mask register may govern the behavior of a vector operation as it is applied to a respective source vector element or destination vector element. For example, in one embodiment, seven of these mask registers (k1-k7) may be used to conditionally govern the per-data-element computational operation of an extended vector instruction. In this example, the operation is not performed for a given vector element if the corresponding mask bit is not set. In another embodiment, mask registers k1-k7 may be used to conditionally govern the per-element updates to the destination operand of an extended vector instruction. In this example, a given destination element is not updated with the result of the operation if the corresponding mask bit is not set.

In one embodiment, encodings of the extended vector instructions may include an encoding specifying the type of masking to be applied to the destination (result) vector of an extended vector instruction. For example, this encoding may specify whether merging-masking or zero-masking is applied to the execution of a vector operation. If this encoding specifies merging-masking, the value of any destination vector element whose corresponding bit in the mask register is not set may be preserved in the destination vector. If this encoding specifies zero-masking, the value of any destination vector element whose corresponding bit in the mask register is not set may be replaced with a value of zero in the destination vector. In one example embodiment, mask register k0 is not used as a predicate operand for a vector operation. In this example, the encoding value that would otherwise select mask k0 may instead select an implicit mask value of all ones, thereby effectively disabling masking. In this example, mask register k0 may be used for any instruction that takes one or more mask registers as a source or destination operand.

In one embodiment, encodings of the extended vector instructions may include an encoding specifying the size of the data elements that are packed into a source vector register or that are to be packed into a destination vector register. For example, the encoding may specify that each data element is a byte, word, doubleword, or quadword, etc. In another embodiment, encodings of the extended vector instructions may include an encoding specifying the data type of the data elements that are packed into a source vector register or that are to be packed into a destination vector register. For example, the encoding may specify that the data represents single or double precision integers, or any of multiple supported floating point data types.

In one embodiment, encodings of the extended vector instructions may include an encoding specifying a memory address or memory addressing mode with which to access a source or destination operand. In another embodiment, encodings of the extended vector instructions may include an encoding specifying a scalar integer or a scalar floating point number that is an operand of the instruction. While specific extended vector instructions and their encodings are described herein, these are merely examples of the extended vector instructions that may be implemented in embodiments of the present disclosure. In other embodiments, more fewer, or different extended vector instructions may be implemented in the instruction set architecture and their encodings may include more, less, or different information to control their execution.

In one embodiment, the use of a LoadIndicesAndPrefetchScatter instruction or a LoadIndicesScatterAndPrefetch may improve the performance of cryptography, graph traversal, sorting, and sparse matrix applications (among others) that use indirect write accesses to memory by way of indices stored in arrays, when compared to other sequences of instructions to perform a scatter.

In one embodiment, rather than specifying a set of addresses from which to load a vector of indices, those addresses may instead be provided as an array of indices to a LoadIndicesAndPrefetchScatter instruction that will both load each element of the array and then use it as an index for a prefetch operation. The vector of indices to be used in the prefetch operation may be stored in contiguous locations in memory. For example, in one embodiment, starting in the first position in the array, there may be four bytes that contain the first index value, followed by four bytes that contain the second index value, and so on. In one embodiment, the starting address within the array of indices (in memory) at which prefetching should begin may be provided to the LoadIndicesAndPrefetchScatter instruction, and the index values that indirectly address the data elements to be prefetched may be stored contiguously in the memory beginning at that address. In one embodiment, the LoadIndicesAndPrefetchScatter instruction may load 64 bytes starting from that position and use them (four at a time) to perform the prefetch.

As described in more detail below, in one embodiment, the semantics of the LoadIndicesAndPrefetchScatter instruction may be as follows:

LoadIndicesAndPrefetchScatterD $k_n$ (Addr A, Addr B, hint)

In this example, the operation is to prefetch 32-bit doubleword elements into the cache identified by the hint, the address at which to begin retrieving index values from the array of indices in memory is Addr B, the starting address (base address) of a group of data element locations in memory is Addr A, and the mask specified for the instruction is mask register $k_n$. The operation of this instruction may be illustrated by the following example pseudo code. In this example, VLEN (or vector length) may represent the length of an index vector, that is, the number of index values stored in the array of indices for the prefetch operation.

```
For(i = 0...VLEN) {
    If (k_n [i] is true) then {
        idx = mem[B[i]];
        load mem[A[idx]] into specified cache
    }
}
```

In this example, for each iteration, an index value is retrieved from position i in the array of indices and loaded into an index register, and the contents of the location in memory indirectly addressed using that index value is prefetched into the cache specified by the hint. For example, the hint may indicate that data elements are to be prefetched into a first level (L1) cache or into a second level (L2) cache. In some embodiments, the data elements may be prefetched with read-for-ownership. For example, the write requests directing the prefetched data elements to the cache may include a request for exclusive ownership.

In embodiments of the present disclosure, a LoadIndicesAndPrefetchScatter instruction may be used to prefetch the contents of particular locations in memory into a specified cache prior to calling a scatter operation that targets those data elements, taking ownership of the location in memory in the hope that at the time the scatter operation is called, exclusive ownership will still be held. For example, a repeating sequence of vector instructions that performs scatters may, in each iteration, include one vector instruction to scatter (store) data elements from a source vector register to locations in memory that are computed based on index values in contiguous locations in one portion of an array of indices and another instruction to prefetch data elements whose addresses are computed based on index values that are at a fixed distance d from the index values used in computing the addressed of the scattered data elements. One such sequence may be illustrated by the example pseudo code below.

```
Let d = prefetch_distance;
for (i=1..N) {
    A[B[i]] = C[i];
    Prefetch A[B[i+d]] into desired cache;
}
```

In the sequence of instructions shown above, the prefetch instruction may be implemented by a LoadIndicesAnd- PrefetchScatter operation, as shown in the example pseudo code below. In this example, masking is not specified for the instruction.

```
Prefetch A[B[i+d]] into desired cache: {
    LoadIndicesAndPrefetchScatter(addr(A[0]), addr(B[i+d]),
        cache_hint);
}
```

In one embodiment, the LoadIndicesAndPrefetchScatter instruction may support multiple possible values of VLEN, such as 8, 16, 32, or 64. In one embodiment, the LoadIndicesAndPrefetchScatter instruction may support multiple possible sizes of elements in the array of indices B[i], such as 32-bit, or 64-bit values, each of which may represent one or more index values. In one embodiment, the LoadIndicesAndPrefetchScatter instruction may support multiple possible types and sizes of data elements in memory location A[i], including single- or double-precision floating point, 64-bit integer, and others. In one embodiment, this instruction may conditionally prefetch the contents of one or more locations in memory into an identified cache up to a maximum number of prefetch locations for the instruction. For example, if masking is specified for the instruction (if a mask register is identified for the instruction), the contents of a potential scatter target location in memory may only be prefetched if the corresponding mask bit is set. The maximum number of locations from which the contents are prefetched may be dependent on one or more instruction parameters, such as the size or type of the data elements to be prefetched, or the length of the index vector.

In one embodiment, a prefetch targeting a particular location in memory may cause the data in multiple adjacent locations to be prefetched and cached along with the contents of the target location. For example, 4, 8, 16 or 32 data elements may be prefetched into the identified cache at a time, depending on the size and location of the target of the prefetch, and the length of the cache line. In various embodiments, the prefetches defined by the instruction may happen in any order, or not at all. For example, the instruction may be considered a hint to the processor and may not be guaranteed to complete. In one embodiment, if there is high bandwidth utilization between the memory and the target cache, the processor hardware may determine that the instruction should not be executed at all. In another embodiment, the processor may, for any number of reasons, terminate the execution of the instruction prior to completion (e.g., after prefetching the contents of some, but not all of the targeted locations in the memory).

In one embodiment, an array of indices may be provided to a LoadIndicesScatterAndPrefetch instruction that will load each element (index value) of the array, use the value as an index for a scatter operation, and also prefetch ahead for a subsequent scatter operation. In one embodiment, the vector of indices to be used in the scatter operation may be stored in contiguous locations in memory. For example, in one embodiment, starting in the first position in the array, there may be four bytes that contain the first index value, followed by four bytes that contain the second index value, and so on. In one embodiment, the vector of indices to be used in the prefetch operation may be stored in contiguous locations in memory at fixed distance from the locations in which the vector of indices for the scatter operation are stored. For example, the starting address within the array of indices (in memory) at which prefetching should begin may be provided to the LoadIndicesScatterAndPrefetch instruction, and the index values that indirectly address the data elements to be prefetched may be stored contiguously in the memory beginning at that address. In one embodiment, the LoadIndicesScatterAndPrefetch instruction may load 64 bytes starting from that position and use them (four at a time) to perform the prefetch.

As described in more detail below, in one embodiment, the semantics of the LoadIndicesScatterAndPrefetch instruction may be as follows:

LoadIndicesScatterAndPrefetchD $k_n$ (Addr A, Addr B, ZMMn, prefetch_distance, hint)

In this example, the operation is to scatter 32-bit doubleword elements that are stored in the source vector register identified as ZMMn to locations in memory, and prefetch 32-bit doubleword elements into the cache identified by the hint. In this example, the address at which to begin retrieving index values from the array of indices in memory is Addr B, the starting address (base address) of a group of data element locations in memory is Addr A, the distance between the index values for scatters and the index values for prefetches is specified by an integer "prefetch_distance", and the mask specified for the instruction is mask register $k_n$. The operation of this instruction may be illustrated by the following example pseudo code. In this example, VLEN (or vector length) may represent the length of an index vector, that is, the number of index values stored in the array of indices for the operation.

```
For(i=1..VLEN) {
    If (k_n [i] is true) then {
        idx1 = mem[B[i]];
        mem[A[idx1]] = source[i];
    }
    idx2 = mem[B[i+d]];
    load mem[A[idx2]] into cache with read-for-ownership;
    }
}
```

In this example, for each iteration, an index value is retrieved from position i in the array of indices and loaded into an index register, and a data element in position i in the source vector register is stored to the location in memory that is indirectly addressed using that index value. In addition, a second index value is retrieved from position (i+d) in the array of indices and loaded into an index register, and the contents of the location in memory that is indirectly addressed using that index value is prefetched into the cache specified by the hint. For example, the hint may indicate that the contents are to be prefetched into a first level (L1) cache or into a second level (L2) cache. In some embodiments, the contents may be prefetched with read-for-ownership. For example, the write requests directing the prefetched data elements to the cache may include a request for exclusive ownership.

In one embodiment, an optional merging-masking may be applied when the LoadIndicesScatterAndPrefetch instruction scatters data elements that are stored in the source vector register to the memory. In another embodiment, an optional zero-masking may be applied when the LoadIndicesScatterAndPrefetch instruction scatters data elements that are stored in the source vector register to the memory. In one embodiment, the LoadIndicesScatterAndPrefetch instruction may support multiple possible values of VLEN, such as 8, 16, 32, or 64. In one embodiment, the instruction may support multiple possible sizes of elements in the array of indices B[i], such as 32-bit, or 64-bit values, each of which may represent one or more index values. In one embodiment, the LoadIndicesScatterAndPrefetch instruction may support multiple possible types and sizes of data elements in memory location A[i], including single- or double-precision floating point, 64-bit integer, and others. In one embodiment, this instruction may conditionally scatter one or more data elements up to a maximum number of data elements for the instruction. For example, if masking is specified for the instruction (if a mask register is identified for the instruction), a data elements may only be scattered if its corresponding mask bit is set. The maximum number of data elements to be scattered may be dependent on one or more instruction parameters, such as the size or type of the data elements to be scattered, the length of the index vector, or the capacity of the source vector register. In one embodiment, this instruction may conditionally prefetch the contents of one or more locations in memory up to a maximum number of locations for the instruction. For example, if masking is specified for the instruction (if a mask register is identified for the instruction), the contents of a given location may only be prefetched if its corresponding mask bit is set. The maximum number of locations from which data is to be prefetched may be dependent on one or more instruction parameters, such as the size or type of the data elements to be prefetched, or the length of the index vector.

In one embodiment, a prefetch targeting a particular location in memory may cause the contents of multiple adjacent locations to be prefetched and cached along with the contents of the target location. For example, 4, 8, 16 or 32 data elements may be prefetched into the identified cache at a time, depending on the size and location of the target of the prefetch, and the length of the cache line. In various embodiments, the prefetches defined by the instruction may happen in any order, or not at all. For example, the instruction may be considered a hint to the processor and may not be guaranteed to complete. In one embodiment, if there is high bandwidth utilization between the memory and the target cache, the processor hardware may determine that the instruction should not be executed at all. In another embodiment, the processor may, for any number of reasons, terminate the execution of the instruction prior to completion (e.g., after prefetching the contents of some, but not all targeted locations in memory).

In the example pseudo code above, there is a single mask register identified for the instruction, and masking is applied only to the load-index-and-scatter portion of each iteration, as controlled by the mask register. For example, if a particular mask bit is not set, a corresponding one of the scatters will be elided. However, a prefetch operation takes for each iteration. In another embodiment, masking may be applied to be the scatter and prefetch portions of the iteration such that both are conditional on the corresponding mask bit. In that case, either both operations are performed during a given iteration or neither is performed. In yet another embodiment, two separate mask registers may be specified for the LoadIndicesScatterAndPrefetch instruction, one to condition the scatter operation and one to condition the prefetch operation. Other variations and combinations of parameters to control which, if any, of the scatters and prefetches are performed are possible, in other embodiments.

In embodiments of the present disclosure, the instructions for performing extended vector operations that are implemented by a processor core (such as core 1812 in system 1800) or by a SIMD coprocessor (such as SIMD coprocessor 1910) may include an instruction to perform a vector operation to load indices from an array of indices and prefetch from locations in sparse memory based on those indices, taking ownership of the locations in memory for a subsequent scatter. For example, these instructions may include one or more "LoadIndicesAndPrefetchScatter" instructions. In embodiments of the present disclosure, a LoadIndicesAndPrefetchScatter instruction may be used to load each of the index values to be used in computing the address in memory of a particular location at which to perform a prefetch, and to prefetch the contents of the location to a specified cache. The address may be computed based on the sum of a base address that is specified for the instruction and the index value retrieved from an array of indices that is identified for the instruction, with or without scaling. In another example, the instructions for performing extended vector operations that are implemented by a processor core may include one or more "LoadIndicesScatterAndPrefetch" instructions. In embodiments of the present disclosure, a LoadIndicesScatterAndPrefetch instruction may be used to load each of the index values to be used in computing the address in memory of a particular data element to be scattered, to retrieve the data element from a specified source vector register, to store the data element in memory at the computed address, to load an index value to be used in computing the address of another location at which to perform a prefetch, and to prefetch the contents of the other location to a specified cache. Each of the addresses may be computed based on the sum of a base address that is specified for the instruction and the index values retrieved from an array of indices that is identified for the instruction, with or without scaling. The index values for the scatters performed by the instruction may be separated in the array of indices from the index values for the prefetches performed by the instruction by a prefetch distance that is specified for the instruction.

Figure 21A:
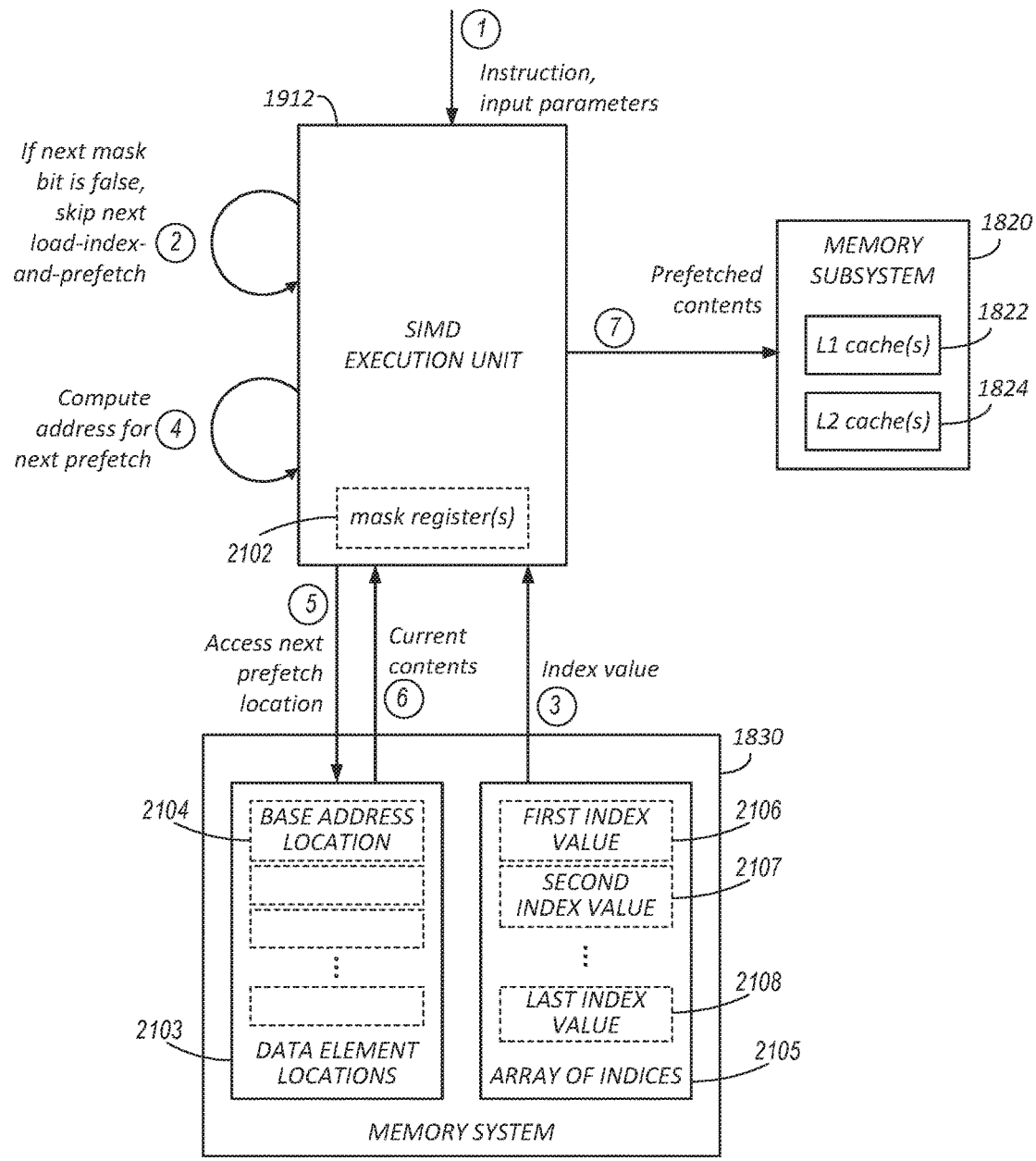
FIG. 21A is an illustration of an operation to perform loading indices from an array of indices and prefetching from locations in sparse memory based on those indices, taking ownership of the locations in memory for a subsequent scatter, in accordance with embodiments of the present disclosure.

FIG. 21A is an illustration of an operation to perform loading indices from an array of indices and prefetching from locations in sparse memory based on those indices, taking ownership of the locations in memory for a subsequent scatter, in accordance with embodiments of the present disclosure. In one embodiment, system 1800 may execute an instruction to perform an operation to load indices from an array of indices and prefetch from locations in memory based on those indices, taking ownership of the locations in memory for a subsequent scatter. For example, a LoadIndicesAndPrefetchScatter instruction may be executed. This instruction may include any suitable number and kind of operands, bits, flags, parameters, or other elements. A call of a LoadIndicesAndPrefetchScatter instruction may reference base address in memory from which to calculate the addresses of the particular locations in memory at which to perform a prefetch. For example, the LoadIndicesAndPrefetchScatter instruction may reference a pointer to the first location in a group of data element locations, some of which store contents to be prefetched by the instruction. A call of a LoadIndicesAndPrefetchScatter instruction may reference an array of indices in memory, each of which may specify an index value or offset from the base address usable to compute the address of a location whose contents are to be prefetched by the instruction. In one embodiment, a call of a LoadIndicesAndPrefetchScatter instruction may reference, in a scale-index-base (SIB) type memory addressing operand, an array of indices in memory and a base address register. The base address register may identify a base address in memory from which to calculate the addresses of the particular locations in memory from which the contents are to be prefetched. The array of indices in memory may specify an index or offset from the base address usable to compute the address of each location targeted for prefetching by the instruction. For example, execution of the LoadIndicesAndPrefetchScatter instruction may, for each index value in the array of indices stored in successive positions in the array of indices, cause the index value to be retrieved from the array of indices, an address of a particular data element location in the memory to be computed based on the index value and the base address, the contents of the location to be prefetched from the memory at the computed address, with the prefetched contents being written to a cache using a read-for-ownership access.

In one embodiment, a call of a LoadIndicesAndPrefetch-Scatter instruction may specify a scaling factor to be applied to each index value when computing a respective address of prefetch location targeted by the instruction. In one embodiment, the scaling factor may be encoded in the SIB type memory addressing operand. In one embodiment, the scaling factor may be one, two, four or eight. The specified scaling factor may be dependent on the size of the individual data elements to be prefetched by the instruction. In one embodiment, a call of a LoadIndicesAndPrefetchScatter instruction may include a cache hint parameter whose value indicates the level in the cache hierarchy into which data should be prefetched by the instruction. For example, a cache hint of "T0" may indicate that elements should be prefetched into a first level (L1) cache, and a cache hint of "T1" may indicate that elements should be prefetched into a second level (L2) cache.

In one embodiment, a call of a LoadIndicesAndPrefetch-Scatter instruction may specify the size of the data elements to be prefetched by the instruction. For example, a size parameter may indicate that the data elements are bytes, words, doublewords, or quadwords. In another example, a size parameter may indicate that the data elements represent signed or unsigned floating point values, such as single- or double-precision floating point values. In another embodiment, a call of a LoadIndicesAndPrefetchScatter instruction may specify the maximum number of locations from which the contents are to be prefetched by the instruction. In one embodiment, a call of a LoadIndicesAndPrefetchScatter instruction may specify a mask register to be applied to conditionally perform the individual operations of the instruction. For example, a mask register may include a respective bit for each potential prefetched location corresponding to the position in the array of indices containing the index value for that location. In this example, if the respective bit for a given location is set, its index value may be retrieved, its address may be computed, and its contents may be prefetched into the identified level of the cache hierarchy. If the respective bit for a given data element is not set, these operations may be elided for the given data element. In other embodiments, more, fewer, or different parameters may be referenced in a call of a LoadIndicesAndPrefetchScatter instruction.

In the example embodiment illustrated in FIG. 21A, at (1) the LoadIndicesAndPrefetchScatter instruction and its parameters (which may include any or all of the memory address operands described above, a scaling factor, an indication of the size of the data elements in the prefetch target locations, an indication of the maximum number of locations at which to perform a prefetched, a cache hint, a parameter identifying a particular mask register, or a parameter specifying a masking type) may be received by SIMD execution unit 1912. For example, the LoadIndicesAndPrefetchScatter instruction may be issued to SIMD execution unit 1912 within a SIMD coprocessor 1910 by an allocator 1814 within a core 1812, in one embodiment. In another embodiment, the LoadIndicesAndPrefetchScatter instruction may be issued to SIMD execution unit 1912 within a SIMD coprocessor 1910 by a decoder 1922 of a main processor 1920. The LoadIndicesAndPrefetchScatter instruction may be executed logically by SIMD execution unit 1912.

In this example, the LoadIndicesAndPrefetchScatter instruction may conditionally prefetch the current contents of various ones of data element locations 2103 in memory system 1803. The data elements stored in data element locations 2103 may all be the same size, and the size may be specified by a parameter of the LoadIndicesAndPrefetchScatter instruction. The data elements that may potentially be prefetched may be stored in any random or arbitrary order within data element locations 2103. In this example, the first possible location within data element locations 2103 from which data elements may be prefetched is shown in FIG. 21A as base address location 2104. The address of base address location 2104 may be identified by a parameter of the LoadIndicesAndPrefetchScatter instruction. In this example, a mask register 2102 within SIMD execution unit 1912 may be identified as the mask register whose contents are to be used in a masking operation applied to the instruction, if specified. In this example, the index values to be used by the LoadIndicesAndPrefetchScatter instruction when prefetching are stored in the array of indices 2105 in memory system 1830. The array of indices 2105 includes, for example, a first index value 2106 in the first (lowest-order) position within the array of indices (location 0), a second index value 2107 in the second position within the array of indices (location 1), and so on. The last index value 2108 is stored in the last (highest-order position) within array of indices 2105.

Execution of the LoadIndicesAndPrefetchScatter instruction by SIMD execution unit 1912 may include, at (2) determining whether a mask bit corresponding to the next potential load-index-and-prefetch is false, and if so, skipping the next potential load-index-and-prefetch. For example, if bit 0 is false, the SIMD execution unit may refrain from performing some or all of steps (3) through (7) to prefetch the current contents of the location within data elements locations 2103 whose address may be computed using the next index value. However, if the mask bit corresponding to the first potential load-index-and-prefetch is true, the next potential load-index-and-prefetch may be performed. For example, if bit 1 is true, or if masking is not applied to the instruction, the SIMD execution unit may perform all of steps (3) through (7) to prefetch the current contents of the location within data elements locations 2103 whose address may be computed using the second index value 2107 and the address of base address location 2104.

For a potential load-index-and-prefetch whose corresponding mask bit is true, or when no masking is applied, at (3) the next index value for a prefetch may be retrieved. For example, during the first potential load-index-and-prefetch, the first index value 2106 may be retrieved, during the second potential load-index-and-prefetch, the second index value 2106 may be retrieved, and so on. At (4) the address for the next prefetch may be computed based on the retrieved index value and the address of the base address location 2104. For example, the address for the next prefetch may be computed as the sum of the base address and the retrieved index value, with or without scaling. At (5) the next prefetch location may be accessed in the memory using the computed address, and at (6) the current contents of the prefetch location may be prefetched from that location. At (7) the prefetched content may be written to L1 cache 1822 or L2 cache 1824, dependent on the cache hint included for the instruction.

In one embodiment, execution of the LoadIndicesAndPrefetchScatter instruction may include repeating any or all of steps of the operation illustrated in FIG. 21A for each of the locations with data element locations 2103 whose contents are to be prefetched by the instruction. For example, step (2) or steps (2) through (7) may be performed for each potential load-index-and-prefetch, depending on the corresponding mask bit (if masking is applied), after which the instruction may be retired. In one embodiment, as the instruction prefetches the current contents from particular locations within data element locations 2103, the prefetching may cause the contents of multiple adjacent locations to be prefetched and cached in L1 cache 1822 or L2 cache 1824 along with the contents of the target locations. In this example, mask register 2102 is illustrated in FIG. 21A as a special-purpose register within SIMD execution unit 1912. In another embodiment, mask register 2102 may be implemented by a general-purpose or special-purpose register in the processor, but outside of the SIMD execution unit 1912. In yet another embodiment, mask register 2102 may be implemented by a vector register in extended vector register file 1914.

Figure 21B:
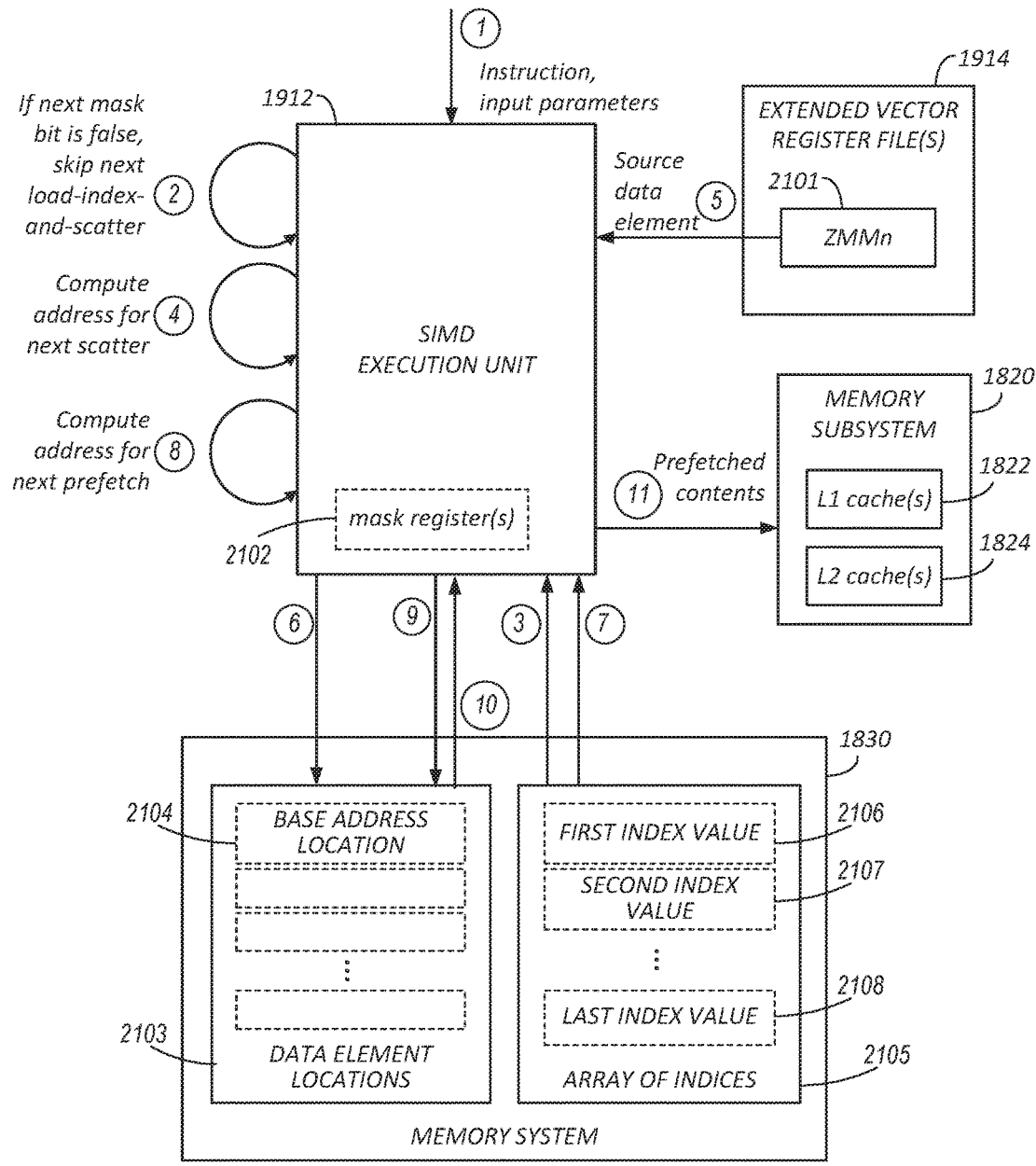
FIG. 21B is an illustration of an operation to perform loading indices from an array of indices, scattering elements to locations in sparse memory based on those indices, and prefetching from additional locations in the memory, taking ownership of the additional locations in memory for a subsequent scatter, in accordance with embodiments of the present disclosure.

In embodiments of the present disclosure, some forms of Load-Indices-and-Prefetch-Scatters type operations may load indices from an array of indices, scatter data elements to locations in sparse memory based on those indices, and prefetch the contents of others locations in the memory at which data elements are to be scattered later. FIG. 21B is an illustration of an operation to perform loading indices from an array of indices, scattering elements to locations in sparse memory based on those indices, and prefetching from additional locations in the memory, taking ownership of the additional locations in memory for a subsequent scatter, in accordance with embodiments of the present disclosure. In one embodiment, system 1800 may execute an instruction to perform an operation to load indices from an array of indices, scatter elements to locations in sparse memory based on those indices, and prefetch from additional locations in the memory, taking ownership of the additional locations in memory for a subsequent scatter, in accordance with embodiments of the present disclosure. For example, a vector LoadIndicesScatterAndPrefetch form of the instruction may be executed. This instruction may include any suitable number and kind of operands, bits, flags, parameters, or other elements.

In one embodiment, a call of a LoadIndicesScatterAndPrefetch instruction may reference a source vector register. The source vector register may be an extended vector register in which data elements to be scattered to locations in sparse memory by the LoadIndicesScatterAndPrefetch instruction are stored. A call of a LoadIndicesScatterAndPrefetch instruction may reference base address in memory from which to calculate the addresses of the particular locations in memory at which to perform a prefetch and the particular locations in memory at which to scatter data elements. For example, the LoadIndicesScatterAndPrefetch instruction may reference a pointer to the first location in a group of data element locations. Some of the data element locations may store contents to be prefetched by the instruction. Some of the data element locations may be targets of a scatter performed by the instruction. A call of a LoadIndicesScatterAndPrefetch instruction may reference an array of indices in memory, some of which may specify an index value or offset from the base address usable to compute the address of a potential scatter target location. Some of the index values may be used to compute the addresses of locations whose contents are to be prefetched by the instruction in order to take ownership of them. Some of the index values may be used to compute the addresses of locations at which the instruction will store data elements as part of a current scatter operation.

In one embodiment, a call of a LoadIndicesScatterrAndPrefetch instruction may reference, in a scale-index-base (SIB) type memory addressing operand, an array of indices in memory and a base address register. The base address register may identify a base address in memory from which to calculate the addresses of the particular locations in memory to which data elements are to be scattered or from which the contents are to be prefetched by the instruction. The array of indices in memory may specify an index or offset from the base address usable to compute the addresses of the particular locations in memory from which the contents are to be prefetched by the instruction. For example, execution of the LoadIndicesScatterAndPrefetch instruction may, for each index value in the array of indices stored in successive positions in the array of indices, cause the index value to be retrieved from the array of indices, an address of a particular data element location in the memory to be computed based on the index value and the base address, and the contents of the particular data element location to be prefetched into the specified cache using a read-for-ownership access in anticipation of a subsequent scatter operation targeting the particular data element location. In one embodiment, for each index value in the array of indices stored in successive positions in the array of indices, execution of the LoadIndicesScatterAndPrefetch instruction may also (or instead), cause a second index value to be retrieved from a position in the array of indices at a fixed distance from the position from which the index value for the element to be scattered was retrieved, an address of a second data element location in the memory to be computed based on the second index value and the base address, a data element to be retrieved from the source vector register identified for the instruction, and the data element to be stored to the computed address as part of a current scatter operation.

In one embodiment, a call of a LoadIndicesScatterAndPrefetch instruction may specify a scaling factor to be applied to each index value when computing a respective address of a data element location by the instruction. In one embodiment, the scaling factor may be encoded in the SIB type memory addressing operand. In one embodiment, the scaling factor may be one, two, four or eight. The specified scaling factor may be dependent on the size of the individual data elements to be scattered or prefetched by the instruction. In one embodiment, a call of a LoadIndicesScatterAndPrefetch instruction may include a cache hint parameter whose value indicates the level in the cache hierarchy into which data elements should be prefetched by the instruction. For example, a cache hint of "T0" may indicate that elements should be prefetched into a first level (L1) cache, and a cache hint of "T1" may indicate that elements should be prefetched into a second level (L2) cache.

In one embodiment, a call of a LoadIndicesScatterAndPrefetch instruction may specify the size of the data elements to be scattered or prefetched by the instruction. For example, a size parameter may indicate that the data elements are bytes, words, doublewords, or quadwords. In another example, a size parameter may indicate that the data elements represent signed or unsigned floating point values, such as single- or double-precision floating point values. In another embodiment, a call of a LoadIndicesScatterAndPrefetch instruction may specify the maximum number of data elements to be scattered or prefetched by the instruction. In one embodiment, a call of a LoadIndicesScatterAndPrefetch instruction may specify a fixed offset distance from a scattering operation at which prefetching is to occur, based on the relative positions of the index values used to compute the target addresses for the scattering operation and the prefetching operation. For example, during an iteration in which a data element whose address is computed using the index value in the tenth position in the array of indices is scattered by a LoadIndicesScatterAndPrefetch instruction for which a prefetching offset of 20 is specified, the instruction may prefetch the data element whose address is computed using the index value in the thirtieth position in the array of indices.

In one embodiment, a call of a LoadIndicesScatterAndPrefetch instruction may specify a mask register to be applied to conditionally perform the individual operations of the instruction. For example, a mask register may include a respective bit for each potentially scattered data element corresponding to the position in the array of indices containing the index value for that data element. In this example, if the respective bit for a given data element is set, its index value may be retrieved, the address to which it is scattered may be computed, the given data element may be retrieved from the source vector register, and the data element may be stored in memory at the computed address. If the respective bit for a given data element is not set, any or all of these operations may be elided for the given data element and the given data element will not be stored in the memory. In one embodiment, if the respective bit for a given data element is set, the contents of another location in memory, one that is computed based on the index value at a fixed distance from the index value for the data element that is scattered by the instruction, may be prefetched. If the respective bit for the given data element to be scattered is not set, these operations may be elided for the current iteration. In another embodiment, each iteration of the LoadIndicesScatterAndPrefetch instruction may prefetch the contents of a location in memory that is computed based on the index value at a fixed distance from the index value for the data element that might or might not have been scattered by the instruction dependent on the corresponding mask bit.

In one embodiment, if a call of a LoadIndicesScatterAndPrefetch instruction specifies a mask register to be applied when writing the result of the scatter portion of the operation to the memory, it may also specify the type of masking to be applied to the result, such as merging-masking or zero-masking. For example, if merging-masking is applied and the mask bit for a given data element is not set, the value that was stored in the location in memory to which the given data element would otherwise have been stored prior to the execution of the LoadIndicesScatterAndPrefetch instruction may be preserved. In another example, if zero-masking is applied and the mask bit for a given data element is not set, a NULL value, such as all zeros, may be written to the location in the memory to which the given data element (had it been scattered) would otherwise have been stored. In other embodiments, more, fewer, or different parameters may be referenced in a call of a LoadIndicesScatterAndPrefetch instruction.

In the example embodiment illustrated in FIG. 21B, at (1) the LoadIndicesScatterAndPrefetch instruction and its parameters (which may include any or all of the register and the memory address operands described above, a scaling factor, an indication of the size of the data elements to be scattered and/or prefetched, an indication of the maximum number of data elements to be scattered and/or prefetched, a cache hint, a parameter specifying a fixed offset distance at which prefetching is to occur, a parameter identifying a particular mask register, or a parameter specifying a masking type) may be received by SIMD execution unit 1912. For example, the LoadIndicesScatterAndPrefetch instruction may be issued to SIMD execution unit 1912 within a SIMD coprocessor 1910 by an allocator 1814 within a core 1812, in one embodiment. In another embodiment, the LoadIndicesScatterAndPrefetch instruction may be issued to SIMD execution unit 1912 within a SIMD coprocessor 1910 by a decoder 1922 of a main processor 1920. The LoadIndicesScatterAndPrefetch instruction may be executed logically by SIMD execution unit 1912.

In this example, a parameter for the LoadIndicesScatterAndPrefetch instruction may identify extended vector register ZMMn (2101) within an extended vector register file 1914 as the source vector register for scatters performed by the instruction. In this example, data elements that may potentially be scattered to various ones of data element locations 2103 in memory system 1803 may be stored in source vector register ZMMn (2101). In addition, data elements that may potentially be prefetched are stored in various ones of data element locations 2103 in memory system 1803. The data elements stored in source vector register ZMMn (2101) and data element locations 2103 may all be the same size, and the size may be specified by a parameter of the LoadIndicesScatterAndPrefetch instruction. The data elements that may potentially be prefetched by execution of the instruction may be stored in any random or arbitrary order within data element locations 2103. The data elements that may potentially be scattered by execution of the instruction may be scattered to locations within data element locations 2103 in any random or arbitrary order. In this example, the first possible location within data element locations 2103 from to data elements may be scattered or from which the contents may be prefetched is shown in FIG. 21B as base address location 2104. The address of base address location 2104 may be identified by a parameter of the LoadIndicesScatterAndPrefetch instruction. In this example, a mask register 2102 within SIMD execution unit 1912 may be identified as the mask register whose contents are to be used in a masking operation applied to the instruction, if specified.

In this example, the index values to be used in computing the addresses at which elements are to be scattered by the LoadIndicesScatterAndPrefetch instruction are stored in the array of indices 2105 in memory system 1830. In addition, the index values to be used in computing the addresses of elements to be prefetched by the LoadIndicesScatterAndPrefetch instruction are stored in the array of indices 2105 in memory system 1830. The array of indices 2105 includes, for example, a first index value 2106 in the first (lowest-order) position within the array of indices (location 0), a second index value 2107 in the second position within the array of indices (location 1), and so on. The last index value 2108 is stored in the last (highest-order position) within array of indices 2105. In this example, the LoadIndicesScatterAndPrefetch instruction may include a cache hint parameter identifying an L1 cache 1822 or L2 cache 1824 in memory subsystem 1830 as the cache into which elements are prefetched by the instruction. For example, a cache hint of "T0" may indicate that elements should be prefetched into L1 cache 1822, and a cache hint of "T1" may indicate that elements should be prefetched into L2 cache 1824.

Execution of the LoadIndicesScatterAndPrefetch instruction by SIMD execution unit 1912 may include, at (2) determining whether a mask bit corresponding to the next potential data element to be scattered is false, and if so, skipping the next potential load-index-and-scatter. For example, if bit 0 is false, the SIMD execution unit may refrain from performing some or all of steps (3) through (6) to scatter the data element whose address may be computed using the first index value 2106. However, if the mask bit corresponding to the next potential scatter is true, the next potential load-index-and-scatter may be performed. For example, if bit 1 is true, or if masking is not applied to the instruction, the SIMD execution unit may perform all of steps (3) through (6) to scatter the data element to a location within data element locations 2103 whose address is computed using the second index value 2107 and the address of base address location 2104.

For a potential load-index-and-scatter whose corresponding mask bit is true, or when no masking is applied, at (3) the index value for the next scatter may be retrieved. For example, during the first potential load-index-and-scatter, the first index value 2106 may be retrieved, during the second potential load-index-and-scatter, the second index value 2106 may be retrieved, and so on. At (4) the address for the next scatter may be computed based on the retrieved index value and the address of the base address location 2104. For example, the address for the next scatter may be computed as the sum of the base address and the retrieved index value, with or without scaling. At (5) the next data element may be retrieved from the source vector register ZMMn (2101) and at (6) the data element may be stored to a location within data element locations 2103 using the computed address.

Execution of the LoadIndicesScatterAndPrefetch instruction by SIMD execution unit 1912 may also include, at (7) retrieving the next index value for a prefetch. For example, the next index value for a prefetch may be retrieved from the position in array of indices 2105 that is separated from the position at which the index value for the scatter was retrieved by the fixed offset distance d specified for the instruction. For example, during the first iteration, the first index value 2106 may be retrieved for the scatter operation and an index value at position (0+d) may be retrieved for the prefetch operation. At (8) the address for the next prefetch may be computed based on the retrieved index value and the address of the base address location 2104. For example, the address for the next prefetch may be computed as the sum of the base address and the retrieved index value for the prefetch, with or without scaling. At (9) the next prefetch location may be accessed in the memory using the computed address for the prefetch, and at (10) the contents of that location may be prefetched using a read-for-ownership access. At (11) the prefetched data element may be written to L1 cache 1822 or L2 cache 1824, dependent on the cache hint specified for the instruction.

In one embodiment, execution of the LoadIndicesScatterAndPrefetch instruction may include repeating any or all of steps of the operation illustrated in FIG. 21B for each of the data elements to be potentially scattered to any of data element locations 2103 by the instruction and/or for the corresponding prefetch that takes place during the same iteration. For example, step (2) or steps (2) through (6) may be performed for a potential load-index-and-scatter, depending on the corresponding mask bit (if masking is applied). For example, if merging-masking is applied to the instruction, and if the data element corresponding to the first index value 2106 is not written to a location within data element locations 2103 because the mask bit for this data element is false, the value contained in the location to which the data element would have been stored prior to execution of the LoadIndicesScatterAndPrefetch instruction may be preserved. In another example, if zero-masking is applied to the instruction, and if the data element corresponding to the first index value 2106 is not written to a location within data element locations 2103 because the mask bit for this data element is false, a NULL value, such as all zeros, may be written to the location to which the data element would otherwise have been stored. In one embodiment, each data element to be scattered by the instruction may be stored in the location in the source vector register ZMIVIn (2101) corresponding to the position of the index value for the data element. For example, a data element for which a target scatter location is to be computed using second index value 2107 may be stored in the second position (position 1) within the source vector register ZMMn (2101).

In one embodiment, steps (7) to (11) may be performed during every iteration in order to prefetch from the maximum number of data element locations 2103, regardless of whether or the load-index-and-scatter portion of the iteration resulted in scattering a data element to a location within data element locations 2103. In another embodiment, steps (7) to (11) may also be elided when the mask bit for the corresponding potential scatter element is not set. In yet another embodiment, a second mask register may condition the operation of the prefetch portion of the instruction in steps (7) to (11) in each iteration. For example, each bit in the second register may condition the operation of one iteration of the steps (7) to (11) such that, for each bit that is set, a data element may be prefetched from a location that is indirectly addressed using an index value that, in the array of indices, is separated from the index value for the scatter portion of the iteration by distance d. In one embodiment, as data elements are prefetched from particular locations within data element locations 2103, the prefetching may cause multiple elements in adjacent locations to be prefetched and cached in L1 cache 1822 or L2 cache 1824 along with the target data elements. For example, 4, 8, 16 or 32 data elements may be prefetched into the identified cache at a time, depending on the size and location of the target of the prefetch, and the length of the cache line.

In this example, mask register 2102 is illustrated in FIG. 21B as a special-purpose register within SIMD execution unit 1912. In another embodiment, mask register 2102 may be implemented by a general-purpose or special-purpose register in the processor, but outside of the SIMD execution unit 1912. In yet another embodiment, mask register 2102 may be implemented by a vector register in extended vector register file 1914.

In one embodiment, the extended SIMD instruction set architecture may implement multiple versions or forms of a vector operation to load indices from an array of indices and prefetch elements from locations in sparse memory at which data element are to be subsequently scattered based on those indices. These instruction forms may include, for example, those shown below:

LoadIndicesAndPrefetchScatter{size} {kn} (PTR, PTR, hint)

LoadIndicesAndPrefetchScatter{size} {kn} ([vm32], [vm32], hint)

In the example forms of the LoadIndicesAndPrefetchScatter instruction shown above, the first PTR value or memory address operand may identify the base address location in memory. The second PTR value or memory address operand may identify the array of indices in memory. In these example forms of the LoadIndicesAnd-PrefetchScatter instruction, the "size" modifier may specify the size and/or type of the data elements to be prefeteched from locations in memory. In one embodiment, the specified size/type may be one of {B/W/D/Q/PS/PD}. In the example forms of the LoadIndicesAndPrefetchScatter instruction shown above, the hint parameter may indicate the cache into which data elements are to be prefetched. For example, a hint of "T0" may indicate that data elements are to be prefetched into a first level (L1) cache by the instruction, while a hint of "T1" may indicate that data elements are to be prefetched into a second level (L2) cache.

In these examples, the optional instruction parameter "$k_n$" may identify a particular one of multiple mask registers. This parameter may be specified when masking is to be applied to the LoadIndicesAndPrefetchScatter instruction. In embodiments in which masking is to be applied (e.g., if a mask register is specified for the instruction), the optional instruction parameter "z" may indicate whether or not zeroing-masking should be applied. In one embodiment, zero-masking may be applied if this optional parameter is set, and merging-masking may be applied if this optional parameter is not set or if this optional parameter is omitted. In other embodiments (not shown), a LoadIndicesAnd-PrefetchScatter instruction may include a parameter indicating the maximum number of data elements to be prefeteched. In another embodiment, the maximum number of data elements to be prefetched may be determined by the SIMD execution unit based on the number of index values stored in the array of index values.

In one embodiment, the extended SIMD instruction set architecture may implement multiple versions or forms of a vector operation to load indices from an array of indices, scatter one or more elements to locations in memory based on those indices, and prefetch the contents of other locations in the memory to which data elements are to be scattered at a later time. These instruction forms may include, for example, those shown below:

LoadIndicesScatterAndPrefetch{size} {kn} {z} (PTR, PTR, REG, hint, imm.)

LoadIndicesScatterAndPrefetch{size} {kn} {z} ([vm32], [vm32], REG, hint, imm.)

In the example forms of the LoadIndicesScatterAnd-Prefetch instruction shown above, the REG parameter may identify an extended vector register that serves as the source vector register for the instruction. In these examples, the first PTR value or memory address operand may identify the base address location in memory. The second PTR value or memory address operand may identify the array of indices in memory. In these example forms of the LoadIndicesScatterAndPrefetch instruction, the "size" modifier may specify the size and/or type of the data elements stored in the source vector register to be scattered to locations in memory and the size of the data elements to be prefetched into the identified cache by the instruction. In the example forms of the LoadIndicesScatterAndPrefetch instruction shown above, the hint parameter may indicate the cache into which data elements are to be prefetched. For example, a hint of "T0" may indicate that data elements are to be prefetched into a first level (L1) cache by the instruction, while a hint of "T1" may indicate that data elements are to be prefetched into a second level (L2) cache. In the example forms of the LoadIndicesScatterAndPrefetch instruction shown above, the immediate parameter value may indicate how far ahead prefetching occurs.

In one embodiment, the specified size/type may be one of {B/W/D/Q/PS/PD}. In these examples, the optional instruction parameter "$k_n$" may identify a particular one of multiple mask registers. This parameter may be specified when masking is to be applied to the LoadIndicesScatterAnd-Prefetch instruction. In embodiments in which masking is to be applied (e.g., if a mask register is specified for the instruction), the optional instruction parameter "z" may indicate whether or not zeroing-masking should be applied. In one embodiment, zero-masking may be applied if this optional parameter is set, and merging-masking may be applied if this optional parameter is not set or if this optional parameter is omitted. In other embodiments (not shown), a LoadIndicesScatterAndPrefetch instruction may include a parameter indicating the maximum number of data elements to be scattered or the maximum number of locations from which to prefetch. In one embodiment, the maximum number of data elements to be scattered or prefetched may be determined by the SIMD execution unit based on the number of index values stored in the array of index values. In yet another embodiment, the maximum number of data elements to be scattered may be determined by the SIMD execution unit based on the capacity of the source vector register.

Figure 22A:
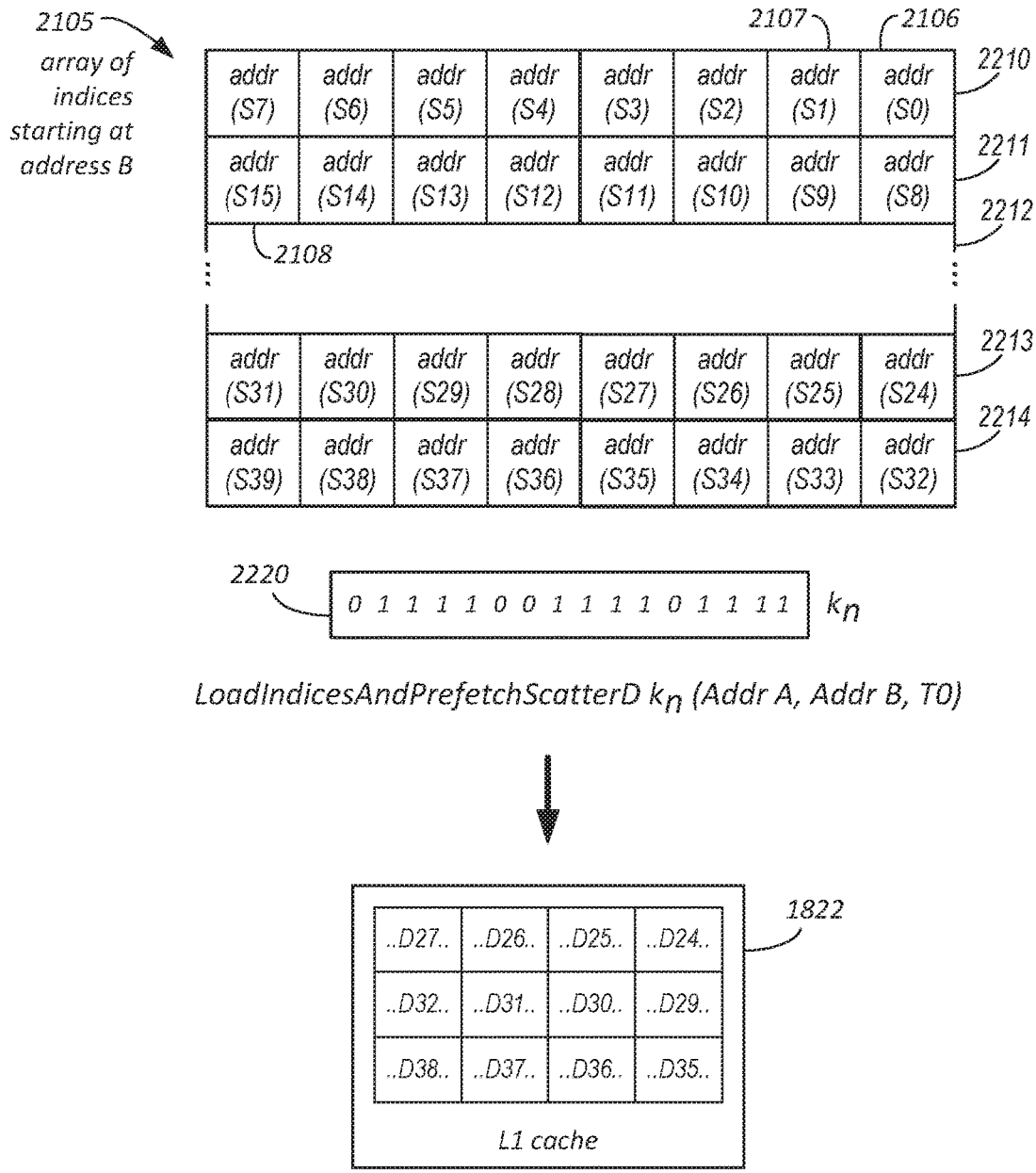
FIG. 22A illustrates the operation of an example LoadIndicesandPrefetchScatter instruction, in accordance with embodiments of the present disclosure.
Figure 22B:
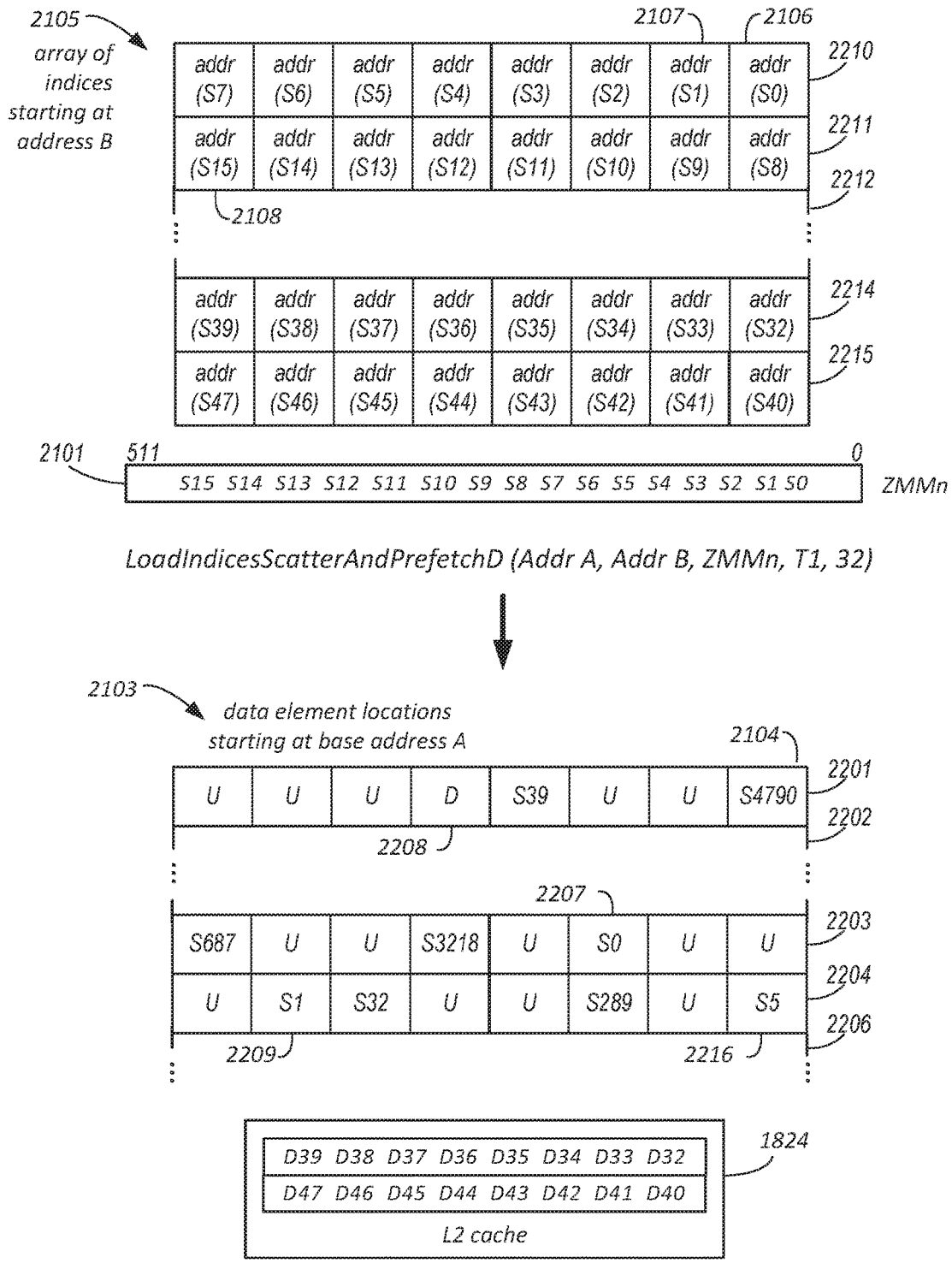
FIG. 22B illustrates the operation of an example LoadIndicesScatterandPrefetch instruction, in accordance with embodiments of the present disclosure.

FIGS. 22A and 22B illustrate the operation of respective forms of Load-Indices-and-Prefetch-Scatters type instructions, in accordance with embodiments of the present disclosure. More specifically, FIG. 22A illustrates the operation of an example LoadIndicesandPrefetchScatter instruction that specifies an optional mask register and FIG. 22B illustrates the operation of an example LoadIndicesScatterandPrefetch instruction that does not specify an optional mask register.

FIGS. 22A and 22B both illustrate an array of indices 2105. In these examples, the indices stored in array of indices 2105 are organized in rows. While FIGS. 22A and 22B do not depict all of the same row and index values, rows and index values having like reference numbers in the two figures may be assumed to be similar. In these examples, an index value corresponding to a first data element S0 that may potentially be stored to memory by a scatter operation is stored in the lowest-order address within the array of indices 2105, shown at address B (2106) in row 2210. In these examples, the index value corresponding to a second data element 51 that may potentially be stored to the memory by a scatter operation is stored in the second-lowest-order address within the array of indices 2105, shown at address (2107) in row 2210. An index value corresponding to a sixteenth data element S15 that may potentially be stored to the memory by a scatter operation is stored in the highest-order position in row 2212, at address 2108. In these example, all of the rows of the array of indices 2105 (including rows 2210-2214 depicted in FIG. 22A and rows 2210-2215 depicted in FIG. 22B) each contain eight index values in sequential order.

FIGS. 22A and 22B also both illustrate a source vector register ZMMn (2101) in which data elements that may potentially be stored to various ones of data element locations 2103 by a scatter operation. In one embodiment, the source data elements stored in source vector register ZMMn (2101) may be stored in contiguous locations within source vector register ZMMn (2101) in order of their corresponding index values.

FIG. 22A illustrates the operation of a "LoadIndicesAnd-PrefetchScatterD $k_n$ (Addr A, Addr B, ZMMn, T0) instruction" that specifies a mask register. In this example, a mask register $k_n$ (2220) includes sixteen bits, each corresponding to an index value in the array of indices 2105. In this example, the bits in positions 5, 10, 11, and 16 (bits 4, 9, 10, and 15) are false, while the remaining bits are true. Therefore, the operations illustrated as steps (3)-(7) in FIG. 21A may not be performed for the fifth, tenth, eleventh, or sixteenth iterations of those operations in the instruction.

In the example illustrated in FIG. 22A, execution of the vector instruction "LoadIndicesAndPrefetchScatterD k$_n$ (Addr A, Addr B, ZMMn, T0)" may cause twelve of the first sixteen index values (beginning at location 0) in the array of indices 2105 to be loaded into an index register (not shown) and used to compute the addresses for locations at which to perform a prefetch, assuming ownership of those locations in anticipation of an upcoming scatter operation. In one embodiment, these prefetches may be performed in parallel or simultaneously. In this example, the fifth, tenth, eleventh, and sixteenth index values will not be loaded, nor will the contents of the locations that are indirectly addressable based on these index values be prefetched. In this example, the fixed offset distance at which prefetching occurs is 24.

Execution of this instruction may cause the current contents of locations in memory that are indirectly addressed using twelve of the sixteen index values beginning at location 24 in the array of indices 2105 to be prefetched to a first level (L1) cache 1822 (which is identified by the cache hint "T0"). In one embodiment, these may be performed in parallel or simultaneously. In one embodiment, this fixed offset distance may be determined automatically by the system. For example, the fixed offset may be computed by the SIMD execution unit. The fixed offset may be based on the latency between when elements are prefetched and when they are available for use. The fixed offset may be based on the expected time between when values are prefetched and when they are predicted likely to be the target of a scatter operation.

Execution of this instruction may yield the result shown at the bottom of FIG. 22A. In this example, following the execution of this instruction, L1 cache 1822 (which is identified by the cache hint "T0") contains the contents of the twelve locations that were targets of a prefetch operation performed by the instruction. The addresses of these twelve locations within data element locations 2103 were computed based on base address 2104 and the respective index values retrieved for the prefetch operations from array of indices 2105. The specific locations within data element locations 2103 at which the prefetches were performed, which are arbitrary, are not shown in the figure. In this example, the data prefetched into L1 cache 1822 is arbitrary data (designated as "Dn") that happened to be stored in data element locations that are potential targets of a subsequent scatter operation. For example, the data prefetched into L1 cache 1822 includes arbitrary data elements D24-D27(whose addresses in data element locations 2103 were computed based on index values 24-27), D29-32 (whose addresses in data element locations 2103 were computed based on index values 29 -32), and data elements D35-D38 (whose addresses in data element locations 2103 were computed based on index values 35-38).

In one embodiment, as data elements are prefetched from particular locations within data element locations 2103, the prefetching may cause multiple elements in adjacent locations to be prefetched and cached in L1 cache 1822 along with the target data elements. For example, 4, 8, 16 or 32 data elements may be prefetched into the identified cache at a time, depending on the size and location of the target of the prefetch, and the length of the cache line. This is illustrated in FIG. 22A by the sub-blocks within L1 cache 1822. In this example, each sub-blocked fetched into the cache includes the contents of the location targeted by the prefetch and other elements that were prefetched along with the targeted element. In this example, because index values 28, 33, 34, and 39 correspond to mask register bits that are not set, the current contents of the locations in data element locations 2103 that are indirectly addressable using these index values was not prefetched into L1 cache 1822.

FIG. 22B illustrates the operation of an example Load-Indices-Scatter-and-Prefetch instruction that does not specify an optional mask register. This instruction includes a cache hint "T1" indicating that any prefetched elements are to be stored to a second level (L2) cache. This instruction also explicitly specifies a fixed offset distance (32) at which prefetching is to occur. In this example, the instruction may operate on the same data elements stored in the source vector register ZMMn (2101) and may use the same array of indices 2105 as the instruction whose operation is illustrated in FIG. 22A, although not all of the individual elements, index values, or rows of these structures included in the two figures are the same.

FIG. 22B also illustrates a group of data element locations 2103. Any locations within data element locations 2103 may be potential targets of a scatter operation that stores data elements to random locations or to locations in sparse memory (e.g., a sparse array). In this example, the locations within data element locations 2103 are organized in rows. For example, data element locations 2103 includes rows 2201-2206, each of which includes eight potential target locations into which data elements may be scattered. As illustrated in FIG. 22B, while the index values stored in array of indices 2105 are stored in sequential order, the data elements whose target destination locations are indirectly accessed by those index values may be stored in any order in the memory by a scatter operation.

In this example, some locations within data element locations 2103 may include data stored to the memory by one or more previous instructions, some of which may include vector instructions. For example, data elements 54790 (at base address 2104) and S39 in row 2201, data elements 53218 and 5687 in row 2203, and data elements S32 and S289 in row 2204 may have been stored in the locations shown by one or more previous scatter operations. Multiple rows 2202 (between row 2201 and row 2203) or rows 2206 (beyond row 2204) may also include data elements stored to locations within these rows by previous instructions. In one embodiment, the data element locations whose contents are designated with "U" in FIG. 22B may be unused. In this example, they may also be unaffected by the execution of the example forms of Load-Indices-and-Scatter instructions whose operations are depicted in the figures. In one example, they may contain NULL values. In another example, they may be unpopulated locations within a sparse array.

Execution of a vector instruction "LoadIndicesScatterAndPrefetchD (Addr A, Addr B, ZMMn, T1, 32)" may cause sixteen index values beginning at location 0 in the array of indices 2105 to be loaded into an index register (not shown) for an upcoming scatter operation. In this example, no masking is specified for the instruction. Execution of this instruction may also cause the sixteen data elements in source vector register ZMMn (2101) to be stored to locations in data element locations 2103 that are indirectly addressed using the sixteen index values beginning at location 0 in the array of indices 2105. In one embodiment, these may be performed in parallel or simultaneously. Execution of this instruction may also cause the contents of sixteen locations within data element locations 2105 to be prefetched into a cache. More specifically, execution of this instruction may cause the addresses of sixteen prefetch target locations to be computed using the sixteen index values beginning at location 32 in the array of indices 2105, and the contents of those prefetch target locations to be prefetched to a second level (L2) cache 1824 (which is identified by the cache hint "T1"). In this example, the fixed offset distance at which prefetching occurs (32) is explicitly specified by a parameter of the instruction.

Execution of the LoadIndicesScatterAndPrefetchD (ZMMn, Addr A, Addr B, T1, 32) instruction may yield the result shown at the bottom of FIG. 22B. In this example, following the execution of this instruction, the sixteen data elements S0-15 stored in ZMMn register 2101 may be stored in respective locations within data element locations 2103 whose addresses were computed based on base address 2104 and the respective index values retrieved from the first sixteen positions within array of indices 2105. Each data element that was scattered to the memory was stored in a position consistent with the position of its index value in array of indices 2105. For example, data element S0 was stored in the first position (position 0) in ZMMn register 2101, and the index value in the first position (position 0) within array of indices 2105 was used to compute the address of the location at which it was stored by the scatter operation (address 2207). Similarly, data element Si was stored in the second position in ZMMn register 2101, the index value in the second position within array of indices 2105 was used to compute the address of the location at which data element Si was stored by the scatter operation (address 2209), data element S5 was stored in the sixth position in ZMMn register 2101, and the index value in the sixth position within array of indices 2105 was used to compute the address of the location at which data element S5 was stored by the scatter operation (address 2216), and so on.

In this example, following execution of the instruction, sixteen data elements D32-D47 that were prefetched by the instruction are shown within L2 cache 1824. In this example, the data prefetched into L2 cache 1824 is arbitrary data that happened to be stored in data element locations that are potential targets of a subsequent scatter operation. These data elements were prefetched from locations whose addresses were computed based respective index values retrieved from the sixteen positions within array of indices 2105 at a distance of 32 from the positions from which index values for the scattered data elements were retrieved. In one embodiment, as data elements are prefetched from particular locations within data element locations 2103, the prefetching may cause multiple elements in adjacent locations to be prefetched and cached in L2 cache 1824 along with the target data elements. For example, 4, 8, 16 or 32 data elements may be prefetched into the identified cache at a time, depending on the size and location of the target of the prefetch, and the length of the cache line. However, for simplicity, this not is illustrated in FIG. 22B.

Figure 23:
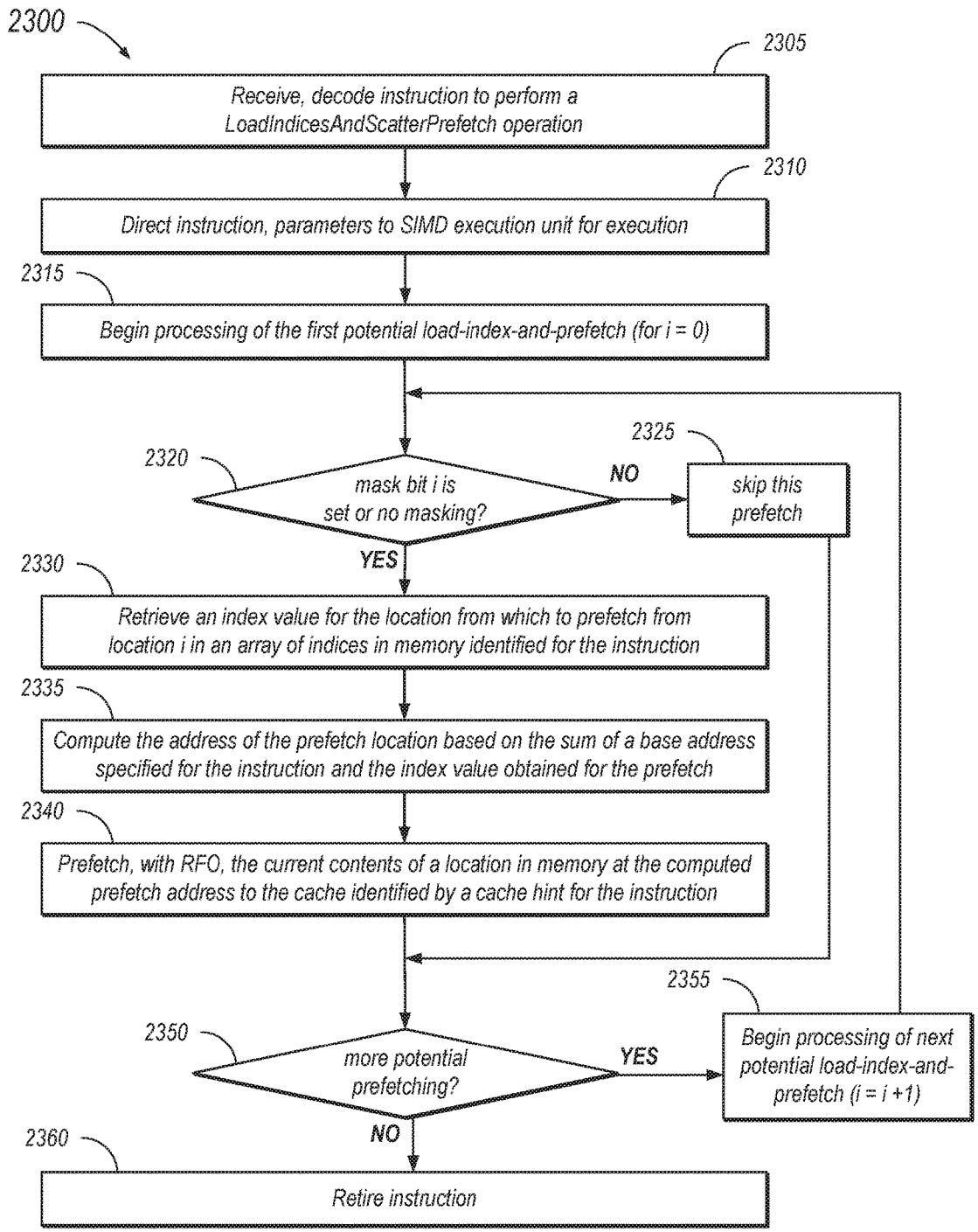
FIG. 23 illustrates an example method for loading indices from an array of indices and prefetching from locations in sparse memory based on those indices, taking ownership of the locations in memory for a subsequent scatter, in accordance with embodiments of the present disclosure.

FIG. 23 illustrates an example method 2300 for loading indices from an array of indices and prefetching from locations in sparse memory based on those indices, taking ownership of the locations in memory for a subsequent scatter, in accordance with embodiments of the present disclosure. Method 2300 may be implemented by any of the elements shown in FIGS. 1-22. Method 2300 may be initiated by any suitable criteria and may initiate operation at any suitable point. In one embodiment, method 2300 may initiate operation at 2305. Method 2300 may include greater or fewer steps than those illustrated. Moreover, method 2300 may execute its steps in an order different than those illustrated below. Method 2300 may terminate at any suitable step. Moreover, method 2300 may repeat operation at any suitable step. Method 2300 may perform any of its steps in parallel with other steps of method 2300, or in parallel with steps of other methods. Furthermore, method 2300 may be executed multiple times to perform loading indices from an array of indices and prefetching from locations in sparse memory based on those indices, taking ownership of the locations in memory for a subsequent scatter.

At 2305, in one embodiment, an instruction to perform loading indices from an array of indices and prefetching from locations in sparse memory based on those indices, taking ownership of the locations in memory for a subsequent scatter may be received and decoded. For example, a LoadIndicesAndPrefetchScatter instruction may be received and decoded. At 2310, the instruction and one or more parameters of the instruction may be directed to a SIMD execution unit for execution. In some embodiments, the instruction parameters may include an identifier of or pointer to an array of indices in memory, an identifier of or pointer to a base address for a group of data element locations in memory, including data element locations that may be targets of a subsequent scatter operation, an indication of the size of the data elements to be prefetched, an indication of the maximum number of data elements to be prefetched, a cache hint indicating that data elements should be prefetched into a particular cache in the cache hierarchy, a parameter identifying a particular mask register, or a parameter specifying a masking type.

At 2315, in one embodiment, processing of the first potential load-index-and-prefetch may begin. For example, a first iteration of the steps shown in 2320-2355, corresponding to the first position (location i=0) in the array of indices in memory identified for the instruction, may begin. If (at 2320) it is determined that a mask bit corresponding to the first position in the array of indices (location 0) is not set, then the steps shown in 2320-2355 may be elided for this iteration. In this case, the value in the locations in memory that is indirectly addressed using the index value in the first position in the array of indices will not be prefetched.

If (at 2320) it is determined that the mask bit corresponding to the first position in the array of indices is set or that no masking has been specified for the LoadIndicesAnd-PrefetchScatter operation, then at 2330, an index value for the first location at which to perform a prefetch may be retrieved from location i (location 0) in the array of indices. At 2335, the address of the target prefetch location may be computed based on the sum of the base address specified for the instruction and the index value obtained for the first prefetch. At 2340, the contents of the target prefetch location at the computed address may be prefetched into a cache that is identified by a cache hint parameter for the instruction. In one embodiment, the contents of the target prefetch location may be prefetch with a read-for-ownership access.

If (at 2350), it is determined that there are more potential prefetches to be performed, then at 2355 processing of the next potential load-index-and-prefetch may begin. For example, a second iteration of the steps shown in 2320-2355, corresponding to the second position in the array of indices (location i=2) may begin. Until the maximum number of iterations (i) has been performed, the steps shown in 2320-2355 may be repeated for each additional iteration with the next value of i. For each additional iteration, if (at 2320) it is determined that a mask bit corresponding to the next position in the array of indices (location i) is not set, then the steps shown in 2320-2355 may be elided for this iteration. In this case, at 2325, the current contents of the location in memory that is indirectly addressed using the index value in position i in the array of indices will not be prefetched. However, if (at 2320) it is determined that the mask bit corresponding to the next position in the array of indices is set or that no masking has been specified for the LoadIndicesAndPrefetchScatter operation, then at 2330, the index value may be retrieved from the next position within the array of indices. At 2335, the address of the next location in memory from which the current contents are to be prefetched may be computed based on the sum of the base address specified for the instruction and the index value obtained for the next prefetch. At 2340, the contents of the location in memory at the computed address may be prefetched into the specified cache.

In one embodiment, the number of iterations may be dependent on a parameter for the instruction. For example, a parameter of the instruction may specify the number of index values in the array of indices. This may represent a maximum loop index value for the instruction, and thus, the maximum number of prefetches that can be performed by the instruction. Once the maximum number of iterations (i) has been performed, the instruction may be retired (at 2360).

Figure 24:
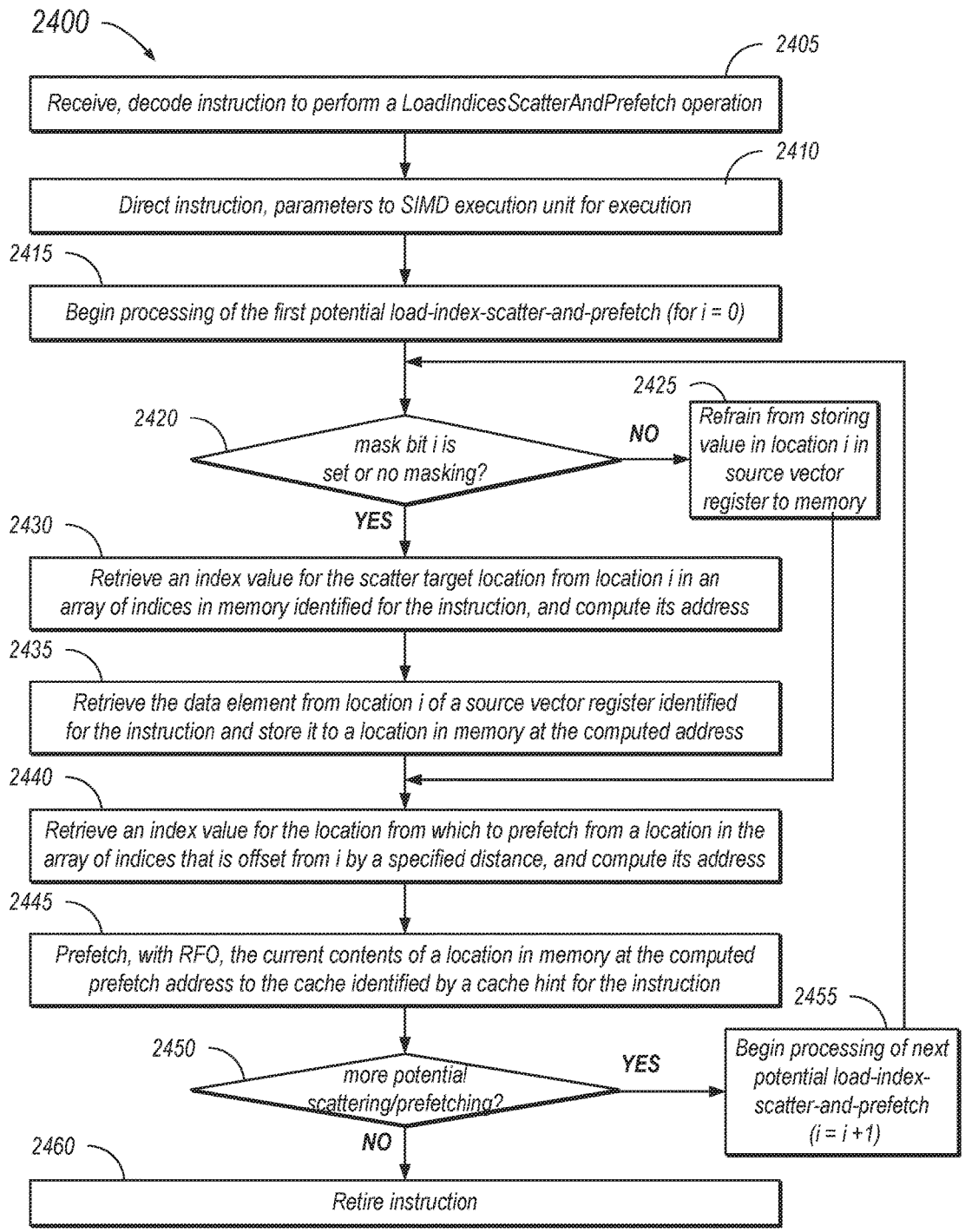
FIG. 24 illustrates an example method for loading indices from an array of indices, scattering elements to locations in sparse memory based on those indices, and prefetching from additional locations in the memory, taking ownership of the additional locations in memory for a subsequent scatter, in accordance with embodiments of the present disclosure.

In one embodiment, a LoadIndicesAndPrefetchScatter type operation may load indices from an array of indices, scatter elements to locations in sparse memory based on those indices, and prefetch other elements from locations that may potentially be targets of a scatter operation at a later time. For example, a LoadIndicesAndPrefetchScatter type operation of the form LoadIndicesAndPrefetchScatter may be executed to load indices from an array of indices, scatter elements to locations in sparse memory based on those indices, and prefetch other elements from locations the may potentially be targets of a scatter at a later time. FIG. 24 illustrates an example method for loading indices from an array of indices, scattering elements to locations in sparse memory based on those indices, and prefetching from additional locations in the memory, taking ownership of the additional locations in memory for a subsequent scatter, in accordance with embodiments of the present disclosure.

Method 2400 may be implemented by any of the elements shown in FIGS. 1-22. Method 2400 may be initiated by any suitable criteria and may initiate operation at any suitable point. In one embodiment, method 2400 may initiate operation at 2405. Method 2400 may include greater or fewer steps than those illustrated. Moreover, method 2400 may execute its steps in an order different than those illustrated below. Method 2400 may terminate at any suitable step. Moreover, method 2400 may repeat operation at any suitable step. Method 2400 may perform any of its steps in parallel with other steps of method 2400, or in parallel with steps of other methods. Furthermore, method 2400 may be executed multiple times to perform loading indices from an array of indices, scattering elements to locations in sparse memory based on those indices, and prefetching from additional locations in the memory, taking ownership of the additional locations in memory for a subsequent scatter.

At 2405, in one embodiment, an instruction to perform loading indices from an array of indices, scattering elements to locations in sparse memory based on those indices, and prefetching from additional locations in the memory, taking ownership of the additional locations in memory for a subsequent scatter. For example, a LoadIndicesScatterAndPrefetch instruction may be received and decoded. At 2410, the instruction and one or more parameters of the instruction may be directed to a SIMD execution unit for execution. In some embodiments, the instruction parameters may include an identifier of or pointer to an array of indices in memory, an identifier of or pointer to a base address for a group of potential data element locations in memory, including data element locations that may be targets of a subsequent scatter operation, and other data element locations that may be targets of current prefetch operation, an identifier of a source register (which may be an extended vector register), an indication of the size of the data elements to be scattered and/or prefetched, an indication of the maximum number of data elements to be scattered and/or prefetched, a cache hint indicating that data elements should be prefetched into a particular cache in the cache hierarchy, a parameter specifying a fixed distance between an index value position within the array of indices that is (potentially) being used to scatter a data element during a given iteration and an index value position within the array of indices that is being used to prefetch a data element from a location that may be the target of a subsequent scatter operation, a parameter identifying a particular mask register, or a parameter specifying a masking type.

At 2415, in one embodiment, processing of the first potential load-index-scatter-and-prefetch may begin. For example, a first iteration of the steps shown in 2420-2455, corresponding to the first position (location i=0) in the array of indices in memory identified for the instruction, may begin. If (at 2420) it is determined that a mask bit corresponding to the first position in the array of indices (location 0) is not set, then the steps shown in 2430-2435 may be elided for this iteration. In this case, the data element stored in the first position (location i=0) in the source register will not be stored to the location in memory that is indirectly addressed using the index value in the first position in the array of indices by the instruction.

If (at 2420) it is determined that the mask bit corresponding to the first position in the array of indices is set or that no masking has been specified for the LoadIndicesScatterAndPrefetch operation, then at 2430, an index value for the first element to be scattered may be retrieved from location i (location 0) in the array of indices, and the address at which the first element is to be scattered may be computed. In one embodiment, the address of the first element to be scattered may be computed based on the sum of the base address specified for the instruction and the index value obtained for the first element to be scattered. At 2435, the first element to be scattered may be retrieved from location i (location 0) of a destination register identified by a parameter for the instruction, and stored to the location in memory at the computed address.

At 2440, in one embodiment, regardless of whether or not the operations shown in steps 2430-2435 are performed during the first iteration, an index value for an element to be prefetched may be retrieved from a location in the array of indices that is offset from location i by the prefetch offset distance specified for the instruction, and the address for the element to be prefetched may be computed. In one embodiment, the address of the element to be prefetched may be computed based on the sum of the base address specified for the instruction and the index value obtained for the element to be prefetched. At 2445, the address of the element to be prefetched may be prefetched from a location in memory at the computed address, after which it may be stored in a cache that is identified by a cache hint parameter for the instruction. In one embodiment, the contents of the prefetch target location may be prefetched using a read-for-ownership access.

If (at 2450), it is determined that there is more potential scattering or prefetching to be performed, then at 2455 processing of the next potential load-index-scatter-andprefetch may begin. For example, a second iteration of the steps shown in 2420-2455, corresponding to the second position in the array of indices (location i=2) may begin. Until the maximum number of iterations (i) has been performed, the steps shown in 2420-2455 may be repeated for each additional iteration with the next value of i, as appropriate. For each additional iteration, if (at 2420) it is determined that a mask bit corresponding to the next position in the array of indices (location i) is not set, then the steps shown in 2430-2435 may be elided for this iteration. In this case, at 2425, the data element that was stored in location i in the source register prior to the execution of the LoadIndicesScatterAndPrefetch instruction may not be stored to the memory. However, if (at 2420) it is determined that the mask bit corresponding to the next position in the array of indices is set or that no masking has been specified for the LoadIndicesScatterAndPrefetch operation, then at 2430, an index value for the next location at which to perform a prefetch may be retrieved from location i in the array of indices, and the address of the location in memory at which to scatter a data element may be computed. At 2435, the data element that was stored in location i in the source register may be stored to the memory at the computed address. At 2440, for each additional iteration, an index value for an element to be prefetched may be retrieved from a location in the array of indices that is offset from location i by the specified distance, and the address for location at which to perform a prefetch may be computed. At 2445, the address of the contents of the location at the computed address may be prefetched from the location in memory at the computed address into the cache that is identified by the cache hint parameter for the instruction. In one embodiment, the contents of the prefetch target location may be prefetched using a read-for-ownership access.

In one embodiment, the number of iterations may be dependent on a parameter for the instruction. For example, a parameter of the instruction may specify the number of index values in the array of indices. This may represent a maximum loop index value for the instruction, and thus, the maximum number of data elements that can be scattered by the instruction and the maximum number of data elements that can be prefetched by the instruction. Once the maximum number of iterations (i) has been performed, the instruction may be retired (at 2460).

While several examples describe forms of the LoadIndicesAndPrefetchScatter instruction and the LoadIndicesScatterAndPrefetch instruction store data elements to be scattered to memory in an extended vector register (ZMM register), in other embodiments, these instructions may operate on source data elements stored in vector registers having fewer than 512 bits. For example, if the maximum number of data elements to be scattered can, based on their size, be stored in 256 bits or fewer, the LoadIndicesAndPrefetchScatter instruction may retrieve the data elements to be scattered from a YMM destination register or an XMM destination register. In several of the examples described above, the data elements to be scattered and/or prefetched are relatively small (e.g., 32 bits) and there are few enough of them that all of them can be stored in a single ZMM register. In other embodiments, there may be enough potential data elements to be scattered that (depending on the size of the data elements) they may fill multiple ZMM source registers. For example, there may be more than 512 bits worth of data elements to be scattered by the instruction.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a front end to receive an instruction, a decoder to decode the instruction, a core to execute the instruction, and a retirement unit to retire the instruction. To execute the instruction, the core may include a first logic Some embodiments of the present disclosure include a processor. In at least some of these embodiments, the processor may include a front end to receive an instruction, a decoder to decode the instruction, a core to execute the instruction, and a retirement unit to retire the instruction. To execute the instruction, the core may include a first logic to retrieve a first index value from an array of indices, the array of indices to be located at an index base address in a memory based on a first parameter for the instruction, a second logic to compute a first element address, the first element address to identify a location at which to scatter a first data element in the memory based on the first index value, and a data base address for a group of potential data element locations in the memory, the data base address based on a second parameter for the instruction, and a third logic to prefetch, to a cache, the contents of a location in the memory at the first element address, including a fourth logic to perform a read-for-ownership access. In combination with any of the above embodiments, the core may further include a fifth logic to retrieve a second index value from the array of indices, the second index value to be adjacent to the first index value within the array, a sixth logic to compute a second element address, the second element address to identify a location at which to scatter a second data element in the memory, the second element address to be nonadjacent to the first element address, based on the second index value and the data base address, a seventh logic to prefetch, to the cache, the contents of a location in the memory at the second element address, including an eighth logic to perform a read-for-ownership access. In combination with any of the above embodiments, the core may further includes a fifth logic to retrieve a second index value from the array of indices simultaneously with the retrieval of the first index value, the second index value to be adjacent to the first index value within the array, a sixth logic to compute a second element address simultaneously with the computation of the first element address, the second element address to identify a location at which to scatter a second data element in the memory, the second element address to be nonadjacent to the first element address, based on the second index value, and the data base address, a seventh logic to prefetch to the cache, simultaneously with the prefetch of the contents of the location at the first element address, the contents of a location in the memory at the second element address, including an eighth logic to perform a read-for-ownership access. In combination with any of the above embodiments, the core may further include a fifth logic to retrieve a second index value the array of indices, the second index value to be located at the lowest-order position within the array of indices, and the second index value to precede the first index value within the array of indices by a fixed distance, a sixth logic to compute a second element address, the second element address to identify a location to which a second data element is to be scattered based on the second index value, and the data base address, and a seventh logic to retrieve the second data element from a source vector register identified by a third parameter for the instruction, the second data element to be retrieved from the lowest-order position in the source vector register, an eighth logic to store the second data element to a location in the memory at the second element address, and a ninth logic to determine the fixed distance. In combination with any of the above embodiments, the core may further include a fifth logic to retrieve a second index value the array of indices, the second index value to be located at the lowest-order position within the array of indices, and the second index value to precede the first index value within the array of indices by a fixed distance, a sixth logic to compute a second element address, the second element address to identify a location to which a second data element is to be scattered based on the second index value, and the data base address, and a seventh logic to retrieve the second data element from a source vector register identified by a third parameter for the instruction, the second data element to be retrieved from the lowest-order position in the source vector register, an eighth logic to store the second data element to a location in the memory at the second element address, and a ninth logic to determine the fixed distance based on a fourth parameter for the instruction. In combination with any of the above embodiments, the core may further include a fifth logic to determine that a bit in a mask register for a second index value is not set, the mask register identified based on a third parameter for the instruction, and a sixth logic to elide, based on the determination that the bit in the mask is not set, retrieval of the second index value, computation of a second element address identifying a location at which to scatter a second data element based on the second index value, retrieval of the second data element from a source vector register identified by a fourth parameter for the instruction, and storage of the second data element to a location in the memory at the second element address, and a seventh logic to preserve, based on the determination that the bit in the mask is not set, the value in the location in the memory at the second element address. In combination with any of the above embodiments, the core may include a fifth logic to compute the first element address as a sum of the first index value and the data base address. In combination with any of the above embodiments, the core may include a fifth logic to clear each bit in the mask register after it has been determined whether or not the bit was set. In combination with any of the above embodiments, the core may further include a fifth logic to determine that a bit in a mask register for an additional index value is set, the mask register identified based on a fourth parameter for the instruction, a sixth logic to elide, based the determination that the bit in the mask is not set retrieval of the additional index value, computation of an additional element address based on the additional index value, the additional element address identifying a location at which to scatter an additional data element, retrieval of the additional data element from the source vector register, and storage of the additional data element to a location in the memory with the additional element address, and a seventh logic to logic to store, based on the determination that the bit in the mask is not set, a NULL value in the location in the memory with the additional element address. In any of the above embodiments, the core may include a fifth logic to determine the size of the data elements based on a parameter for the instruction. In any of the above embodiments, the core may include a fifth logic to determine the type of the data elements based on a parameter for the instruction. In any of the above embodiments, the cache into which data elements are prefetched may be identified by a third parameter for the instruction. In any of the above embodiments, the first parameter for the instruction may be a pointer. In any of the above embodiments, the second parameter for the instruction may be a pointer. In any of the above embodiments, the processor may include a Single Instruction Multiple Data (SIMD) coprocessor to implement execution of the instruction. In any of the above embodiments, the processor may include a vector register file that includes the destination vector register.

Some embodiments of the present disclosure include a method. In at least some of these embodiments, the method may include, in a processor, receiving a first instruction, decoding the first instruction, executing the first instruction, and retiring the first instruction. Executing the first instruction may include retrieving a first index value from an array of indices, the array of indices being located at an index base address in a memory based on a first parameter for the instruction, and computing a first element address, the first element address identifying a location at which to scatter a first data element in the memory based on the first index value, and a data base address for a group of potential data element locations in the memory, the base address based on a second parameter for the instruction, and prefetching, to a cache, the contents of a location in the memory at the first element address, including performing a read-for-ownership access, and retiring the instruction. In combination with any of the above embodiments, the method may further include retrieving a second index value from the array of indices, the second index value being adjacent to the first index value within the array, computing a second element address, the second element address to identify a location at which to scatter a second data element in the memory, the second element address being nonadjacent to the first element address, based on the second index value, and the data base address, prefetching, to the cache, the contents of a location in the memory at the second element address, including performing a read-for-ownership access. In combination with any of the above embodiments, the method may further include retrieving a second index value from the array of indices simultaneously with retrieving the first index value, the second index value being adjacent to the first index value within the array, computing a second element address simultaneously with computing the first element address, the second element address to identify a location at which to scatter a second data element in the memory, the second element address being nonadjacent to the first element address, based on the second index value, and the data base address, prefetching to the cache, simultaneously with prefetching the contents of the location at the first element address, the contents of a location in the memory at the second element address, including performing a read-for-ownership access. In combination with any of the above embodiments, the method may further include determining, prior to retrieving the first index value, a fixed distance between positions in the array of index values used in scattering data elements from the memory and positions in the array of index values used in prefetching data elements from the memory, retrieving a second index value from the array of indices, the second index value being located at the lowest-order position within the array of indices, and the second position preceding the first index value within the array of indices by the fixed distance, computing a second element address, the second element address identifying a second location in the memory at which to scatter a second data element based on the second index value, and the data base address, and retrieving the second data element from the lowest-order position in a source vector register identified by a third parameter of the instruction, and storing the second data element to a location in the memory at the second element address. In combination with any of the above embodiments, the method may further include determining, based on a third parameter for the instruction, a fixed distance between positions in the array of index values used in scattering data elements from the memory and positions in the array of index values used in prefetching data elements from the memory, retrieving a second index value from the array of indices, the second index value being located at the lowest-order position within the array of indices, and the second position preceding the first index value within the array of indices by the fixed distance, computing a second element address, the second element address identifying a second location in the memory at which to scatter a second data element based on the second index value, and the data base address, and retrieving the second data element from the lowest-order position in a source vector register identified by a third parameter of the instruction, and storing the second data element to a location in the memory at the second element address. In combination with any of the above embodiments, the method may further include determining that a bit in a mask register for a second index value is not set, the mask register being identified based on a third parameter for the instruction, eliding, based on determining that the bit in the mask is not set, retrieving the second index value from a source vector register identified by a fourth parameter for the instruction, computing a second element address, the second element address identifying a location at which to scatter a second data element based on the second index value, retrieving the second data element from the source vector register, and storing the second data element to a location in the memory at the second element address, and preserving, based on determining that the bit in the mask is not set, the value in the location in the memory at the second element address. In combination with any of the above embodiments, the method may include computing the first element address as a sum of the first index value and the base address for the group of data element locations in the memory. In combination with any of the above embodiments, the method may include clearing each bit in the mask register after it has been determined whether or not the bit was set. In combination with any of the above embodiments, the method may further include determining that a bit in a mask register for an additional index value is set, the mask register being identified based on a fourth parameter for the instruction, eliding, in response to determining that the bit in the mask is not set, retrieving the additional index value, computing an additional element address based on the additional index value, retrieving the additional data element from the source vector register, and storing the additional data element to a location in the memory with the additional address element, and storing a NULL value in the location in the memory with the additional element address. In any of the above embodiments, the method may include determining the size of the data elements based on a parameter for the instruction. In any of the above embodiments, the method may include determining the type of the data elements based on a parameter for the instruction. In any of the above embodiments, the first parameter for the instruction may be a pointer. In any of the above embodiments, the second parameter for the instruction may be a pointer. In any of the above embodiments, the cache into which data elements are prefetched may be identified by a third parameter for the instruction.

Some embodiments of the present disclosure include a system. In at least some of these embodiments, the system may include a front end to receive an instruction, a decoder to decode the instruction, a core to execute the instruction, and a retirement unit to retire the instruction. To execute the instruction, the core may include a first logic to retrieve a first index value from an array of indices, the array of indices to be located at an index base address in a memory based on a first parameter for the instruction, a second logic to compute a first element address, the first element address to identify a location at which to scatter a first data element in the memory based on the first index value, and a data base address for a group of potential data element locations in the memory, the data base address based on a second parameter for the instruction, and a third logic to prefetch, to a cache, the contents of a location in the memory at the first element address, including a fourth logic to perform a read-for-ownership access. In combination with any of the above embodiments, the core may further include a fifth logic to retrieve a second index value from the array of indices, the second index value to be adjacent to the first index value within the array, a sixth logic to compute a second element address, the second element address to identify a location at which to scatter a second data element in the memory, the second element address to be nonadjacent to the first element address, based on the second index value and the data base address, a seventh logic to prefetch, to the cache, the contents of a location in the memory at the second element address, including an eighth logic to perform a read-for-ownership access. In combination with any of the above embodiments, the core may further includes a fifth logic to retrieve a second index value from the array of indices simultaneously with the retrieval of the first index value, the second index value to be adjacent to the first index value within the array, a sixth logic to compute a second element address simultaneously with the computation of the first element address, the second element address to identify a location at which to scatter a second data element in the memory, the second element address to be nonadjacent to the first element address, based on the second index value, and the data base address, a seventh logic to prefetch to the cache, simultaneously with the prefetch of the contents of the location at the first element address, the contents of a location in the memory at the second element address, including an eighth logic to perform a read-for-ownership access. In combination with any of the above embodiments, the core may further include a fifth logic to retrieve a second index value the array of indices, the second index value to be located at the lowest-order position within the array of indices, and the second index value to precede the first index value within the array of indices by a fixed distance, a sixth logic to compute a second element address, the second element address to identify a location to which a second data element is to be scattered based on the second index value, and the data base address, and a seventh logic to retrieve the second data element from a source vector register identified by a third parameter for the instruction, the second data element to be retrieved from the lowest-order position in the source vector register, an eighth logic to store the second data element to a location in the memory at the second element address, and a ninth logic to determine the fixed distance. In combination with any of the above embodiments, the core may further include a fifth logic to retrieve a second index value the array of indices, the second index value to be located at the lowest-order position within the array of indices, and the second index value to precede the first index value within the array of indices by a fixed distance, a sixth logic to compute a second element address, the second element address to identify a location to which a second data element is to be scattered based on the second index value, and the data base address, and a seventh logic to retrieve the second data element from a source vector register identified by a third parameter for the instruction, the second data element to be retrieved from the lowest-order position in the source vector register, an eighth logic to store the second data element to a location in the memory at the second element address, and a ninth logic to determine the fixed distance based on a fourth parameter for the instruction. In combination with any of the above embodiments, the core may further include a fifth logic to determine that a bit in a mask register for a second index value is not set, the mask register identified based on a third parameter for the instruction, and a sixth logic to elide, based on the determination that the bit in the mask is not set, retrieval of the second index value, computation of a second element address identifying a location at which to scatter a second data element based on the second index value, retrieval of the second data element from a source vector register identified by a fourth parameter for the instruction, and storage of the second data element to a location in the memory at the second element address, and a seventh logic to preserve, based on the determination that the bit in the mask is not set, the value in the location in the memory at the second element address. In combination with any of the above embodiments, the core may include a fifth logic to compute the first element address as a sum of the first index value and the data base address. In combination with any of the above embodiments, the core may include a fifth logic to clear each bit in the mask register after it has been determined whether or not the bit was set. In combination with any of the above embodiments, the core may further include a fifth logic to determine that a bit in a mask register for an additional index value is set, the mask register identified based on a fourth parameter for the instruction, a sixth logic to elide, based on the determination that the bit in the mask is not set retrieval of the additional index value, computation of an additional element address based on the additional index value, the additional element address identifying a location at which to scatter an additional data element, retrieval of the additional data element from the source vector register, and storage of the additional data element to a location in the memory with the additional element address, and a seventh logic to logic to store, based on the determination that the bit in the mask is not set, a NULL value in the location in the memory with the additional element address. In any of the above embodiments, the core may include a fifth logic to determine the size of the data elements based on a parameter for the instruction. In any of the above embodiments, the core may include a fifth logic to determine the type of the data elements based on a parameter for the instruction. In any of the above embodiments, the cache into which data elements are prefetched may be identified by a third parameter for the instruction. In any of the above embodiments, the first parameter for the instruction may be a pointer. In any of the above embodiments, the second parameter for the instruction may be a pointer. In any of the above embodiments, the system may include a Single Instruction Multiple Data (SIMD) coprocessor to implement execution of the instruction. In any of the above embodiments, the system may include a vector register file that includes the destination vector register.

Some embodiments of the present disclosure include a system for executing instructions. In at least some of these embodiments, the system may include means for receiving a first instruction, means for decoding the first instruction, means for executing the first instruction, and means for retiring the first instruction. The means for executing the first instruction may include means for retrieving a first index value from an array of indices, the array of indices being located at an index base address in a memory based on a first parameter for the instruction, and means for computing a first element address, the first element address identifying a location at which to scatter a first data element in the memory based on the first index value, and a data base address for a group of potential data element locations in the memory, the base address based on a second parameter for the instruction, and means for prefetching, to a cache, the contents of a location in the memory at the first element address, including means for performing a read-for-ownership access. In combination with any of the above embodiments, the system may further include means for retrieving a second index value from the array of indices, the second index value being adjacent to the first index value within the array, means for computing a second element address, the second element address to identify a location at which to scatter a second data element in the memory, the second element address being nonadjacent to the first element address, based on the second index value, and the data base address, means for prefetching, to the cache, the contents of a location in the memory at the second element address, including performing a read-for-ownership access. In combination with any of the above embodiments, the system may further include means for retrieving a second index value from the array of indices simultaneously with retrieving the first index value, the second index value being adjacent to the first index value within the array, means for computing a second element address simultaneously with computing the first element address, the second element address to identify a location at which to scatter a second data element in the memory, the second element address being nonadjacent to the first element address, based on the second index value, and the data base address, means for prefetching to the cache, simultaneously with prefetching the contents of the location at the first element address, the contents of a location in the memory at the second element address, including means for performing a read-for-ownership access. In combination with any of the above embodiments, the system may further include means for determining, prior to retrieving the first index value, a fixed distance between positions in the array of index values used in scattering data elements from the memory and positions in the array of index values used in prefetching data elements from the memory, means for retrieving a second index value from the array of indices, the second index value being located at the lowest-order position within the array of indices, and the second position preceding the first index value within the array of indices by the fixed distance, means for computing a second element address, the second element address identifying a second location in the memory at which to scatter a second data element based on the second index value, and the data base address, and means for retrieving the second data element from the lowest-order position in a source vector register identified by a third parameter of the instruction, and means for storing the second data element to a location in the memory at the second element address. In combination with any of the above embodiments, the system may further include means for determining, based on a third parameter for the instruction, a fixed distance between positions in the array of index values used in scattering data elements from the memory and positions in the array of index values used in prefetching data elements from the memory, means for retrieving a second index value from the array of indices, the second index value being located at the lowest-order position within the array of indices, and the second position preceding the first index value within the array of indices by the fixed distance, means for computing a second element address, the second element address identifying a second location in the memory at which to scatter a second data element based on the second index value, and the data base address, and means for retrieving the second data element from the lowest-order position in a source vector register identified by a third parameter of the instruction, and means for storing the second data element to a location in the memory at the second element address. In combination with any of the above embodiments, the system may further include means for determining that a bit in a mask register for a second index value is not set, the mask register being identified based on a third parameter for the instruction, means for eliding, based on determining that the bit in the mask is not set, retrieving the second index value from a source vector register identified by a fourth parameter for the instruction, computing a second element address, the second element address identifying a location at which to scatter a second data element based on the second index value, retrieving the second data element from the source vector register, and storing the second data element to a location in the memory at the second element address, and means for preserving, based on determining that the bit in the mask is not set, the value in the location in the memory at the second element address. In combination with any of the above embodiments, the system may include means for computing the first element address as a sum of the first index value and the base address for the group of data element locations in the memory. In combination with any of the above embodiments, the system may include means for clearing each bit in the mask register after it has been determined whether or not the bit was set. In combination with any of the above embodiments, the system may further include means for determining that a bit in a mask register for an additional index value is set, the mask register being identified based on a fourth parameter for the instruction, means for eliding, in response to determining that the bit in the mask is not set, retrieving the additional index value, computing an additional element address based on the additional index value, retrieving the additional data element from the source vector register, and storing the additional data element to a location in the memory with the additional address element, and means for storing a NULL value in the location in the memory with the additional element address. In any of the above embodiments, the system may include means for determining the size of the data elements based on a parameter for the instruction. In any of the above embodiments, the system may include means for determining the type of the data elements based on a parameter for the instruction. In any of the above embodiments, the first parameter for the instruction may be a pointer. In any of the above embodiments, the second parameter for the instruction may be a pointer. In any of the above embodiments, the cache into which data elements are prefetched may be identified by a third parameter for the instruction.

What is claimed is:

1. A processor, comprising:
a decoder to decode an instruction;
circuitry, in response to the decoded instruction, to:
retrieve a first index value from an array of indices, wherein the array of indices is to be located at an index base address in a memory, the index base address indicated by a first parameter for the instruction,
compute a first element address, the first element address to identify a first location at which to scatter a first data element in the memory, based on:
the first index value, and
a data base address for a group of potential data element locations in the memory, the data base address indicated by a second parameter for the instruction,
perform a scatter operation including retrieving the first data element from a source vector register and storing the first data element to the first location in the memory,
a retrieve a second index value located in the array of indices at a fixed offset distance from the first index value in the array of indices,
compute a second element address, the second element address to identify a second location in the memory at which to prefetch contents to a cache, and
prefetch, to the cache, the contents of the second location in the memory at the second element address, wherein the prefetch is to be performed using a read-for-ownership access in anticipation of a subsequent scatter operation; and
a retirement unit to retire the instruction.

2. The processor of claim 1, wherein the circuitry is further to
retrieve a third index value from the array of indices, the third index value to be adjacent to the first index value within the array;
compute a third element address, the third element address to identify a third location at which to scatter a second data element in the memory, the third element address to be nonadjacent to the first element address, based on:
the third index value, and
the data base address; and
prefetch, to the cache, contents of the third location in the memory at the third element address, wherein the prefetch is to be performed using a read-for-ownership access.

3. The processor of claim 1, wherein the circuitry is further to:
retrieve a third index value from the array of indices simultaneously with the retrieval of the first index value, the third index value to be adjacent to the first index value within the array;
compute a third element address simultaneously with the computation of the first element address, the third element address to identify a third location at which to scatter a second data element in the memory, the third element address to be nonadjacent to the first element address, based on:
the third index value, and
the data base address; and
prefetch to the cache, simultaneously with a prefetch of contents of the first location at the first element address, contents of the third location in the memory at the third element address, wherein the prefetch is to be performed using a read-for-ownership access.

4. The processor of claim 1, wherein:
the first index value is to be located at a lowest-order position within the array of indices;
the first index value is to precede the second index value within the array of indices by the fixed offset distance;
the cache is indicated by a third parameter for the instruction; and
the circuitry, in response to the decoded instruction, is further to determine the fixed offset distance.

5. The processor of claim 1, wherein the circuitry is further to:
determine the fixed offset distance based on a fourth parameter for the instruction.

6. The processor of claim 1, wherein the circuity is further to:
determine that a bit in a mask register for a third index value is not set, the mask register identified based on a third parameter for the instruction; and
elide, based on the determination that the bit in the mask register is not set:
retrieval of the third index value,
computation of a third element address identifying a third location at which to scatter a second data element based on the third index value,
retrieval of the second data element from the source vector register identified by a fourth parameter for the instruction, and
storage of the second data element to the third location in the memory at the third element address; and
preserve, based on the determination that the bit in the mask register is not set, the value in the third location in the memory at the third element address.

7. The processor of claim 1, wherein the processor is a Single Instruction Multiple Data (SIMD) coprocessor to implement execution of the instruction.

8. A method, comprising, in a processor:
decoding an instruction;
executing the instruction, including:
retrieving a first index value from an array of indices, wherein the array of indices is located at an index base address in a memory, the index base address indicated by a first parameter for the instruction,
computing a first element address, the first element address to identify a first location at which to scatter a first data element in the memory based on:
the first index value, and
a data base address for a group of potential data element locations in the memory, the data base address indicated by a second parameter for the instruction,
performing a scatter operation including retrieving the first data element from a source vector register and storing the first data element to the first location in the memory,
retrieving a second index value located in the array of indices at a fixed offset distance from the first index value in the array of indices,
computing a second element address, the second element address to identify a second location in the memory at which to prefetch contents to a cache, and
prefetching, to the cache, the contents of the second location in the memory at the second element address, including:
performing a read-for-ownership access in anticipation of a subsequent scatter operation; and
retiring the instruction.

9. The method of claim 8, further comprising:
retrieving a third index value from the array of indices, the third index value being adjacent to the first index value within the array;
computing a third element address, the third element address to identify a third location at which to scatter a second data element in the memory, the third element address being nonadjacent to the first element address, based on:
the third index value, and
the data base address; and
prefetching, to the cache, contents of the third location in the memory at the third element address, including: performing a read-for-ownership access.

10. The method of claim 8, further comprising:
retrieving a third index value from the array of indices simultaneously with retrieving the first index value, the third index value being adjacent to the first index value within the array;
computing a third element address simultaneously with computing the first element address, the third element address to identify a third location at which to scatter a second data element in the memory, the third element address being nonadjacent to the first element address, based on:
the third index value, and
the data base address; and
prefetching to the cache, simultaneously with prefetching contents of the first location at the first element address, contents of the third location in the memory at the third element address, including:
performing a read-for-ownership access.

11. The method of claim 8, further comprising:
determining, prior to retrieving the first index value, the fixed offset distance between positions in the array of indices used in scattering data elements from the memory and positions in the array of index values used in prefetching data elements from the memory, wherein:
the first index value is located at a lowest-order position within the array of indices,
the first index value precedes the second index value within the array of indices by the fixed offset distance, and
the cache is indicated by a third parameter for the instruction.

12. The method of claim 8, further comprising:
determining, based on a third parameter for the instruction, the fixed offset distance between positions in the array of indices used in scattering data elements from the memory and positions in the array of indices used in prefetching data elements from the memory.

13. The method of claim 8, further comprising:
determining that a bit in a mask register for a third index value is not set, the mask register being identified based on a third parameter for the instruction;
eliding, based on determining that the bit in the mask register is not set:
retrieving the third index value from the source vector register identified by a fourth parameter for the instruction,
computing a third element address, the third element address identifying a third location in the memory at which to scatter a second data element based on the third index value,
retrieving the second data element from the source vector register, and
storing the second data element to the third location in the memory at the third element address; and
preserving, based on determining that the bit in the mask register is not set, the value in the third location in the memory at the third element address.

14. A system, comprising:
a decoder to decode an instruction; and
circuitry, in response to the decoded instruction, to:
retrieve a first index value from an array of indices, wherein the array of indices is to be located at an index base address in a memory, the index base address indicated by a first parameter for the instruction,
compute a first element address, the first element address to identify a first location at which to scatter a first data element in the memory, based on:
the first index value, and
a data base address for a group of potential data element locations in the memory, the data base address indicated by a second parameter for the instruction,
perform a scatter operation including retrieving the first data element from a source vector register and storing the first data element to the first location in the memory,
retrieve a second index value located in the array of indices at a fixed offset distance from the first index value in the array of indices,
compute a second element address, the second element address to identify a second location in the memory at which to prefetch contents to a cache, and
prefetch, to the cache, the contents of the second location in the memory at the second element address, wherein the prefetch is to be performed using a read-for-ownership access in anticipation of a subsequent scatter operation; and
a retirement unit to retire the instruction.

15. The system of claim 14, wherein the circuitry is further to:
retrieve a third index value from the array of indices, the third index value to be adjacent to the first index value within the array;
compute a third element address, the third element address to identify a third location at which to scatter a second data element in the memory, the third element address to be nonadjacent to the first element address, based on:
the third index value, and
the data base address; and
prefetch, to the cache, contents of the third location in the memory at the third element address, wherein the prefetch is to be performed using a read-for-ownership access.

16. The system of claim 14, wherein the circuitry is further to:
retrieve a third index value from the array of indices simultaneously with the retrieval of the first index value, the third index value to be adjacent to the first index value within the array;
compute a third element address simultaneously with the computation of the first element address, the third element address to identify a third location at which to scatter a second data element in the memory, the third element address to be nonadjacent to the first element address, based on:

the third index value, and
the data base address; and to prefetch to the cache, simultaneously with a prefetch of contents of the first location at the first element address, contents of the third location in the memory at the third element address, wherein the prefetch is to be performed using a read-for-ownership access.

17. The system of claim 14, wherein: the first index value is to be located at a lowest-order position within the array of indices; the first index value is to precede the second index value within the array of indices by the fixed offset distance; and the fixed offset distance is indicated by a third parameter for the instruction.

18. The system of claim 14, wherein the subsequent scatter operation is to be performed by a second instruction to be executed by the circuitry.

19. The system of claim 14, wherein the circuitry is further to:

determine that a bit in a mask register for a third index value is not set, the mask register identified based on a third parameter for the instruction; and elide, based on the determination that the bit in the mask register is not set:

retrieval of the third index value, computation of a third element address identifying a third location at which to scatter a second data element based on the third index value, retrieval of the second data element from the source vector register identified by a fourth parameter for the instruction, and storage of the second data element to the third location in the memory at the third element address; and preserve, based on the determination that the bit in the mask register is not set, the value in the third location in the memory at the third element address.

20. The system of claim 14, wherein the system includes a Single Instruction Multiple Data (SIMD) coprocessor to implement execution of the instruction.

* * * * *